United States Patent
Schechter

(10) Patent No.: US 7,231,998 B1
(45) Date of Patent: Jun. 19, 2007

(54) OPERATING A VEHICLE WITH BRAKING ENERGY RECOVERY

(76) Inventor: Michael Moses Schechter, 31110 Country Ridge Cir., Farmington Hills, MI (US) 48331

( * ) Notice: Subject to any disclaimer, the term of this patent is extended or adjusted under 35 U.S.C. 154(b) by 192 days.

(21) Appl. No.: 10/822,448

(22) Filed: Apr. 9, 2004

(51) Int. Cl.
   *B60K 6/12* (2006.01)
(52) U.S. Cl. .................................... 180/165
(58) Field of Classification Search ............... 180/165, 180/69.4, 69.5; 123/188.2, 90.12, 527, 531; 60/712; 417/203
   See application file for complete search history.

(56) References Cited

U.S. PATENT DOCUMENTS

| | | | | |
|---|---|---|---|---|
| 3,980,152 | A | * | 9/1976 | Manor ........................ 180/313 |
| 4,370,857 | A | * | 2/1983 | Miller ......................... 60/413 |
| 4,478,304 | A | * | 10/1984 | Delano ....................... 180/165 |
| 4,596,119 | A | * | 6/1986 | Johnson ...................... 60/407 |
| 5,529,549 | A | | 6/1996 | Moyer |
| 5,695,430 | A | | 12/1997 | Moyer |
| 5,885,060 | A | * | 3/1999 | Cunkelman et al. ........ 417/243 |
| 6,223,846 | B1 | | 5/2001 | Schechter |
| 6,629,573 | B1 | * | 10/2003 | Perry ......................... 180/54.1 |
| 6,695,591 | B2 | * | 2/2004 | Grimmer et al. ........... 417/203 |

FOREIGN PATENT DOCUMENTS

FR     2507253     * 12/1982

OTHER PUBLICATIONS

Tai, Tsao, Levin, Barta, Schechter, Using Camless Valvetrain for Air Hybrid Optimization, SAE 2003-01-0038, Mar. 2003.
Schechter, Regenerative Compression Braking-A Low Cost Alternative to Electric Hybrids, SAE 2000-01-1025, Mar. 2000.
Schechter, New Cycles for Automobile Engines, SAE 1999-01-0623, Mar. 1999.

* cited by examiner

Primary Examiner—Frank Vanaman

(57) ABSTRACT

A vehicle engine has a system of valves that permits various engine cylinders to operate in different modes of operation. During braking, some of the engine cylinders receive atmospheric air, compress it, and transfer it to an intermediate air-container. Other cylinders receive compressed air from the intermediate air-container, further compress it, and transfer it to a high-pressure air-reservoir for storage. During acceleration, some of the engine cylinders receive compressed air from the high-pressure air-reservoir, expand it to a lower level of pressure, and transfer it to the intermediate air-container. Other cylinders receive air from the intermediate air-container, further expand it, and use it for combustion in an internal-combustion cycle. During short stops, the engine is shut down, for the duration of the stop, and, then, it is restarted with compressed air. During cruise, the engine operates as a conventional internal-combustion engine.

20 Claims, 38 Drawing Sheets

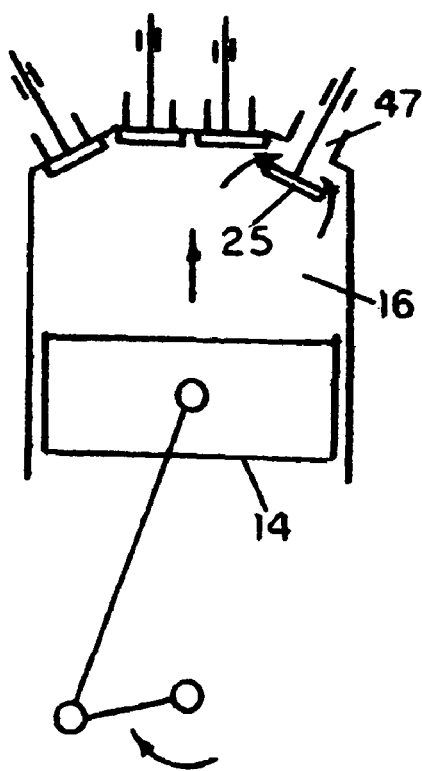
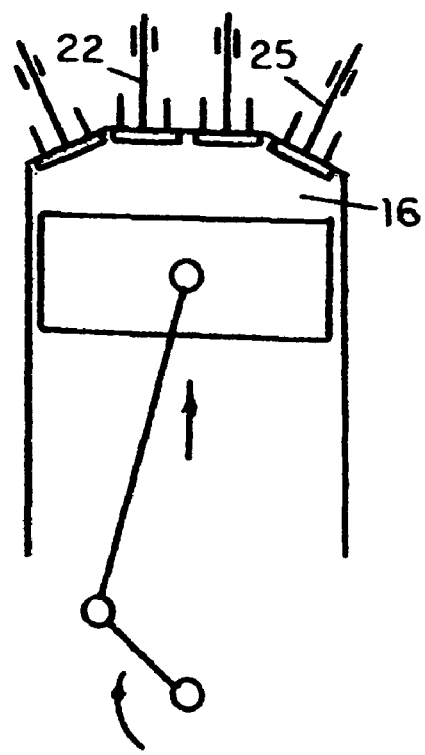
FIG. 14E
FIG. 14F
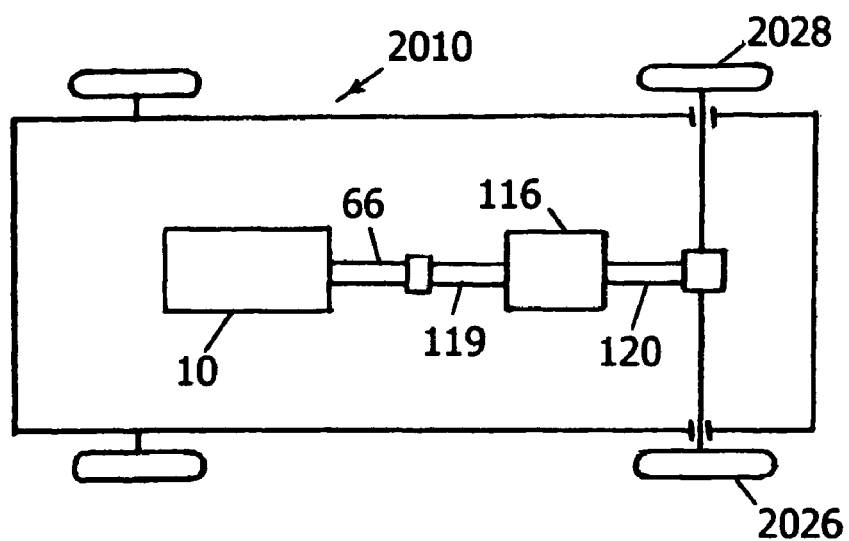
FIG. 26

OPERATING A VEHICLE WITH BRAKING ENERGY RECOVERY

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The present invention relates to vehicle systems capable to accumulate energy derived from vehicle motion during its deceleration or obtained from operation of the vehicle engine, and use the accumulated energy to assist in vehicle acceleration and propulsion at a later time.

BACKGROUND OF THE INVENTION

Most automotive vehicles are propelled by internal combustion engines consuming hydrocarbon fuels. Burning these fuels produces exhaust gas containing harmful air-pollutants, such as carbon monoxide, nitrogen oxides, and unburned hydrocarbons. It also contains substantial amount of carbon dioxide which, if produced in large quantities worldwide over long period of time, can contribute to an undesirable increase in average global temperature. Concern for clean air and a desire to prevent adverse consequences of man-made global warming dictate a need to substantially improve fuel efficiency of automotive vehicles.

By itself, the internal combustion engine is a reasonably efficient machine. Unfortunately, the driving pattern of most automotive vehicles is such, that a substantial fraction of energy produced by their engines is wasted. Typically, the driving pattern involves frequent accelerations, each followed by a deceleration. Each acceleration involves a significant increase in fuel consumption needed to produce the additional energy necessary to increase the vehicle speed. Then, during a subsequent deceleration, this added energy is absorbed by vehicle brakes and dissipated as heat.

Attempts to overcome such waste of energy led to development of systems in which the energy of vehicle motion is not dissipated during braking, but converted into a form in which it can be temporarily stored and, then, used again to accelerate the vehicle at a later time. Typically, such system includes an internal combustion engine, an energy storage, and a second machine absorbing the energy of vehicle motion and placing it into the storage during braking. During subsequent acceleration, the second machine receives energy from the energy storage and uses it to supplement the work of the internal combustion engine. Such systems are known as hybrid vehicle systems. An electric hybrid includes an electric generator/motor as a second machine, and an electric battery for energy storage. A fluid-power hybrid includes a pump/motor and a pressurized-fluid accumulator. A flywheel hybrid includes a variable-ratio transmission and a flywheel.

A disadvantage, common to all of the above mentioned hybrids, is added cost and complexity associated with the need for the second machine and associated mechanisms needed to connect it to vehicle wheels in-parallel to or in-line with the internal combustion engine. Added complexity also increases probability of failures, thus contributing to a reduction in overall system reliability.

Another significant disadvantage is a substantial increase in vehicle weight, which is especially pronounced in hybrids using electric batteries for energy storage. Electric batteries are excellent energy storage devices, but the weight of their electrode-plates and electrolyte often adds so much to the mass of the vehicle that it requires a larger engine to drive it. In addition, a heavier vehicle is likely to cause more damage in traffic accidents.

Another deficiency of hybrids using a second machine is that the process they use for energy conversion is often inefficient. For example, one-way energy conversion efficiency of many conventional electric generators and motors does not exceed 50%, and therefore, at best, only a quarter of braking energy can be reclaimed for acceleration. More advanced generators and motors have higher efficiency, but their cost is often prohibitive.

A very significant drawback of electric batteries is a relatively slow rate at which they can be efficiently charged. This limits their ability to absorb the vehicle braking energy during a strong deceleration. In addition, the durability of electric batteries is much less than the life of an average vehicle. Changing the battery, during the life of the vehicle, adds to the maintenance costs.

In view of the above, it is clear that it is highly desirable to have a vehicle system which does not suffer from the above disadvantages, while retaining all the fuel economy advantages of other hybrid systems. A properly conceived hybrid system using compressed-air for energy storage can meet these requirements. Such a system is the subject of the present invention.

BACKGROUND OF THE INVENTION—PRIOR ART (1) The above patent describes a compression-braking process, in which, in each engine cylinder during each volume-increasing stroke, a charge of atmospheric air is received into the cylinder chamber, and, during a subsequent volume-decreasing stroke, the air-charge is compressed and displaced into the air-reservoir. The braking torque produced by such process is determined by work of air compression performed by the engine pistons. The maximum work of compression that can be performed in each engine cylinder depends on the engine compression ratio. The compression ratio is a ratio of a maximum cylinder volume to its minimum volume. Unfortunately, the compression ratio of an internal-combustion engine is restricted to a certain limit, beyond which serious operational problems, such as engine knock, may be encountered. This limits the magnitude of the peak braking torque that can be achieved in compression braking and, occasionally, requires the vehicle friction brakes to supplement the compression braking. Also, since the density of the compressed air is relatively low, the required volume of the air-reservoir is substantial.

In contrast to the above, the present invention describes a compression-braking process, in which some of the engine cylinders receive atmospheric air, compress it, and displace it into a medium-pressure manifold; while other engine cylinders receive compressed air from the medium-pressure manifold, subject it to additional compression, and displace it into a high-pressure reservoir.

Using two successive stages of compression offers significant advantages over a single-stage compression used in a compression-braking process described in U.S. Pat. No. 6,223,846B1. These are a much smaller size of the required air-reservoir and a significantly greater peak braking torque. The reduction in the required size of the air-reservoir is due to the fact that air is compressed to a very high density, and, in addition, each unit of its mass contains a much greater amount of energy. The increase in peak braking torque is due to the fact that, at a comparable compression ratio, the work-per-cycle performed during the second stage of compression is much greater than the work-per-cycle performed during the first stage. This means that an engine using two stages of compression can produce greater torque than an engine using only one stage of compression. This eliminates the need for friction brakes assistance.

The reduction in the size of the air-reservoir, which the method of the present invention enables, is much greater than it can be expected from a mere increase in air compression. For example, if the air is subjected to a second compression with a compression ratio of six to one, the volume of the air-reservoir can be reduced not six times, but eighteen times. This is because of the synergistic effect of the increase in both mass density and energy density. (A more detailed discussion of this phenomenon is included in a subsequent section of this specification entitled "Operation of the Preferred Embodiment", where a numerical example is given on page 34). In many instances, thanks to such significant reduction in the required volume, the air-reservoir can be eliminated as a stand-alone component of the vehicle, with substantial reduction in cost and complexity.

Ability to absorb and store kinetic energy of the vehicle in a very small air-reservoir is a distinct advantage of the method and the system of the present invention over the method and the system of U.S. Pat. No. 6,223,846B1. Thanks to a two-stage compression, the overall compression ratio of the air pumped into the high-pressure air-reservoir is equal to the compression ratio in a cylinder performing the first compression multiplied by the compression ratio in a cylinder performing the second compression, thus greatly increasing the density of that air. In addition, the energy content in each gram of that air is much higher than in case of single-stage compression, thus reducing the overall mass of air needed to absorb the kinetic energy of the vehicle. This permits to achieve very high air pressures and reduce the required volume of the high-pressure air-reservoir by as much as an order of magnitude, in comparison to an air-reservoir required in a single-stage-compression system, such as described in U.S. Pat. No. 6,223,846B1. A much smaller air-reservoir also weighs less, which contributes to a reduction in overall vehicle weight. A lighter vehicle consumes less fuel, which contributes to better fuel economy and a reduction in harmful exhaust emissions.

Reduction in the size of the air-reservoir offers a significant advantage in packaging the system, since it enables packaging it into any vehicle—even a very small one. It also permits to successfully use the method and the system of the present invention in heavy trucks and buses, where the amount of kinetic energy that needs to be absorbed during braking, is very large, without the need for excessively large air-reservoir. On the other hand, in small vehicles, such as automobiles used for personal transportation, the required size of the air-reservoir becomes so small that it can be integrated with the engine by becoming an integral part of the engine manifolds system. This eliminates the air-reservoir as a stand-alone component of the vehicle and reduces the cost and complexity of the vehicle assembly.

Another distinct advantage of the method and the system of the present invention is its ability to produce a peak compression-braking torque of a much greater magnitude than it is possible to achieve in a system using only a single-stage compression. This too is an especially important advantage in heavy trucks and buses, where, due to the huge vehicle mass, the required braking torque is very high.

(2) The above patent describes an air-motor operation, in which, in each engine cylinder, a charge of compressed air is received from the air-reservoir into the cylinder chamber, expanded during a volume-increasing stroke, and displaced into outside atmosphere. The magnitude of the positive acceleration torque is limited by the value of the engine compression ratio. In contrast to the above, the present invention describes an air-motor operation, in which some of the engine cylinders receive compressed air from the high-pressure air-reservoir, partially expand it, and displace it into a medium-pressure manifold; while other engine cylinders receive the partially-expanded air from the medium-pressure manifold, subject it to additional expansion, and displace it into outside atmosphere.

Using two stages of expansion offers a significant advantage, in terms of achievable acceleration torque, over a single-stage expansion used in an air-motor mode described in U.S. Pat. No. 6,223,846B1. At equal engine size, the peak positive acceleration torque can be much higher. The increase in peak acceleration torque is due to the fact that, at a comparable compression ratio, the positive work-per-cycle performed during the first stage of expansion is much greater than the work-per-cycle performed during the second stage. This means that an engine using two stages of expansion can produce a greater torque than an engine using only one stage of expansion. Greater torque is an important advantage when the vehicle is accelerated from zero speed.

(3) The above patent describes an internal-combustion operation, in which the engine receives air, needed for its operation, from the air-reservoir. Each compressed-air charge, received into each engine cylinder from the air-reservoir, brings-in its energy, which supplements the energy released in combustion. This reduces the fuel consumption necessary to produce the required engine torque. In this way, a significant fraction of the braking energy is reclaimed during acceleration. However, this type of operation is not feasible when pressure in the air-reservoir is very high, as is the case in the system of the present invention. If the air in the air-reservoir is compressed with a compression ratio that greatly exceeds the expansion ratio achievable in a single engine cylinder, expanding the air in the cylinder produces air pressure that is still too high for acceptable internal-combustion operation. To resolve this difficulty, the present invention describes a vehicle propulsion method and system, in which some of the engine cylinders operate as an air motor receiving high-pressure air from the air-reservoir, expanding it to a manageable level of pressure, and displacing it into the medium-pressure manifold; while other engine cylinders receive partially-expanded air from the medium-pressure manifold, subject it to further expansion (if necessary), and use it for combustion.

Since the cylinders performing the initial expansion receive compressed air directly from the air-reservoir, where the pressure is very high most of the time, and they complete the cycle once every engine revolution (as opposed to once every two revolutions in the other cylinders), they can produce peak torque equal or greater in magnitude than what the cylinders burning fuel can produce. The additional work performed by compressed air in both types of cylinders increases the magnitude of the peak torque that can be produced by the engine. An increase in the peak engine torque and power, without an increase in engine displacement, creates an opportunity for a reduction in engine size (smaller engine displacement). This is a significant advantage, since a smaller engine consumes less fuel during part-load operation.

(4) The above patent does not include turbocharging the compression braking. In contrast to this, the present invention describes a method and a system for turbocharging the compression braking. Turbocharging the compression-braking mode of engine operation leads to a substantial increase in the mass of the air charge the engine receives from outside atmosphere during each compression-braking cycle. Since work-per-cycle increases in proportion to the increase in the mass of air, on which the engine pistons perform compression work, increasing the mass of the airflow per cycle increases the negative work-per-cycle and thus increases the vehicle braking torque the engine can provide. Ability to produce a greater peak braking torque is a substantial advantage, especially for big vehicles such as heavy trucks and buses, which require a very high braking torque.

Greater amount of atmospheric air received by the engine, during the turbocharged compression braking, means that greater amount of compressed air is deposited into the air-reservoir. There, it becomes available for assisting in vehicle propulsion during operation in the various air-assisted propulsion modes. The more compressed air is available for propulsion, the less fuel is needed. Hence turbocharging the compression braking improves the engine fuel economy.

(5) The present invention describes a method of avoiding excessively short engine valve event duration. During the engine operation in the compression braking and compressed-air assisted modes, the volume of the compressed air-charge flowing into or out of the cylinder chamber is often very small, due to its high density. This often requires very short duration of the engine valve-opening event, which, sometimes, is difficult to achieve. To avoid the need for excessively short duration of the valve-opening event, the solution offered by the present invention is to provide the valve, controlling the pressurized air-flow, with ability to open and close twice during the engine revolution—first time during the volume-decreasing stroke, before the top-dead-center (a first valve-opening event); and a second time during the volume-increasing stroke, after the top-dead-center (a second valve-opening event). When the net flow of compressed air, during the engine revolution, should be out of the cylinder chamber, the volume of air flowing out of the cylinder chamber, during the first valve-opening event, is greater than the volume of air flowing into the cylinder chamber during the second valve-opening event. On the other hand, when the net flow of compressed air should be into the cylinder chamber, the volume of air flowing out of the cylinder chamber, during the first valve-opening event, is smaller than the volume of air flowing into the cylinder chamber during the second valve-opening event. The net volume of air flowing into or out of the cylinder is determined by a difference between the durations of the two valve opening events, and each of the two events can be of a reasonable duration. This simplifies the valve actuation system and reduces its cost. The above patent does not contemplate such method of engine valve operation.

(6) The above patent describes a system that comprises a large air-reservoir and an engine that, in its preferred embodiment, includes a third type of a valve, in each engine cylinder, dedicated to connecting the cylinder to the air-reservoir whenever needed. In contrast to this, the present invention describes a system that comprises a relatively small high-pressure air-reservoir and an engine that, in its preferred embodiment, includes a third type of a valve and a fourth type of a valve in each engine cylinder. The engine also includes three types of air manifolds: a low-pressure manifold connected to outside atmosphere, a high-pressure manifold connected to the high-pressure air-reservoir, and a medium-pressure manifold that can be connected to the engine cylinders, but is disconnected from both outside atmosphere and the high-pressure air-reservoir. It is the presence of the above three air manifolds that permits the system of the present invention to operate with two stages of compression and two stages of expansion. The system described in the above patent does not include additional air manifolds and, as a consequence, is incapable of two-stage operation.

A U.S. Pat. No. 5,529,549 to Moyer describes another such concept. A review of the differences between the present invention and its advantages over the above patent is given below.

(1) The above patent is limited to a case of saving the energy of braking and using it for later acceleration. The present invention, in addition to saving the braking energy, includes charging the air-reservoir with compressed-air during periods other than vehicle braking, whenever the pressure in the air-reservoir drops below a predetermined level. This is accomplished by operating the engine partly as a compressor charging the air-reservoir and, at the same time, partly as an internal combustion engine propelling the vehicle and driving the compressor. Preventing a complete discharge of the air-reservoir is a significant advantage, since it assures availability of compressed-air whenever it is needed for acceleration or for assist in constant speed operation.

(2) Moyer's patent describes an internal combustion operation limited to a four-stroke cycle. The present invention, on the other hand, describes an engine which can selectively operate as a four-stroke, or as a two-stroke internal combustion engine, quickly switching from one cycle to another whenever needed. Ability to switch from the four-stroke to the two-stroke internal combustion operation permits a substantial increase in engine torque. It is especially useful during acceleration from low engine speed, when torque produced by a four-stroke engine is often inadequate.

(3) Moyer proposes to control the flow of air from the cylinder to the pressure tank and back by flowing the air through a variable restriction. As it is well known, throttling an air-flow in a restriction inevitably leads to a substantial loss of energy. The present invention avoids this type of energy loss. It envisions flowing the air through unrestricted passages and controlling the magnitude of the braking force by varying the volume of the air-charge received into the engine cylinder, as well as varying the volume and the degree of compression of the air discharged from the cylinders into the medium-pressure manifold and into the high-pressure air-reservoir. This is accomplished by varying the timings of the valves openings and closings.

(4) The above patent includes a supercharged engine function. Supercharging an internal combustion engine involves filling its cylinders with pressurized air so that, at the beginning of the compression stroke, the cylinder pressure is higher than atmospheric pressure. This permits an increase in engine power. In contrast to this, the present invention is not limited to supercharging. It provides for a compressed-air assist at all levels of engine power, from light-load to full-load. This is accomplished by metering a variable volume of compressed-air into the cylinder, first without changing the pressure of the air-charge and then subjecting it to an orderly variable expansion during which its energy is transmitted to the piston. At the beginning of the compression stroke the pressure in the cylinder may be less than, equal to, or higher than atmospheric pressure, depending on the required level of engine power. During a four-stroke cycle mode of operation, each engine cylinder has two power strokes, one with compressed-air and one with combustion-gas, during each cycle. During a two-stroke cycle mode of operation, the compressed-air charge eliminates or reduces the amount of required compression work. The present invention also contemplates turbocharged compression braking. Moyer's patent does not include these modes of engine operation.

(5) The present invention provides for a compressed-air reservoir with a heating jacket through which a variable and controllable flow of exhaust gas can be maintained. This prevents heat loss through external walls of the air-reservoir and maintains optimum air-temperature level for best engine operation. The above patent does not include any such measures. Without them, substantial energy losses, associated with cooling of compressed air during its storage, will result.

(6) The present invention includes a method for controlling the magnitude of the braking force by varying the transmission ratio during compression braking. The above patent does not anticipate such method of control.

(7) The present invention includes controlling the braking force by omitting some of the engine cycles during compression braking. This is not included in Moyer's patent.

(8) The present invention includes a method of preserving the energy of the residual compressed-air trapped in the clearance volume between the piston and the cylinder head at the end of the compression stroke during compression braking, when the engine operates as a compressor. It involves postponing opening the intake valve until the residual compressed-air expands to the level of pressure in the low-pressure or medium-pressure manifold, respectively, during the volume increasing stroke of the piston. During expansion, energy of the residual compressed-air is transmitted to the piston. Moyer's patent does not include such method of energy saving.

(9) The present invention includes a method for controlling the quantity of residual exhaust gas retained in the cylinder for nitrogen oxide control during operation with compressed-air assist. The method involves a variable early exhaust valve closing. This replaces exhaust gas recirculation, which is not feasible when the engine receives its intake air from the air-reservoir. The above patent does not include such method.

(10) Moyer's patent includes a cylinder disabling function (listed in No 1 and No 6 independent claims). The present invention does not preclude, but does not require cylinder disabling. A better method of operation is to operate some of the cylinders as an internal combustion engine, and some as a two-stage compressor recharging the air-reservoir, as described in the present invention.

A U.S. Pat. No. 5,695,430 to Moyer is a continuation of U.S. Pat. No. 5,529,549. It includes the following:

(1) Flow of air into and out of the cylinder is controlled by varying the amplitude of the engine valve lift from zero to 100%. This type of flow control involves throttling the flow, which inevitably leads to a substantial energy loss. Controlling the quantity of air received into and discharged from the engine cylinder without throttling by varying the volume of the air-charge via variable valve timing, as proposed in the present invention, is not included in the above patent.

(2) The above patent also describes utilization of waste heat from the coolant and exhaust while returning the stored compressed-air to the cylinders for air-motor operation. It is dubious that much heat transfer can take place during the short duration of each intake stroke, and, besides, this does not prevent loss of heat energy from the compressed-air during its storage. In contrast to this, the present invention includes a concept of an air-reservoir with a controllable heating jacket which prevents heat loss and maintains proper temperature of stored air on a continuous basis.

BACKGROUND OF THE INVENTION—OBJECTS AND ADVANTAGES

Accordingly, one object of the present invention is to reduce the size of the air-reservoir necessary for storing the vehicle braking energy in compressed air. Thanks to a very substantial increase in both mass density and energy density of the stored air, a very significant reduction in the size of the air-reservoir can be achieved. In small vehicles, such as automobiles used for personal transportation, the required size of the air-reservoir becomes so small that it can be integrated with the engine by becoming an integral part of the engine manifolds system. This eliminates the air-reservoir as a stand-alone component of the vehicle and reduces the cost and complexity of the vehicle assembly.

Another object of the present invention is to make the concept of storing the vehicle braking energy acceptable for heavy-truck application. In heavy trucks, the mass of the vehicle is very large, and the amount of kinetic energy, to be absorbed during braking, is huge. Reduction in the required size of the air-reservoir permits to successfully use the above concept in heavy trucks, without the need for excessively large air-reservoir.

A further object of the present invention is to increase the peak braking torque produced by compression braking. Since the second stage of compression can produce greater torque than the first stage, it is possible to produce a peak compression-braking torque of a much greater magnitude than it is possible to achieve in a system using only a single-stage compression. This too is an especially important advantage in heavy trucks and buses, where, due to the huge vehicle mass, the required braking torque is very high.

Yet another object of the present invention is to increase the peak braking torque produced by compression braking in a turbocharged engine. The present invention describes a method and a system for turbocharging the compression braking. The method involves driving the turbine with compressed air, and saving the air in the air-reservoir after that. Turbocharging the compression-braking mode of engine operation leads to a substantial increase in the mass of the air charge the engine receives from outside atmosphere during each compression-braking cycle. This further increases the vehicle braking torque the engine can provide.

A further object of the present invention is to increase the peak acceleration torque produced by the engine during compressed-air-assisted acceleration. The increase in peak acceleration torque is due to the fact that, at a comparable compression ratio, the positive work-per-cycle performed during the first stage of air expansion is much greater than the work-per-cycle performed during the second stage. This means that an engine using two stages of expansion can produce a greater torque than an engine using only one stage of expansion. Greater torque is an important advantage when the vehicle is accelerated from zero speed.

Another object of the present invention is to reduce the amount of harmful exhaust emissions during compressed-air-assisted operation. Since the cylinders performing the initial expansion receive compressed air directly from the air-reservoir, where the pressure is very high most of the time, and they complete the cycle once every engine revolution (as opposed to once every two revolutions in the other cylinders), they can produce peak torque equal or greater in magnitude than what the cylinders burning fuel can produce. The additional work performed by compressed air in both types of cylinders reduces the amount of work that must be performed by combustion. This, in turn, reduces the peak temperature in the cylinder, which leads to a reduction in the amount of nitrogen oxide produced.

Yet another object of the present invention is to reduce the weight of the vehicle. An increase in the peak engine torque and power, without an increase in engine displacement, creates an opportunity for a reduction in engine size (smaller engine displacement). This is a significant advantage, since a smaller engine consumes less fuel during part-load operation. Another factor contributing to reduction in weight is elimination of the air-reservoir as a stand-alone unit.

A further object of the present invention is to reduce or eliminate the need for electric starter by starting the engine with compressed air received from the air-reservoir. This is another cost reduction.

Another object of the present invention is to eliminate the external exhaust gas recirculation system. Exhaust gas recirculation is used in most engines to reduce nitrogen oxide emission. The variable valve systems employed by the embodiments of the present invention can trap sufficient amount of residual gas in each cylinder at the end of each exhaust stroke to control the amount of nitrogen oxide produced in the next cycle without the need for an external exhaust recirculation. Elimination of the exhaust gas recirculation system leads to a substantial cost reduction.

Finally, it is a key object of the present invention to achieve a significant reduction in fuel consumption by saving and storing the energy of vehicle motion during its deceleration, and reusing it later during its subsequent acceleration and propulsion.

SUMMARY

In its embodiments, the present invention contemplates a system for and a method of operating a vehicle on wheels. The system includes a high-pressure air-reservoir capable to receive, store, and discharge compressed air. It also includes a reciprocating-piston engine capable to selectively operate as an internal combustion engine, or as a compressor, or as an air-motor. The engine can also operate concurrently as an internal combustion engine and a compressor, or concurrently as an internal combustion engine and an air-motor. During the internal combustion operation, the engine can selectively operate either as a four-stroke, or as a two-stroke internal combustion engine.

The engine has three types of air manifolds: a low-pressure manifold connected to outside atmosphere, a high-pressure manifold connected to the high-pressure air-reservoir, and a medium-pressure manifold that can be connected to the engine cylinders, but is disconnected from both outside atmosphere and the high-pressure air-reservoir. The engine gas exchange controlling system comprises a set of deactivatable and variably controllable valves, which can selectively connect individual engine cylinders to one, or another of the above three air manifolds. There is also a deactivatable fuel delivery system. The overall system also includes a control system, which is an on-board computer capable to monitor the vehicle driver's demands and respond to them by controlling the operation of the engine and other vehicle components according to a program contained in its software.

During vehicle braking the fuel delivery system is deactivated, and the engine valves activity is such that some of the engine cylinders receive atmospheric air from the low-pressure manifold, compress it, and displace it into the medium-pressure manifold; while other engine cylinders receive compressed air from the medium-pressure manifold, subject it to additional compression, and displace it into the high-pressure manifold. From there, compressed air flows into the high-pressure reservoir, where it can be stored. In this way, kinetic energy of vehicle motion is transformed into potential energy of compressed air stored in the high-pressure air-reservoir. Varying the timings of the valves openings and closings varies the intensity of braking.

During subsequent vehicle acceleration fuel delivery is reactivated, and the engine valves activity is such, that the engine operates as an internal combustion engine receiving air, needed for its operation, from the high-pressure air-reservoir. Some of the engine cylinders operate as an air motor receiving high-pressure air from the air-reservoir, expanding it to a manageable level of pressure, and displacing it into the medium-pressure manifold; while other engine cylinders receive partially-expanded air from the medium-pressure manifold, subject it to further expansion (if necessary), and use it for combustion. The energy of compressed air supplements the energy released in combustion. This reduces the fuel consumption necessary to produce the required engine torque. In this way, a significant fraction of the braking energy is reclaimed during acceleration. Changing the schedule of the engine valves operation and doubling the frequency of fuel delivery can switch the engine operational cycle from a four-stroke to a two-stroke cycle, or vice versa. The engine can also operate as a conventional internal combustion engine receiving air from outside atmosphere into all engine cylinders.

To save fuel, the engine operation can be completely deactivated during vehicle coasting, when the driver depresses neither the acceleration pedal, nor the brake pedal. The same can be done whenever the vehicle stops. To restart the engine after a brief stop, it can be brought up to speed by operating it as a two-stage air-motor receiving compressed air from the high-pressure air-reservoir. In this mode of operation, some of the engine cylinders receive compressed air from the high-pressure manifold, partially expand it, and displace it into a medium-pressure manifold; while other engine cylinders receive the partially-expanded air from the medium-pressure manifold, subject it to additional expansion, and displace it into the low-pressure manifold. From there, the air flows into outside atmosphere.

Charging the air-reservoir with compressed air can also be accomplished concurrently with internal combustion operation at part-load. For this, the schedule of the engine valves operation is modified, so that some of the engine cylinders operate as a compressor, while other cylinders operate as an internal combustion engine that propels the vehicle and drives the cylinders operating as the compressor. If so desired, air-reservoir charging can also be performed during vehicle coasting and during short stops.

DRAWINGS—FIGURES

FIGS. 14A to 14F are schematic diagrams providing step-by-step illustrations of the primary cylinder operation when it performs the second expansion and combustion, in accordance with the second propulsion mode in the preferred embodiment of the present invention.

FIG. 26 is a schematic diagram showing how the engine can be coupled to the transmission and connected to the vehicle driving wheels.

DETAILED DESCRIPTION OF A PREFERRED EMBODIMENT

FIGS. 1 to 3 and 26

Figure 1:
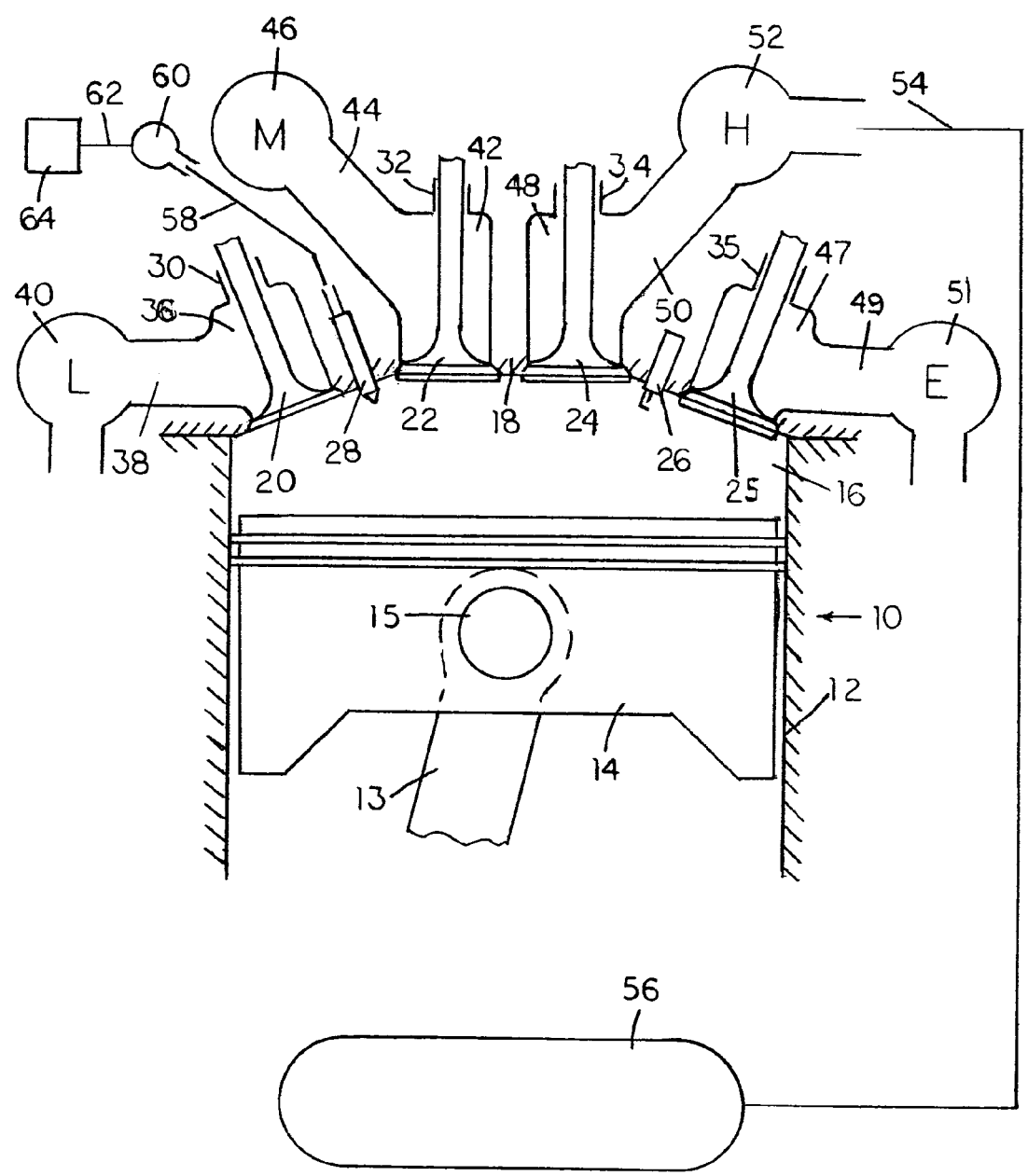
FIG. 1 is a schematic, cross-sectional side-view of an engine cylinder and head arrangement and its connection to a compressed-air reservoir, in accordance with a preferred embodiment of the present invention.
Figure 2:
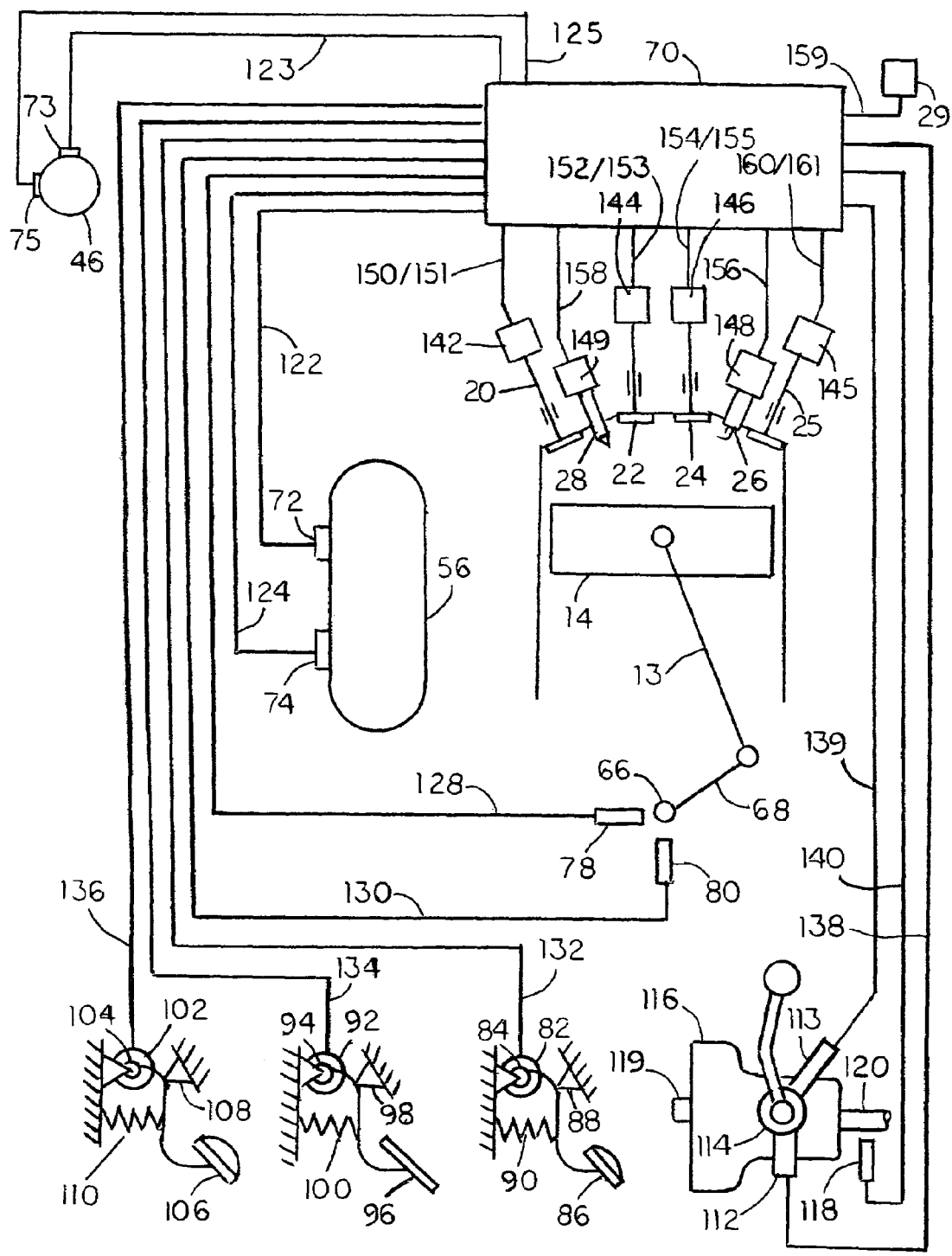
FIG. 2 is a schematic diagram illustrating a system of sensors sending input signals to a vehicle control system that sends out output signals to actuators controlling operation of various components of the system, in accordance with a preferred embodiment of the present invention.
Figure 3:
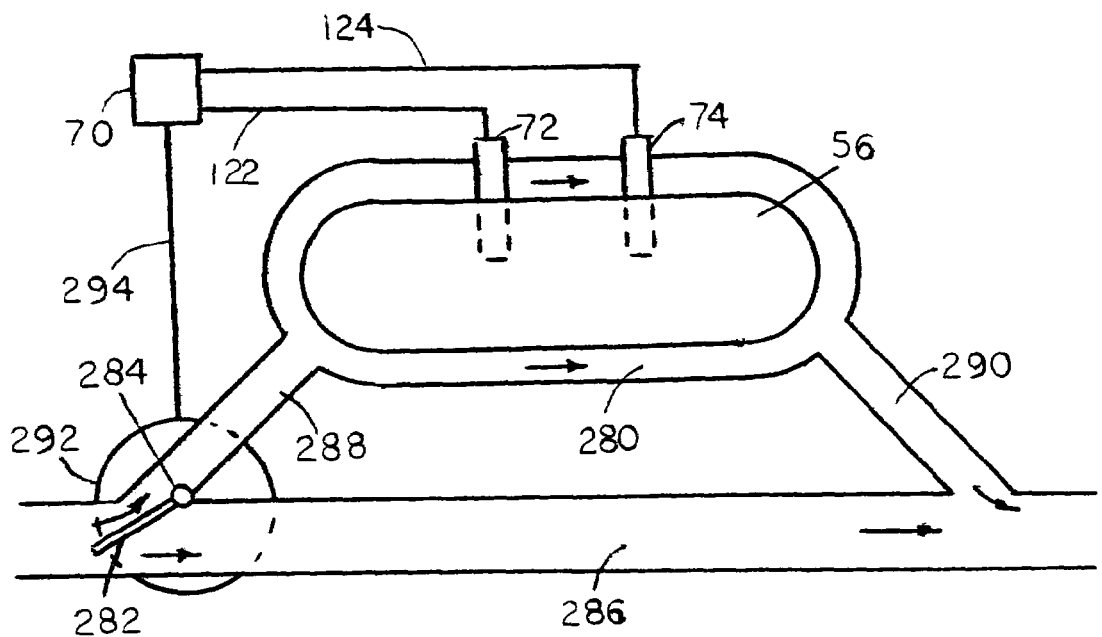
FIG. 3 is a schematic diagram illustrating automatic air-temperature control in a compressed-air reservoir useable with the present invention.
Figure 25:
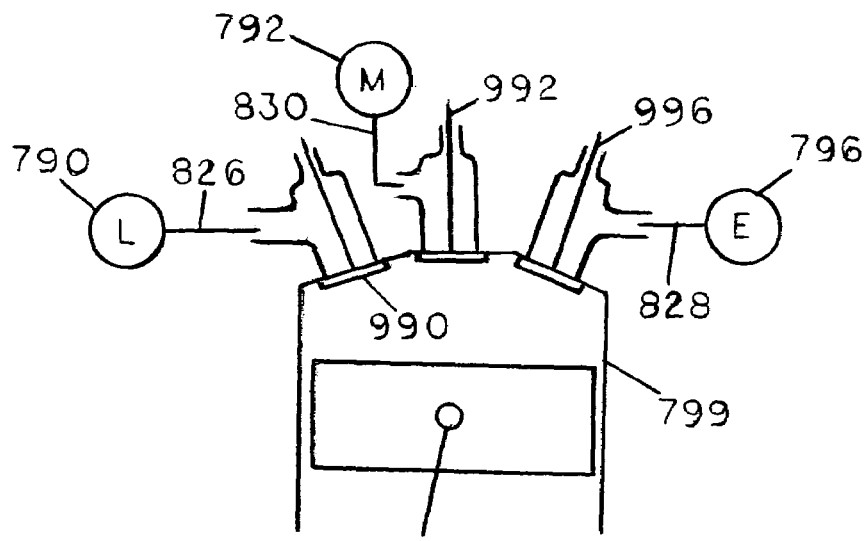
FIG. 25 is a schematic diagram showing a turbocharged engine connections to its manifolds.

A preferred embodiment of the present invention is illustrated in FIGS. 1 to 3. FIG. 1 is a schematic, cross-sectional side-view of an engine cylinder and head arrangement and its connection to a compressed-air reservoir. An engine 10 has at least two such cylinders. A cylinder 12 contains a piston 14, which is mounted upon a connecting rod 13 by a wrist pin 15 and can reciprocate in cylinder 12, thus varying the volume of a cylinder chamber 16 enclosed between piston 14 and a cylinder head 18 attached to the top of cylinder 12.

Four types of normally-closed valves, a first valve 20, a second valve 22, a third valve 24, and a fourth valve 25, are installed in cylinder head 18. Valves 20, 22, 24, and 25 are slidably mounted in guides 30, 32, 34, and 35, respectively, which are arranged in cylinder head 18. Depending on the needs of the engine, there may be more than one valve of each type in each engine cylinder. A conventional spark plug 26 and a fuel injector 28 are also mounted within cylinder head 18 and protrude into cylinder chamber 16. If engine 10 is a diesel, there is no need for spark ignition and spark plug 26 is omitted. In a port-injected engine, fuel injector 28 would be omitted too. Instead, a fuel injector would be installed in air passages leading to the cylinder.

First valve 20 is shown in its closed position in which it separates cylinder chamber 16 from a first port 36 which opens into a first passage 38. First passage 38 connects to a low-pressure manifold 40, to which all first ports and all first passages from all engine cylinders are connected. Low-pressure manifold 40 is connected to outside atmosphere, usually through a system of intake pipes, an air-filter, etc.

Second valve 22 is shown in its closed position in which it separates cylinder chamber 16 from a second port 42 which opens into a second passage 44. Second passage 44 connects to a medium-pressure manifold 46, to which all second ports and all second passages from all engine cylinders are connected.

Third valve 24 is shown in its closed position in which it separates cylinder chamber 16 from a third port 48 which opens into a third passage 50. Third passage 50 connects to a high-pressure manifold 52 to which all third ports and all third passages from all engine cylinders are connected. High-pressure manifold 52 is connected via a duct 54 to an air-reservoir 56. Air-reservoir 56 is made of a material capable to contain and withstand the pressure of compressed air inside the reservoir. It can be located anywhere in the vehicle. If so desired, the vehicle may have several air-reservoirs, all connected to high-pressure manifold 52.

Fourth valve 25 is shown in its closed position in which it separates cylinder chamber 16 from an exhaust port 47 which opens into an exhaust passage 49. Exhaust passage 49 connects to an exhaust manifold 51 to which all exhaust ports and all exhaust passages from all engine cylinders are connected. Exhaust manifold 51 is connected to outside atmosphere, usually through a system of exhaust pipes, a muffler, a catalyst, etc.

Low-pressure manifold 40, medium-pressure manifold 46, high-pressure manifold 52, and exhaust manifold 51 are labeled by letters L, M, H, and E, respectively.

In this example of the preferred embodiment there is only one low-pressure manifold, one medium-pressure manifold, one high-pressure manifold, and one exhaust manifold. In other cases, however, the engine may have more than one of each type of air manifolds and more than one exhaust manifold.

Fuel injector 28 is of the kind in which timing of fuel injection and quantity of fuel injected during each engine cycle is determined by timing and duration, respectively, of injector opening. It is connected via a passage 58 to a fuel manifold 60 to which all fuel injectors from all engine cylinders are connected. Fuel manifold 60 is filled with fuel pressurized to a predetermined constant pressure and delivered to fuel manifold 60 from a vehicle fuel supply system 64 via a fuel line 62.

FIG. 2 is a schematic diagram illustrating a system of sensors sending input signals to a vehicle control system, which sends out output signals to actuators controlling operation of various components of the system. The signals generated by the sensors inform the control system about vehicle driver's demands for a specific vehicle propulsion or braking force, as the case may be. Propulsion force is force acting on the vehicle in a direction of its motion. Braking force is force acting on the vehicle in a direction opposite to its motion. The input signals also carry information on physical and operational conditions in various parts and components of the engine and the vehicle. The control system evaluates the received information and, in accordance with its internal logic, controls operation of the engine and other vehicle components, so as to satisfy the driver's demands while maintaining optimum fuel consumption efficiency.

As shown in FIG. 2, a pressure sensor 72 and a temperature sensor 74 are mounted in air-reservoir 56. They measure pressure and temperature of air inside air-reservoir 56 and transmit these data to a control system 70 via electric lines 122 and 124, respectively. A pressure sensor 73 and a temperature sensor 75 measure pressure and temperature of air inside medium-pressure manifold 46 and transmit these data to control system 70 via electric lines 123 and 125, respectively Two sensors, 78 and 80, monitor piston 14 position in cylinder 12 (FIG. 1). They are installed in proximity to a crankshaft 66 and actually measure rotational position of a crank 68 but, since motion of piston 14 is a well defined function of crank 68 rotation, this also defines piston 14 position. Sensor 78 sends a single electric pulse via an electric line 128 to control system 70 every time crank 68 puts piston 14 in a top-dead-center position. The top-dead-center is a piston position in which the direction of the piston motion is reversed and the volume of the cylinder chamber is at its minimum. Conversely, a bottom-dead-center is a piston position in which the direction of the piston motion is reversed and the volume of the cylinder chamber is at its maximum. Sensor 80 sends a continuous series of electric pulses via an electric line 130 to control system 70 during each crank 68 revolution. These pulses are separated from each other by equal angles of crank 68 rotation, each such angle being a fraction of crank 68 revolution. The two signals coming from sensors 78 and 80 supply control system 70 with frequently updated information on crank 68 and piston 14 positions relative to the top-dead-center in cylinder 12. This also supplies information on positions of cranks and pistons in all other engine cylinders, since positions of other cranks relative to crank 68 are known. In addition, time intervals between arrivals of individual pulses generated by sensor 80 provide control system 70 with information on the speed of crankshaft 66 rotation.

Two sensors, 82 and 92, are intended to inform control system 70 about the driver's demands for the vehicle braking or propulsion force, as the case may be. Sensor 82 is installed on a pivot-shaft 84 to which a brake pedal 86 is rigidly attached. In its free position, a spring 90 keeps brake pedal 86 pressed against a stop 88. In this position, sensor 82 generates no signal. Whenever brake pedal 86 is depressed, sensor 82 generates an electric signal the magnitude of which increases with an increase in brake pedal 86 travel away from stop 88. An increase or a decrease in the magnitude of this signal is a demand for an increase or a decrease, respectively, in the magnitude of the braking force.

Installation and operation of sensor 92 is similar to that of sensor 82. Sensor 92 is installed on a pivot-shaft 94 to which an acceleration pedal 96 is rigidly attached. In its free position, a spring 100 keeps acceleration pedal 96 pressed against a stop 98. In this position, sensor 92 generates no signal. Whenever acceleration pedal 96 is depressed, sensor 92 generates an electric signal the magnitude of which increases with an increase in acceleration pedal 96 travel away from stop 98. An increase or a decrease in the magnitude of this signal is a demand for an increase or a decrease, respectively, in the magnitude of the propulsion force.

The signals generated by sensors 82 and 92 are transmitted to control system 70 via electric lines 132 and 134, respectively. Absence of signals from sensor 82, or from sensor 92, is interpreted by control system 70 as an absence of a demand for a braking force, or an absence of a demand for a propulsion force, respectively. Absence of signals from both sensors, 82 and 92, is interpreted as an absence of a demand for either of the two forces.

A clutch sensor 102 is installed on a pivot-shaft 104 to which a clutch pedal 106 is rigidly attached. In its free position, a spring 110 keeps clutch pedal 106 pressed against a stop 108. In this position sensor 102 generates an electric signal that is transmitted to control system 70 via an electric line 136. This informs control system 70 that the vehicle clutch is engaged. Whenever clutch pedal 106 is depressed and moves away from stop 108, sensor 102 generates no signal. This informs control system 70 that the vehicle clutch is disengaged and the engine is not coupled to the vehicle wheels. In vehicles without a clutch, sensor 102 and line 136 are omitted.

A transmission ratio sensor 112 is mounted in a transmission ratio change mechanism 114, which is part of a transmission 116. Transmission 116 couples engine 10 (FIG. 1) to at least one of the vehicle wheels with a variable transmission ratio, except when it is in a neutral position, or when the vehicle clutch is disengaged. The transmission ratio is a ratio of the speed of a transmission input shaft 119 to the speed of a transmission output shaft 120. The neutral position is a temporary transmission components arrangement providing no mechanical coupling between transmission input shaft 119 and transmission output shaft 120. When transmission 116 is in neutral position, engine 10 (FIG. 1) is not coupled to the vehicle wheels. Transmission ratio sensor 112 sends a variable electric signal carrying information on the transmission ratio to control system 70 via an electric line 138. Whenever transmission 116 is in neutral position, transmission ratio sensor 112 generates no signal.

A vehicle motion sensor 118 is installed in proximity to transmission output shaft 120. Alternatively, sensor 118 may be installed in proximity to the vehicle driveshaft or any other component that rotates when the vehicle is in motion. Sensor 118 detects vehicle motion, measures its speed, and sends this information to control system 70 via an electric line 140.

Control system 70 is an on-board computer programmed to control operation of various components of the engine and the vehicle in accordance with a strategy program incorporated into its software. The software contains algorithms and data that permit the control system to evaluate the stream of input signals and determine the magnitude and the timing of each output signal. The output signals controlling operation of the engine and other vehicle components are updated at least once every engine cycle.

Control system 70 controls operation of spark plug 26 and fuel injector 28 by sending control signals to a spark plug actuator 148 and to a fuel injector actuator 149 via electric lines 156 and 158, respectively. It also controls spark plugs and fuel injectors in all other engine cylinders. Spark plug actuator 148 is an ignition coil installed directly on top of spark plug 26. Alternatively, an ignition coil can be remotely installed and electrically connected to the spark plug.

Fuel injector actuator 149 is a solenoid which opens and closes fuel injector 28, thus initiating and terminating, respectively, fuel injection into cylinder chamber 16. The timing and the duration of the control signal sent to fuel injector actuator 149 determine the timing of the fuel injection and the quantity of fuel injected, respectively. While this type of arrangement is the preferred embodiment of fuel injection and its control in the present invention, other types of fuel injection systems, possibly including solenoid-controlled plunger-type pumps and other types of fuel injection pumps, and other types of fuel injectors, may be used in accordance with the present invention.

If transmission 116 is of the type which operates under electronic control, transmission ratio change mechanism 114 incorporates a transmission ratio change actuator 113 capable to change the transmission ratio on a signal received from control system 70 via an electric line 139. In systems without electronic transmission control, actuator 113 and line 139 are omitted.

Control system 70 can also activate a conventional friction brake system 29. Whenever necessary, a control signal sent from control system 70 to friction brake system 29 via electric line 159 activates electrohydraulic, electromechanical, or electropneumatic actuators which bring into rubbing contact friction brake components, such as, for example, brake shoes and brake drums, with force that increases with an increase in the magnitude of the control signal coming from control system 70.

Control system 70 also controls operation of first valve 20, second valve 22, third valve 24, and fourth valve 25 by sending control signals to valve actuators 142, 144, 146, and 145, respectively, which effectuate opening and closing of their respective valves. It also controls all valves in all other engine cylinders. The engine employs a camless valvetrain that uses electrohydraulic actuators instead of a camshaft. Such system can provide a fully variable valve timing, lift and event duration. It can also selectively deactivate individual valves and switch the engine operation from four-stroke to two-stroke and back. Such system was developed at Ford Motor Co., and it was described in an SAE paper entitled "Camless Engine". A similar system was developed by Robert Bosch Corp. in Germany, and it was described in a paper entitled "Auforderungen an einen volvariablen Ventiltrieb und Realisierung durch die electrohydraulische Ventilsteurung EHVS" ("Requirements for a fully Variable Valvetrain and Realization with the Electrohydraulic Valvetrain System EHVS").

Each valve actuator includes two solenoid valves, one controlling the engine valve opening and another one for controlling the valve closing. Accordingly, each valve actuator receives two separate control signals, one for valve opening and one for valve closing. Actuator 142 receives signals for valve opening and closing via lines 150 and 151, respectively. These two lines are shown as a single line labeled 150/151 in FIG. 2. Actuator 144 receives signals for valve opening and closing via lines 152 and 153, respectively. Actuator 146 receives signals for valve opening and closing via lines 154 and 155, respectively. Actuator 145 receives signals for valve opening and closing via lines 160 and 161, respectively. Timing of each valve opening and closing is determined by timing of respective control signals received by its actuator. Varying duration of the signals can vary valve lift.

Those skilled in art will appreciate in view of this disclosure that other methods and systems for variable engine valves actuation may be used according to the present invention. These may include electromechanical or pneumatic careless systems, as well as variety of camshaft-based variable systems, such as hydraulic lost motion, variable mechanism, and other systems.

For good engine operation, it is desirable to control the temperature of compressed air in the air-reservoir. FIG. 3 is a schematic diagram illustrating automatic air-temperature control in a compressed-air reservoir useable with the present invention. The air-temperature control has two objectives. The first one is to insure that relationship between the temperature and the pressure of compressed air in the air-reservoir is within limits determined by an algorithm contained in the control system software. This is to insure that the engine gets air that is neither too cold, nor too hot for proper engine operation. If the air entering the engine cylinders is too cold, this may adversely affect the combustion process. If the air is too hot, this may lead to engine knock.

As shown in FIG. 3, outer surface of air-reservoir 56 has a double wall forming a heating jacket 280 through which hot exhaust-gas can be circulated during engine operation. A plate-valve 282 is rotatably installed on a pivot 284 inside an exhaust pipe 286. Depending on its position, plate-valve 282 can divert a variable fraction of total exhaust-gas flow into an inlet duct 288 leading into heating jacket 280. After circulating through heating jacket 280, the exhaust gas returns through an outlet duct 290 back into exhaust pipe 286. Arrows in the drawing illustrate the flow of exhaust gas.

An actuator 292, which, typically, is a stepper-motor, can vary the position of plate-valve 282, thus varying the exhaust-gas flow through heating jacket 280. Actuator 292 is controlled by a variable signal from control system 70 via an electric line 294. Control system 70 receives information on pressure and temperature of air inside air-reservoir 56 from pressure sensor 72 and temperature sensor 74, respectively, via electric lines 122 and 124 (FIG. 2), respectively. On the basis of this information, it controls the exhaust-gas flow through heating jacket 280 to insure that the temperature of the air inside air-reservoir 56 is a proper function of its pressure, as dictated by the algorithm contained in the control system software. Increasing or decreasing the exhaust-gas flow through heating jacket 280 increases or decreases, respectively, the temperature of compressed-air in air-reservoir 56.

Engine 10 is installed in a vehicle and is coupled to at least one of its wheels for its propulsion and braking. FIG. 26 is a schematic diagram showing an example of how the engine can be coupled to the transmission and connected to the vehicle driving wheels. Engine 10 is mounted in a vehicle 2010. Engine crankshaft 66 is coupled to transmission input shaft 119, which drives the gears inside transmission 116. Transmission output shaft 120 is mechanically connected to vehicle driving wheels 2026 and 2028.

Those skilled in art will appreciate in view of this disclosure that other engine valves arrangements, other arrangements for supplying the control system with necessary information, and other methods of actuation of the key components of the system, possibly including other types of sensors and actuators, and other means of signal transmission, may be used according to the present invention. There may also be various alternative valve arrangements and alternative methods of gas exchange in the engine. Several examples of alternative embodiments of the present invention comprising alternative valve arrangements and alternative methods of gas exchange are described below.

OPERATION OF THE PREFERRED EMBODIMENT

FIGS, 1, 2, 6A to 6D, 7A to 7D, 8, 8A, 8B, 9, 10A to 10D, 11A to 11D, 12, 13, 14A to 14F, 15, 16A to 16D, and 17

The system described in the Description of a Preferred Embodiment can operate in a variety of braking and propulsion modes. Some of them are described below.

BRAKING—Vehicle braking is performed whenever the vehicle driver signals a demand for a braking force by pressing on the brake pedal. It can be used to slow down the motion of the vehicle or to restrict its speed in a downhill drive. Compression braking is a preferred type of braking and is used whenever possible. Friction brakes are used only when needed to supplement compression braking, or when compression braking can not be used. Compression braking can be used only when the engine is coupled to the vehicle wheels and the vehicle is in motion.

In a moving vehicle with the engine coupled to the vehicle wheels, control system 70 (FIG. 2) responds to the driver's demand for a vehicle braking force by operating the engine in the compression-braking mode. If the vehicle is not in motion, or if the engine is not coupled to the wheels, control system 70 responds to the driver's demand for a vehicle braking force by activating friction brake system 29 (FIG. 2).

During compression braking, no fuel is supplied into the engine cylinders, and the engine operates as a reciprocating-piston two-stage compressor driven from the vehicle wheels by vehicle motion. Although the design of all engine cylinders is identical, functionally the cylinders can be divided into two types: primary cylinders that perform a first stage of air compression, and secondary cylinders that perform a second stage of air compression. The number of primary cylinders in the engine may be equal to or unequal to the number of secondary cylinders. It should be stressed that the division of the cylinders into the two types is for the purpose of description only. Every engine cylinder can operate either as a primary or as a secondary cylinder, and its function is determined by control system 70 (FIG. 2).

Air is received from outside atmosphere into the engine primary cylinders, compressed there, and displaced into medium-pressure manifold 46 (FIG. 1). Compressed air is received from medium-pressure manifold 46 into the engine secondary cylinders, further compressed there, and displaced into air-reservoir 56 (FIG. 1). Work performed by the engine pistons absorbs the kinetic energy of the vehicle and slows it down or restricts its motion. In this way the energy of the vehicle motion is transformed into energy of compressed air stored in air-reservoir 56.

FIGS. 6A to 6D illustrate a typical compression-braking process taking place in one of the primary cylinders. It is described as applied to cylinder 12 (FIG. 1), but, with proper shift in timing, it takes place in all primary engine cylinders. Arrows in the diagrams show the directions of crankshaft rotation and piston motion, as well as the motion of air into and out of the cylinder chamber. Each downstroke of the piston is a volume-increasing stroke, and each upstroke is a volume-decreasing stroke. Third valve 24 and fourth valve 25 are deactivated. The process can be considered consisting of four steps: residual-air expansion, intake, compression, and medium-pressure manifold charging. Each four-step process is completed within a single engine revolution.

Figure 6A:
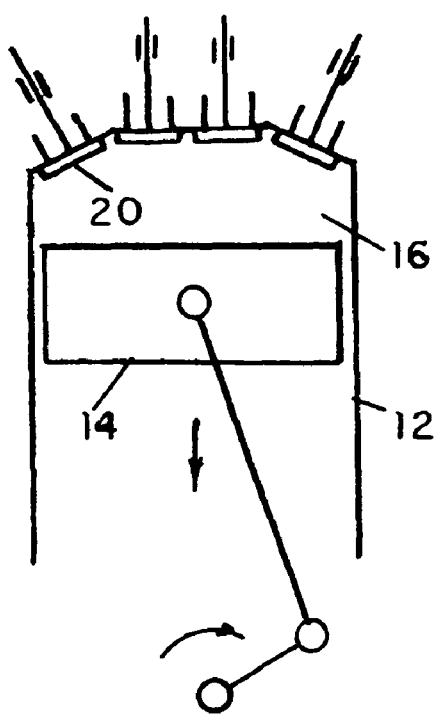
FIGS. 6A to 6D are schematic diagrams providing step-by-step illustrations of the primary cylinder operation when it performs the first compression, in accordance with the compression-braking mode in the preferred embodiment of the present invention.

FIG. 6A illustrates the first step, the residual-air expansion. All valves in cylinder 12 are closed, and a downward motion of piston 14 expands the remnants of the air-charge left in cylinder chamber 16 after the previous cycle. This step ends when first valve 20 opens, preferably when the pressure in cylinder chamber 16 drops to the level of pressure in the low-pressure manifold.

Figure 6B:
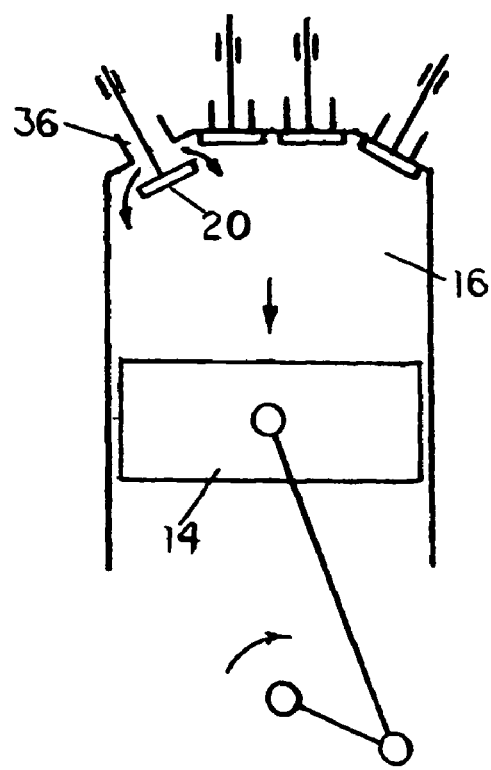
Figure 6C:
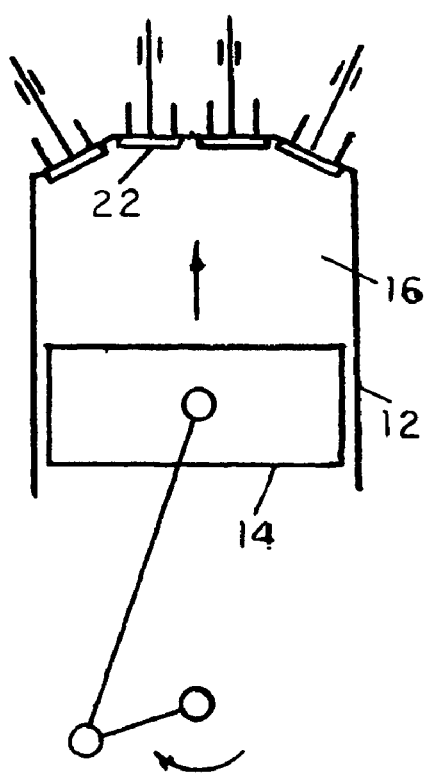

FIG. 6B is a diagram illustrating the step of intake. First valve 20 is open while the other valves remain closed, and a downward motion of piston 14 draws in atmospheric air through first port 36 into cylinder chamber 16. The air comes to first port 36 from low-pressure manifold 40 (FIG. 1) through first passage 38 (FIG. 1). The intake ends when first valve 20 closes. Timing of first valve 20 closure determines the volume of the air-charge received into the cylinder chamber FIG. 6C illustrates the next step, the compression. All valves in cylinder 12 are closed, and an upward motion of piston 14 compresses the air-charge trapped in cylinder chamber 16. The compression ends when second valve 22 opens. Timing of second valve 22 opening determines how much the air-charge is compressed.

Figure 6D:
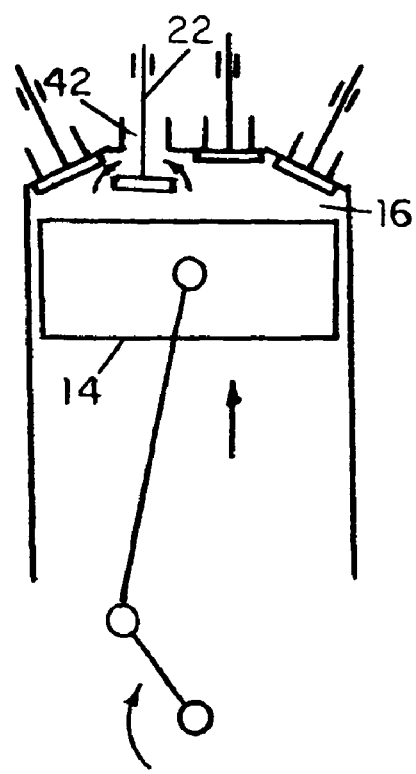

FIG. 6D illustrates the last step, the medium-pressure manifold charging. Second valve 22 is open while the other valves remain closed. Piston 14 continues its upward motion, displacing air from cylinder chamber 16 into second port 42. From there, the displaced air flows (see FIG. 1) through second passage 44 into medium-pressure manifold 46. The medium-pressure manifold charging ends when second valve 22 closes, which, in a typical case, takes place when piston 14 reaches its top-dead-center position. Closing second valve 22 before or after the top-dead-center reduces the amount of compressed air displaced into medium-pressure manifold 46.

A similar process takes place in the secondary cylinders where the air, previously compressed in the primary cylinders, is subjected to additional compression and displaced into the air-reservoir. FIGS. 7A to 7D illustrate a typical compression-braking process taking place in one of the secondary cylinders. It is described as applied to cylinder 13 (FIG. 7A), but, with proper shift in timing, it takes place in all secondary engine cylinders. Arrows in the diagrams show the directions of crankshaft rotation and piston motion, as well as the motion of air into and out of the cylinder chamber. Each downstroke of the piston is a volume-increasing stroke, and each upstroke is a volume-decreasing stroke. First valve 20 and fourth valve 25 are deactivated. The process can be considered consisting of four steps: residual-air expansion, intake, compression, and high-pressure manifold charging. Each four-step process is completed within a single engine revolution.

Figure 7A:
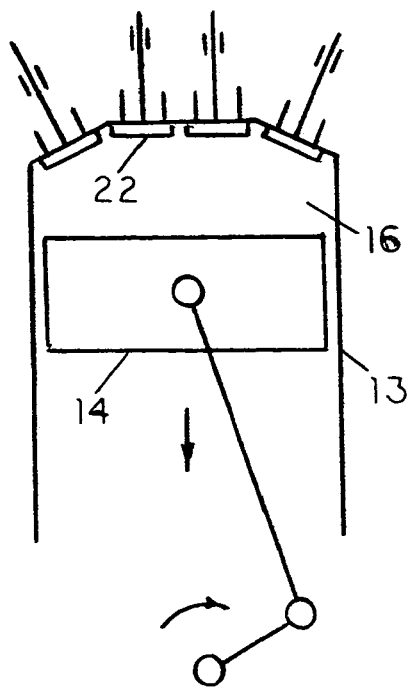
FIGS. 7A to 7D are schematic diagrams providing step-by-step illustrations of the secondary cylinder operation when it performs the second compression, in accordance with the compression-braking mode in the preferred embodiment of the present invention.

FIG. 7A illustrates the first step, the residual-air expansion. All valves in cylinder 13 are closed, and a downward motion of piston 14 expands the remnants of the air-charge left in cylinder chamber 16 after the previous cycle. This step ends when second valve 22 opens, preferably when the pressure in cylinder chamber 16 drops to the level of pressure in medium-pressure manifold 46.

Figure 7B:
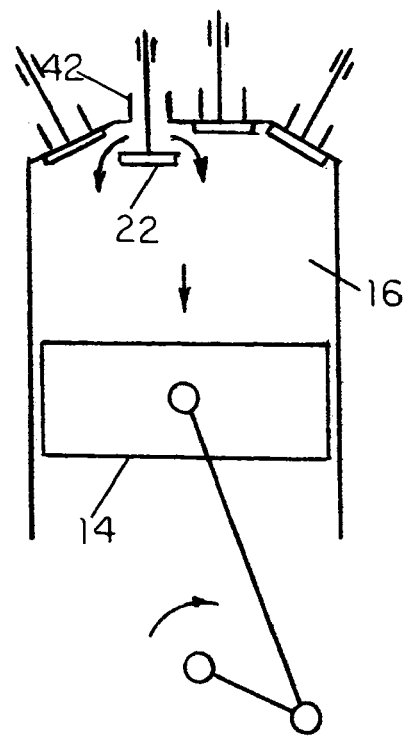

FIG. 7B is a diagram illustrating the step of intake. Second valve 22 is open while the other valves remain closed, and a downward motion of piston 14 draws in compressed air through second port 42 into cylinder chamber 16. The air comes to second port 42 from medium-pressure manifold 46 (FIG. 1) through second passage 44 (FIG. 1). The intake ends when second valve 22 closes. Timing of second valve 22 closure determines the volume of the air-charge received into the cylinder chamber.

Figure 7C:
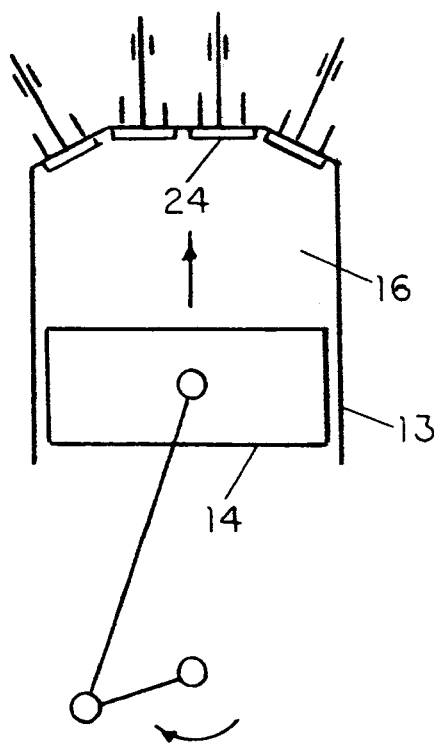

FIG. 7C illustrates the next step, the compression. All valves in cylinder 13 are closed, and an upward motion of piston 14 compresses the air-charge trapped in cylinder chamber 16. The compression ends when third valve 24 opens. Timing of third valve 24 opening determines how much the air-charge is compressed.

Figure 7D:
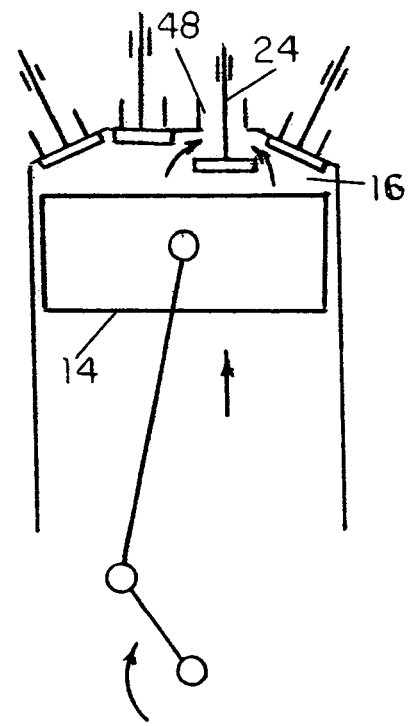

FIG. 7D illustrates the last step, the air-reservoir charging. Third valve 24 is open while the other valves remain closed. Piston 14 continues its upward motion, displacing air from cylinder chamber 16 into third port 48. From there, the displaced air flows (see FIG. 1) through third passage 50 into high-pressure manifold 52 and, from there, through duct 54 into air-reservoir 56. The air-reservoir charging ends when third valve 24 closes.

Control system 70 (FIG. 2) is programmed to control the process of compression braking in a manner which assures that the process generates a braking force of required magnitude, as determined by the magnitude of the signal generated by sensor 82 (FIG. 2). The magnitude of the braking force produced by compression braking increases or decreases with an increase or a decrease, respectively, in the rate at which the engine uses energy when it operates as a compressor. Therefore the braking force increases or decreases with an increase or a decrease, respectively, in the net negative work-per-cycle performed by the piston in each of the engine cylinders participating in the compression-braking process. It also increases or decreases with an increase or a decrease, respectively, in frequency of the cycles repetition, and therefore it increases or decreases with an increase or a decrease, respectively, in the transmission ratio. Thus the braking force produced by compression braking can be varied by varying the work-per-cycle, or by varying the transmission ratio, or by varying both.

Thanks to operational flexibility offered by ability to quickly activate and deactivate the engine valves, the frequency of the cycles repetition can also be reduced, whenever needed, by selectively omitting some of the cycles. For example, the cycle can be performed once every other engine revolution, while during the in-between-cycle revolutions the valves are deactivated. This reduces the compression braking force in half, without any change in the work-per-cycle and the transmission ratio. Omission of some of the cycles is an additional method that the control system can use to control the magnitude of the braking force.

Compression braking is a preferable method for the braking force generation and control. However, if the compression braking can not produce the required braking force even at the maximum work-per-cycle and at the highest transmission ratio, control system 70 (FIG. 2) activates friction brake system 29 (FIG. 2), which then works in-parallel with compression braking.

The work-per-cycle in each cylinder is a function of the timing of the engine valves openings and closings. These timings control various parameters contributing to the amount of work-per-cycle performed, such as the quantity of air received into the cylinder chamber, the ratio of air compression, the quantity of air displaced into the medium-pressure manifold or into the air-reservoir, and the ratio of residual-air expansion.

In the primary cylinders, changing the timing of first valve 20 closing varies the quantity of air received from atmosphere. Changing the timing of second valve 22 opening varies the air compression ratio. Changing the timing of second valve 22 closing varies the quantity of compressed air displaced into medium-pressure manifold 46. Changing the timing of first valve 20 opening varies the residual-air expansion ratio.

In the secondary cylinders, changing the timing of second valve 22 closing varies the quantity of compressed air received from medium-pressure manifold 46. Changing the timing of third valve 24 opening varies the second stage compression ratio. Changing the timing of third valve 24 closing varies the quantity of compressed air displaced into high-pressure manifold 52 and into air-reservoir 56. Changing the timing of second valve 22 opening varies the residual-air expansion ratio.

Control system 70 (FIG. 2) controls and varies the braking force, produced by compression braking, by varying any, some, or all of the above valve timings and the transmission ratio according to a program contained in the control system software. In vehicles with manual transmission control, it is the vehicle driver who varies the transmission ratio.

Figure 9:
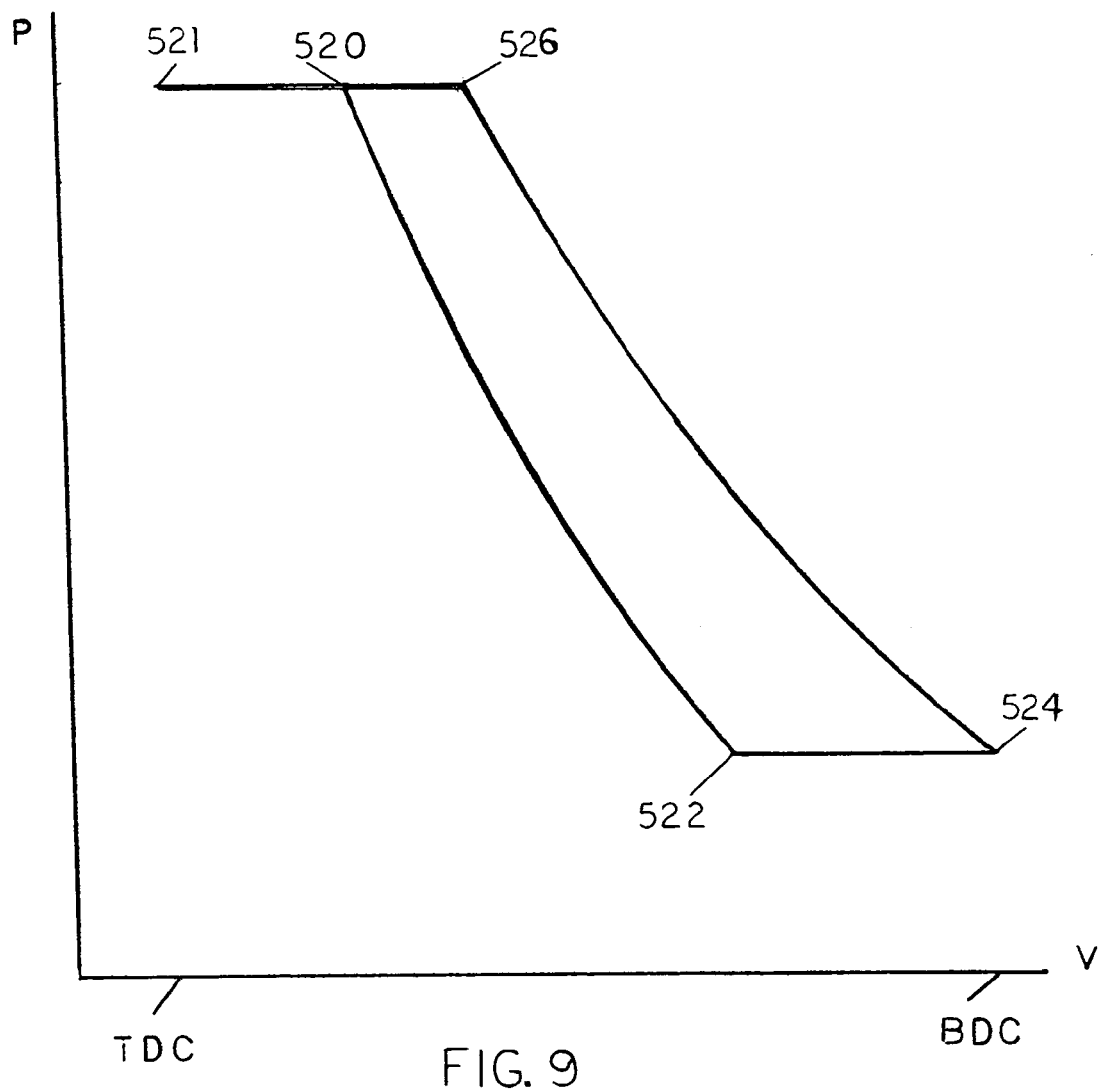
FIG. 9 is a pressure-volume diagram illustrating the secondary cylinder operation, as shown in FIGS. 7A to 7D.
Figure 8:
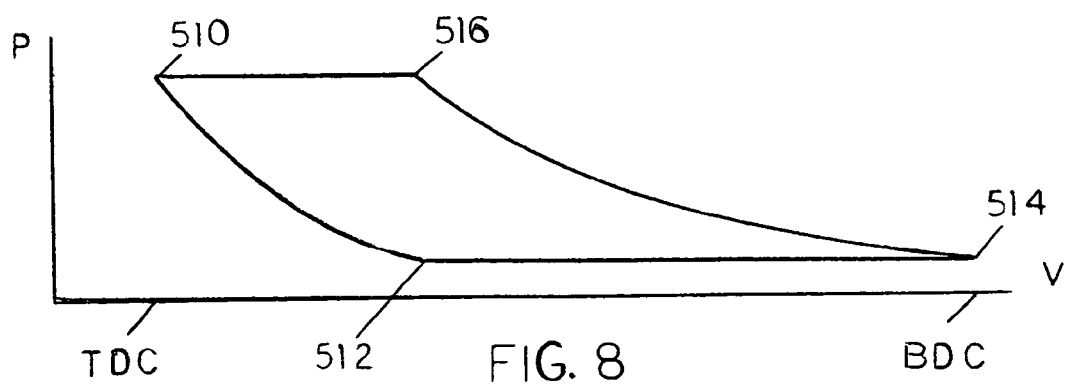
FIG. 8 is a pressure-volume diagram illustrating the preferred variant of primary cylinder operation, as shown in FIGS. 6A to 6D.

A more detailed insight into the above-described compression braking process and its control can be acquired by examining a pressure-volume diagram of its cycle. Pressure-volume diagrams are frequently used to illustrate operation of reciprocating-piston machinery. Each diagram is a plot of pressure inside a cylinder as a function of the cylinder chamber volume, which varies with change in piston position. FIGS. 8 and 9 show pressure-volume diagrams, each illustrating a single cycle of compression braking in one of the primary and one of the secondary engine cylinders, respectively. In each diagram, the cylinder chamber volume and the pressure are plotted along the horizontal and vertical axes, respectively. The pressure and volume axes in each diagram are labeled by letters P and V, respectively. The minimum volume at the top-dead-center and the maximum volume at the bottom-dead-center are marked on the horizontal axes by labels TDC and BDC, respectively. Each is an idealized diagram that assumes instantaneous valves opening and closing, and instantaneous air filling into and discharge from the cylinder chamber.

A typical pressure-volume diagram of compression braking cycle taking place in one of the primary engine cylinders is shown in FIG. 8. From a point 510 to a point 512, all valves are closed, and the fraction of the air-charge, left in cylinder chamber 16 from the previous cycle, expands, preferably until its pressure drops to the level of pressure in the low-pressure manifold at point 512. This period takes place during a first part of the volume-increasing stroke and corresponds to FIG. 6A.

First valve 20 (FIG. 6B) opens at variable point 512 and later closes at a variable point 514. During this period, atmospheric air is received into cylinder chamber 16 (FIG. 6B) at constant pressure. This period, which takes place during a second part of the volume-increasing stroke, corresponds to what is shown in FIG. 6B.

From point 514 to a variable point 516, all valves are closed, and the air-charge is compressed until its pressure becomes equal to pressure in medium-pressure manifold 46 (FIG. 1). This takes place during a first part of the volume-decreasing stroke and corresponds to FIG. 6C.

At point 516, second valve 22 (FIG. 6D) opens and remains open until its closure at point 510. From point 516 to point 510, air is displaced from cylinder chamber 16 into medium-pressure manifold 46 at nearly constant pressure. This period takes place during a second part of the volume-decreasing stroke and corresponds to FIG. 6D.

Figure 8A:
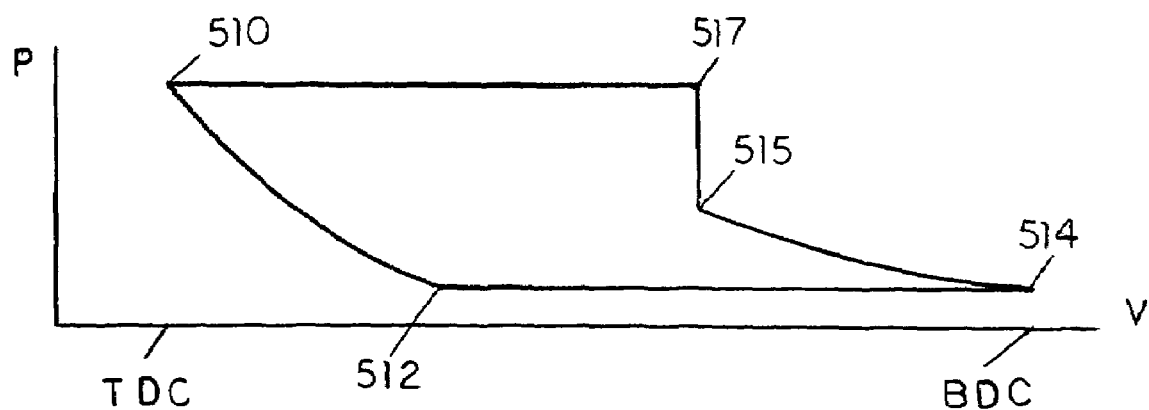
FIGS. 8A and 8B are pressure-volume diagrams illustrating two alternative variants of primary cylinder operation, as shown in FIGS. 6A to 6D.

The above description and diagrams represent just a typical example of the compression-braking process taking places in a primary cylinder. Other variants of the above-described process are possible. For example, FIG. 8A shows a variant of a compression-braking cycle, in which second valve 22 opening takes place at a point 515, before pressure in the cylinder becomes equal to the pressure in medium-pressure manifold 46. At this point, air from medium-pressure manifold 46 flows into cylinder chamber 16, and pressure in the cylinder rises until it becomes equal to pressure in medium-pressure manifold 46 at a point 517. Displacement of air from the cylinder into medium-pressure manifold 46 takes place between points 517 and 510. It is clear from the drawing that the area of the pressure-volume diagram in FIG. 8A is larger than that in FIG. 8, which indicates that a greater work-per-cycle was performed. Therefore, such early opening of second valve 22 can be used when very high braking force is needed.

Figure 8B:
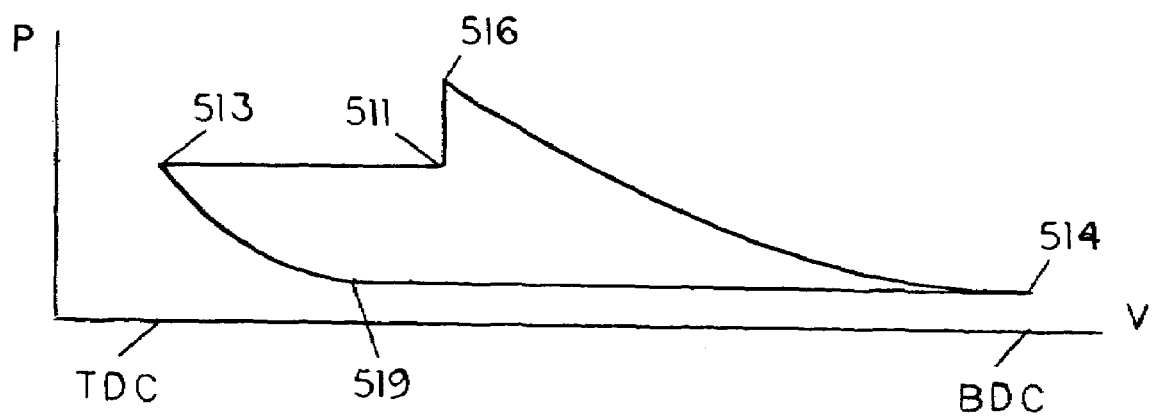

FIG. 8B shows another variant of a compression-braking cycle, in which second valve 22 opening takes place at a point 516, when pressure in the cylinder is greater than the pressure in medium-pressure manifold 46. At this point, air from cylinder chamber 16 flows into medium-pressure manifold 46, and pressure in the cylinder drops until it becomes equal to pressure in medium-pressure manifold 46 at a point 511. Displacement of air from the cylinder into medium-pressure manifold 46 takes place between points 511 and 513. It is clear from the drawing that the area of the pressure-volume diagram in FIG. 8B is smaller than that in FIG. 8, which indicates that a smaller work-per-cycle was performed. Such operation may be necessary, on a temporary basis, when the pressure in medium-pressure manifold 46 is very low.

A typical pressure-volume diagram of compression braking cycle taking place in one of the secondary engine cylinders is shown in FIG. 9. From a point 520 to a point 522 all valves are closed, and the fraction of the air-charge, left in the cylinder chamber from the previous cycle, expands, preferably until its pressure becomes equal to pressure in medium-pressure manifold 46. This period takes place during a first part of the volume-increasing stroke and corresponds to FIG. 7A.

Second engine valve 22 (FIG. 7B) opens at variable point 522 and later closes at a variable point 524. During this period, previously compressed air is received from medium-pressure manifold 46 into cylinder chamber 16 (FIG. 7B) at approximately constant pressure. This period, which takes place during a second part of the volume-increasing stroke, corresponds to what is shown in FIG. 7B.

From point 524 to a variable point 526, all valves are closed, and the air-charge is compressed until its pressure becomes equal to pressure in high-pressure manifold 52 (FIG. 1). This takes place during a first part of the volume-decreasing stroke and corresponds to FIG. 7C.

At point 526 third engine valve 24 (FIG. 7D) opens and remains open until its closure at point 520, which is already after the top-dead-center. From point 526 to a point 521, air is displaced from cylinder chamber 16 into high-pressure manifold 52 (FIG. 1) at nearly constant pressure. This period takes place during a second part of the volume-decreasing stroke and corresponds to FIG. 7D. From point 521 to point 520 the engine piston is already on its downstroke, and some of the air displaced into high-pressure manifold 52 flows back into the cylinder chamber. This is necessary whenever the time period between points 526 and 520 is too short to perform an effective opening and closing of third valve 24.

In this description, work-per-cycle is referred to as net negative work if it produces a braking force. If, on the other hand, it produces a propulsion force, it is referred to as net positive work. Net negative work performed in a primary cylinder during the above described cycle is equal to compression work performed from point 514 (FIG. 8) to point 516, plus displacement work performed from point 516 to point 510, and minus expansion work performed from point 510 to point 512. Net negative work performed in a secondary cylinder during the above described cycle is equal to compression work performed from point 524 (FIG. 9) to point 526, plus displacement work performed from point 526 to point 520, minus expansion work performed from point 520 to point 522, and minus displacement work performed from point 522 to point 524.

A preferred method of controlling the work-per-cycle, during compression braking, is by controlling the compression work. Control system 70 (FIG. 2) can vary the compression work, in a primary cylinder, by varying the timing of first valve 20 (FIG. 6B) closure (point 514, FIG. 8), or the timing of second valve 22 (FIG. 6D) opening (point 516), or the timing of both. Varying the timing of point 514 varies the quantity of air received into the cylinder. Varying the timing of point 516 varies the maximum pressure to which the air-charge is compressed. The compression work performed in a secondary cylinder can be varied by varying the timing of second valve 22 (FIG. 7B) closure (point 524, FIG. 9) relative to the timing of its opening (point 522), or the timing of third valve 24 (FIG. 7D) opening (point 526) relative to the timing of its closure (point 520), or the timing of both. Varying the timing of point 524 varies the quantity of air received into the cylinder. Varying the timing of point 526 varies the maximum pressure to which the air-charge is compressed.

Pressure in air-reservoir 56 (FIG. 1) increases with every compression braking cycle. To continue pumping air into air-reservoir 56, each air-charge, in a secondary cylinder, must be compressed, preferably to a pressure at least equal to the pressure in the air-reservoir. Accordingly, control system 70 (FIG. 2) adjusts the required level of compression in each secondary cylinder for every cycle. Different conditions prevail in medium-pressure manifold 46, which receives air from primary cylinders and discharges it into secondary cylinders. There, the pressure may increase or decrease, depending on whether the outflow of air is smaller or greater than the inflow. Control system 70 adjusts the required level of compression in each primary cylinder, up or down for every cycle, to assure that the air-charge is compressed to a pressure at least equal to the pressure in medium-pressure manifold 46.

Using two stages of compression offers significant advantages over a single-stage compression used in a compression-braking process described in U.S. Pat. No. 6,223,846B1. These are: much smaller size of the required air-reservoir and a significantly greater peak braking torque. The reduction in the required size of the air-reservoir is due to the fact that air is compressed to a very high density, and, in addition, each unit of its mass contains a much greater amount of energy. The increase in peak braking torque is due to the fact that, at a comparable compression ratio, the work-per-cycle performed during the second stage of compression is much greater than the work-per-cycle performed during the first stage. This means that an engine using two stages of compression can produce greater torque than an engine using only one stage of compression.

A better understanding of the significance of the second stage of compression, in terms of reduced air-reservoir volume and greater braking torque, can be attained from the following numerical example. If a charge of air, with an initial temperature of 300 K (80 F), is compressed six times (compression ratio 6:1), its volume is reduced six times and its absolute temperature can be expected to double, thus increasing to 600 K. The amount of energy added to the air-charge is proportional to the increase in its temperature, which is 600−300=300 K. If the same air-charge will be compressed another six times in another cylinder, its volume will be reduced another six times for a total volume reduction of 36 times, and its temperature can be expected to double again, thus increasing to 1200 K. The total temperature increase is 1200−300=900, which is three times more than after the first compression. Therefore the amount of energy added to the air-charge in a two-stage compression is three times greater than in a single-stage compression. Hence the mass of air, needed to absorb a given amount of braking energy, can be reduced three times, if a two-stage compression is used. Taking into account that the volume of that air will also be reduced additional six times, the total reduction in the required volume of the air-reservoir is 3×6=18 times. A 3.3-liter air-reservoir can replace a 60-liter reservoir.

The torque increase too is proportional to the increase in the temperature differential, which is three times. However, since two cylinders are needed to perform the two-stage compression, the increase in the peak torque, in the above example, is only 50%. Still, it is a very substantial increase.

In the above-described compression-braking process, the engine operates as a two-stage compressor. However, the same engine can also operate as a single-stage compressor, and, in some instances, it may be sensible to operate it in that way. For example, if the initial pressure in air-reservoir 56 (FIG. 1) is very low, using two-stage compression would be inefficient. In that case, the engine can operate as a single-stage compressor until adequate level of pressure is achieved in air-reservoir 56, and then switch to the two-stage operation.

In a single-stage compression braking, there is no division on primary and secondary cylinders. All engine cylinders receive air from outside atmosphere, compress it, and displace it into air-reservoir 56, bypassing medium-pressure manifold 46 (FIG. 1). The process is, essentially, the same as in the previously described first stage of compression in primary cylinders. Therefore FIGS. 8, 8A, and 8B can be used to illustrate the single-stage compression braking. The only difference is that, at points 516 (FIG. 8B) and 515 (FIG. 8A), it is third valve 24 (rather than second valve 22) that opens and connects cylinder chamber 16 (FIG. 1) to high-pressure manifold 52 (FIG. 1).

The above description of compression braking emphasized an engine operating as a two-stage compressor. However, those skilled in art will appreciate that, with some modifications, the engine can also operate as a multi-stage compressor using three or a greater number of compression stages. While two compression stages are likely to be sufficient in most cases, the possibility of using a greater number of compression stages should not be precluded and should remain the prerogative of the system designer.

The above described process of compression braking, coupled with transfer of the compressed air into an air-reservoir, is a substantial improvement over a conventional braking involving friction brakes, which absorb the kinetic energy of the vehicle and dissipate it as heat. It is also an improvement over other types of compression braking, in which the compressed air is exhausted into the outside atmosphere. Instead, the energy of the vehicle motion is transformed into energy of compressed air and stored in the air-reservoir. Later, the stored energy can be used to assist in vehicle propulsion and acceleration.

Using the vehicle engine as both an internal combustion engine and a compressor eliminates the need for additional machines, such as electric generators, hydraulic pumps, etc., which are employed by other hybrid vehicle systems. This simplifies the system and reduces its cost and weight.

Using air as a medium for energy storage has a distinct advantage over using other media, since air, even when compressed to a high pressure, is very light. This reduces the weight of the hybrid system. In addition, compressing air in a cylinder and, then, reversing this event by expanding the air in the same cylinder of a fast operating engine is a very efficient process.

Another advantage of the above-described method of vehicle braking is reduced usage of friction brakes. This improves their reliability and extends their life, thus reducing the costs associated with their repair and replacement.

A distinct advantage of the method and the system of the present invention is its ability to absorb and store kinetic energy of the vehicle in a very small air-reservoir. Thanks to a two-stage compression, the overall compression ratio of the air pumped into air-reservoir 56 is equal to the compression ratio in a primary cylinder multiplied by the compression ratio in a secondary cylinder, thus greatly increasing the density of that air. In addition, the energy content in each gram of that air is much higher than in case of single-stage compression, thus reducing the overall mass of air needed to absorb the kinetic energy of the vehicle. This permits to achieve very high air pressures and reduce the required volume of the high-pressure air-reservoir by as much as an order of magnitude, in comparison to an air-reservoir required in a single-stage-compression system, such as described in U.S. Pat. No. 6,223,846B1. A much smaller air-reservoir also weighs less, which contributes to a reduction in overall vehicle weight. A lighter vehicle consumes less fuel, which contributes to better fuel economy and a reduction in harmful exhaust emissions.

Reduction in the size of the air-reservoir offers a significant advantage in packaging the system, since it enables packaging it into any vehicle—even a very small one, such as a motorcycle. It also permits to successfully use the method and the system of the present invention in heavy trucks and buses, where the amount of kinetic energy, that needs to be absorbed during braking, is very large, without the need for excessively large air-reservoir. On the other hand, in small vehicles, such as automobiles used for personal transportation, the required size of the air-reservoir becomes so small that it can be integrated with the engine by becoming an integral part of the engine manifolds system. For example, the air-reservoir may be integrated with the high-pressure manifold. This eliminates the air-reservoir as a stand-alone component of the vehicle and reduces the cost and complexity of the vehicle assembly.

Another distinct advantage of the method and the system of the present invention is its ability to produce a peak compression-braking torque of a much greater magnitude than it is possible to achieve in a system using only a single-stage compression. This too is an especially important advantage in heavy trucks and buses, where, due to the huge vehicle mass, the required braking torque is very high.

FIRST PROPULSION MODE—Control system 70 (FIG. 2) operates engine 10 (FIG. 1) as a prime mover selectively propelling the vehicle in one of several propulsion modes whenever the vehicle driver signals a demand for a propulsion force by pressing on accelerator pedal 96 (FIG. 2) and not pressing on brake pedal 86 (FIG. 2). The choice of the propulsion mode is determined by a control strategy incorporated in control system 70 software.

During a first propulsion mode, no fuel is supplied to the engine cylinders, and the engine operates as a two-stage air motor receiving air from a compressed-air reservoir. As in the case of compression braking, the engine cylinders can be divided into two types: secondary cylinders that perform a first stage of air expansion, and primary cylinders that perform a second stage of air expansion. They may or may not be the same cylinders as those that served as primary and secondary ones in compression braking. Compressed air is received from air-reservoir 56 (FIG. 1) into secondary cylinders, where it is subjected to partial expansion and displaced into medium-pressure manifold 46 (FIG. 1). Primary cylinders receive partially expanded air from medium-pressure manifold 46, subject it to the second stage of expansion, and exhaust it into the atmosphere. Work performed by compressed air on the engine pistons drives the engine crankshaft and propels the vehicle. In this way, the energy previously accumulated during compression braking is transformed back into kinetic energy of the moving vehicle.

FIGS. 10A to 10D illustrate a typical first propulsion mode process taking place in one of the secondary cylinders.

It is described as applied to cylinder 13 (FIG. 10B), but, with proper shift in timing, it takes place in all secondary engine cylinders. Arrows in the diagrams show the directions of crankshaft rotation and piston motion, as well as the motion of air into and out of the cylinder chamber. Each downstroke of the piston is a volume-increasing stroke, and each upstroke is a volume-decreasing stroke. First valve 20 and fourth valve 25 are deactivated. The process can be considered consisting of four steps: intake, expansion, exhaust into the medium-pressure manifold, and residual air compression. Each four-step process is completed within a single engine revolution.

Figure 10A:
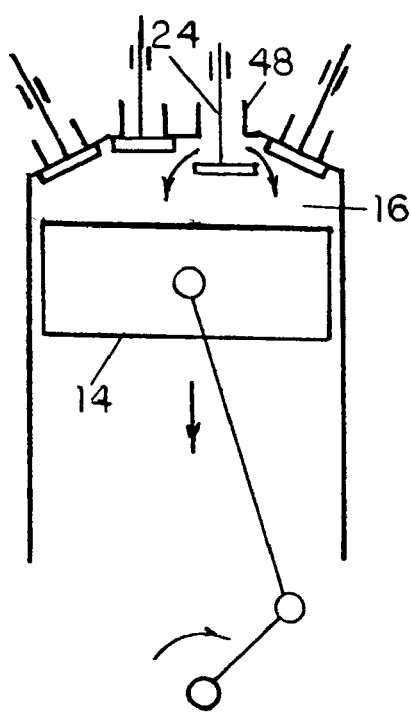
FIGS. 10A to 10D are schematic diagrams providing step-by-step illustrations of the secondary cylinder operation when it performs the first expansion, in accordance with the first propulsion mode in the preferred embodiment of the present invention.

FIG. 10A illustrates the first step, the intake. Third valve 24 is open while the other valves remain closed. Piston 14 moves downward, and cylinder chamber 16 is charged with compressed air flowing through third port 48 and open third valve 24 into an expanding volume of cylinder chamber 16. The air comes to third port 48 from air-reservoir 56 (FIG. 1) through duct 54 (FIG. 1), high-pressure manifold 52 (FIG. 1), and third passage 50 (FIG. 1). The intake ends when third valve 24 closes. Timing of third valve 24 closure determines the volume of the compressed-air charge received into the cylinder.

Figure 10B:
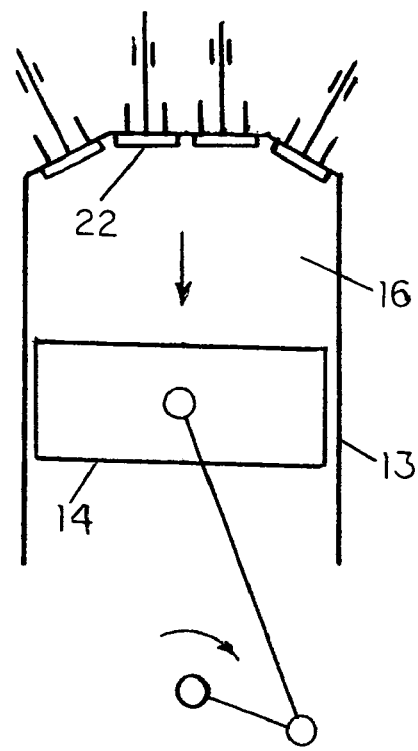

FIG. 10B illustrates the second step, the expansion. All valves in cylinder 13 are closed, and a downward motion of piston 14 expands the air-charge contained in cylinder chamber 16. This step ends when second valve 22 opens, preferably when pressure in cylinder chamber 16 drops to the level of pressure in medium-pressure manifold 46 (FIG. 1).

Figure 10C:
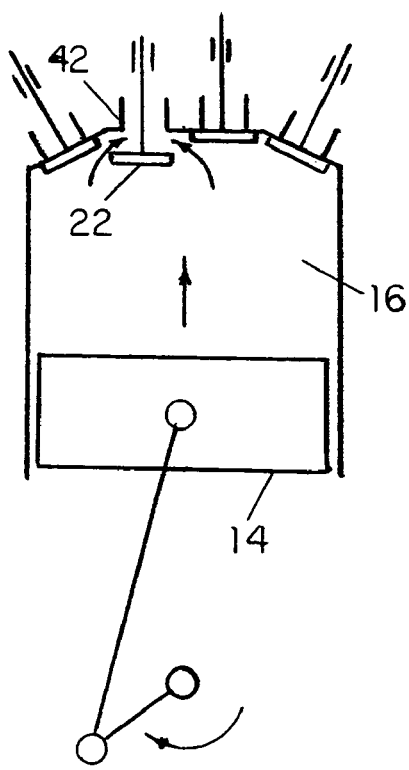

FIG. 10C is a diagram illustrating the next step, the exhaust into medium-pressure manifold 46 (FIG. 1). Piston 14 moves upward. Second valve 22 is open while the other valves remain closed, and an upward motion of piston 14 displaces air from cylinder chamber 16 through second valve 22, second port 42, and second passage 44 (FIG. 1) into medium-pressure manifold 46. The exhaust ends when second valve 22 closes. Timing of second valve 22 closure determines the volume of the air-charge exhausted into medium-pressure manifold 46.

Figure 10D:
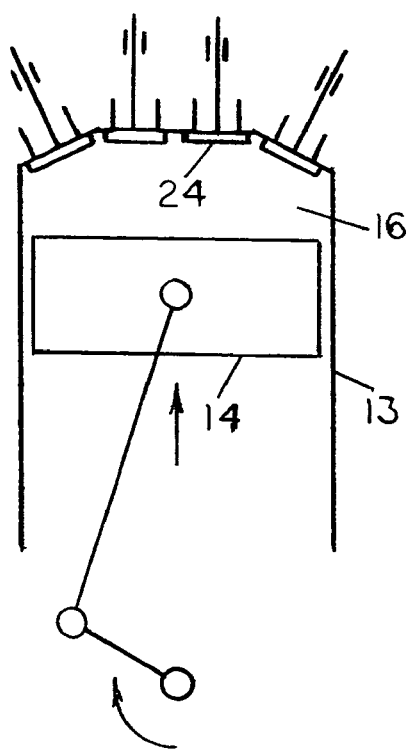

FIG. 10D illustrates the last step, the residual air compression. All valves in cylinder 13 are closed, and an upward motion of piston 14 compresses the remnants of the air-charge left in cylinder chamber 16 after the previous step. This step ends when third valve 24 opens, preferably when the pressure in cylinder chamber 16 increases to the level of pressure in high-pressure manifold 52.

A similar process takes place in the primary cylinders, where the air, previously expanded in the secondary cylinders, is subjected to additional expansion and exhausted into the atmosphere. FIGS. 11A to 11D illustrate a typical first propulsion mode process taking place in one of the primary cylinders. It is described as applied to cylinder 12 (FIG. 11B), but, with proper shift in timing, it takes place in all primary engine cylinders. Arrows in the diagrams show the directions of crankshaft rotation and piston motion, as well as the motion of air into and out of the cylinder chamber. Each downstroke of the piston is a volume-increasing stroke, and each upstroke is a volume-decreasing stroke. First valve 20 and third valve 24 are deactivated. The process can be considered consisting of four steps: intake, expansion, exhaust into the low-pressure manifold, and residual air compression. Each four-step process is completed within a single engine revolution.

Figure 11A:
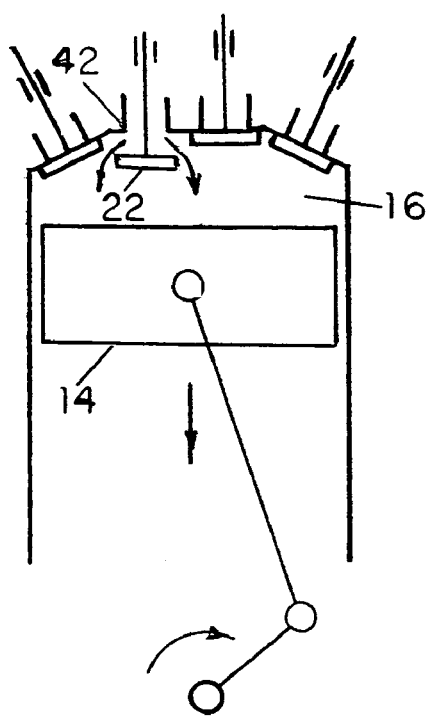
FIGS. 11A to 11D are schematic diagrams providing step-by-step illustrations of the primary cylinder operation when it performs the second expansion, in accordance with the first propulsion mode in the preferred embodiment of the present invention.

FIG. 11A illustrates the first step, the intake. Second valve 22 is open while the other valves remain closed. Piston 14 moves downward, and cylinder chamber 16 is charged with compressed air flowing through second port 42 and open second valve 22 into an expanding volume of cylinder chamber 16. The air comes to second port 42 from medium-pressure manifold 46 (FIG. 1) through second passage 44 (FIG. 1). Cylinder charging ends when second valve 22 closes. Timing of second valve 22 closure determines the volume of the compressed-air charge received into the cylinder.

Figure 11B:
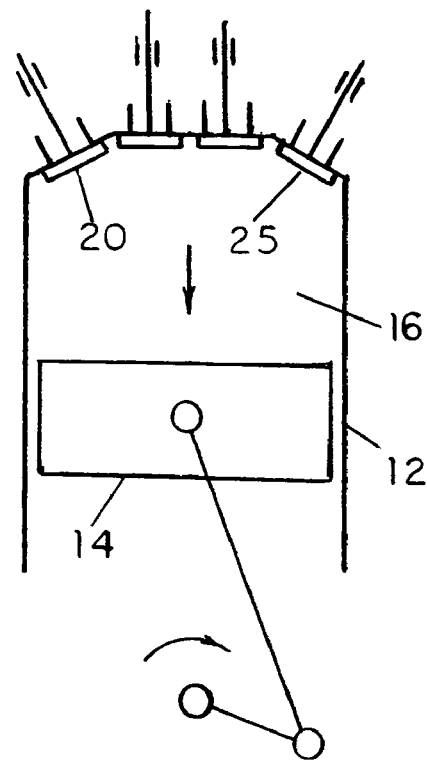

FIG. 11B illustrates the second step, the expansion. All valves in cylinder 12 are closed, and a downward motion of piston 14 expands the air-charge contained in cylinder chamber 16. This step ends when fourth valve 25 opens, preferably when pressure in cylinder chamber 16 drops to the level of pressure in exhaust manifold 51.

Figure 11C:
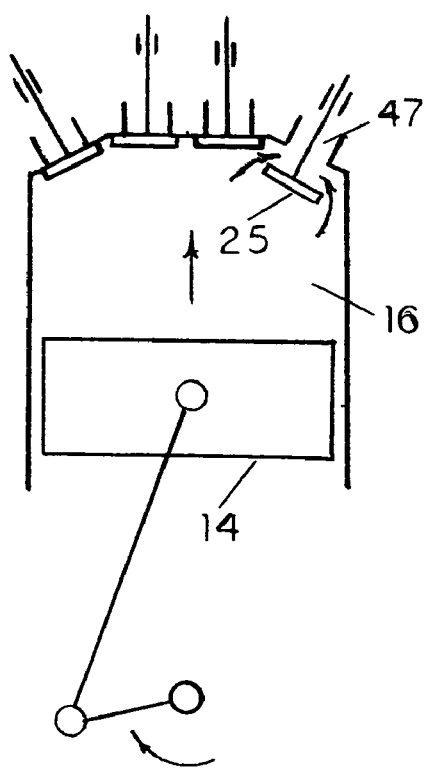

FIG. 11C is a diagram illustrating the next step, the exhaust into exhaust manifold 51 (FIG. 1). Piston 14 moves upward. Fourth valve 25 is open while the other valves remain closed, and an upward motion of piston 14 displaces air from cylinder chamber 16 through fourth valve 25, fourth port 47 (FIG. 1), and fourth passage 49 (FIG. 1) into exhaust manifold 51. The exhaust ends when fourth valve 25 closes. Timing of fourth valve 25 closure determines the volume of the air-charge exhausted into exhaust manifold 51.

Figure 11D:
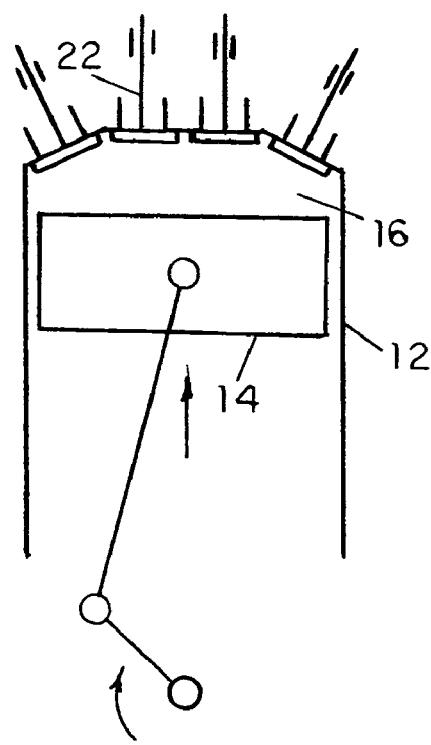

FIG. 11D illustrates the last step, the residual air compression. All valves in cylinder 12 are closed, and an upward motion of piston 14 compresses the remnants of the air-charge left in cylinder chamber 16 after the previous step. This step ends when second valve 22 opens, preferably when the pressure in cylinder chamber 16 increases to the level of pressure in medium-pressure manifold 46.

Control system 70 (FIG. 2) is programmed to control the first propulsion mode in a manner which assures that the process generates a propulsion force of required magnitude, as determined by the magnitude of the signal generated by sensor 92 (FIG. 2). The magnitude of the propulsion force increases or decreases with an increase or a decrease, respectively, in the net positive work-per-cycle performed on the piston in each of the engine cylinders. It also depends on frequency with which the cycles are repeated, and therefore it increases or decreases with an increase or a decrease, respectively, in the transmission ratio. Thus, the propulsion force can be varied by varying the work-per-cycle, or by varying the transmission ratio, or by varying both.

Thanks to operational flexibility offered by ability to quickly activate and deactivate the engine valves, the frequency of the cycles repetition can also be reduced, whenever needed, by selectively omitting some of the cycles. For example, the cycle can be performed once every other engine revolution, while during the in-between-cycle revolutions the valves are deactivated. This reduces the propulsion force in half, without any change in the work-per-cycle and the transmission ratio. Omission of some of the cycles is an additional method, which the control system can use to control the magnitude of the propulsion force.

The work-per-cycle in each cylinder is a function of the timing of the engine valves openings and closings. These timings control various parameters contributing to the amount of work-per-cycle performed, such as the quantity of air received into the cylinder chamber, the ratio of air expansion, the quantity of air displaced into the medium-pressure or low-pressure manifold, and the ratio of residual-air compression.

In the secondary cylinders, changing the timing of third valve 24 closing varies the quantity of air received from high-pressure manifold 52. Changing the timing of second valve 22 opening varies the air-expansion ratio. Changing the timing of second valve 22 closing varies the quantity of compressed air displaced into medium-pressure manifold 46. Changing the timing of third valve 24 opening varies the residual-air compression ratio.

In the primary cylinders, changing the timing of second valve 22 closing varies the quantity of compressed air received from medium-pressure manifold 46. Changing the timing of fourth valve 25 opening varies the second stage expansion ratio. Changing the timing of fourth valve 25 closing varies the quantity of air exhausted into exhaust manifold 51. Changing the timing of second valve 22 opening varies the residual-air compression ratio.

Control system 70 (FIG. 2) controls and varies the propulsion force, produced by first propulsion mode, by varying any, some, or all of the above valve timings and the transmission ratio according to a program contained in the control system software. In vehicles with manual transmission control, it is the vehicle driver who varies the transmission ratio.

Figure 12:
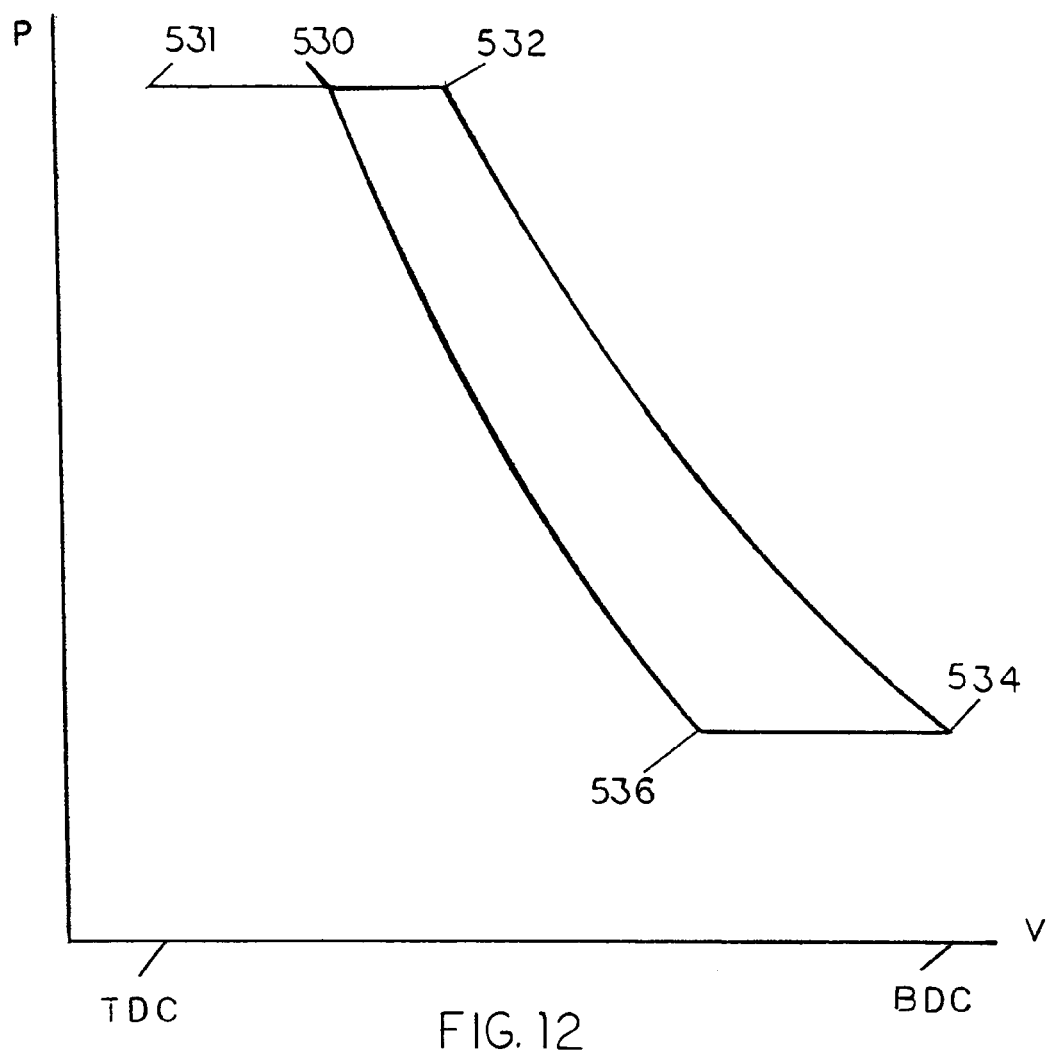
FIG. 12 is a pressure-volume diagram illustrating the secondary cylinder operation, as shown in FIGS. 10A to 10D.
Figure 13:
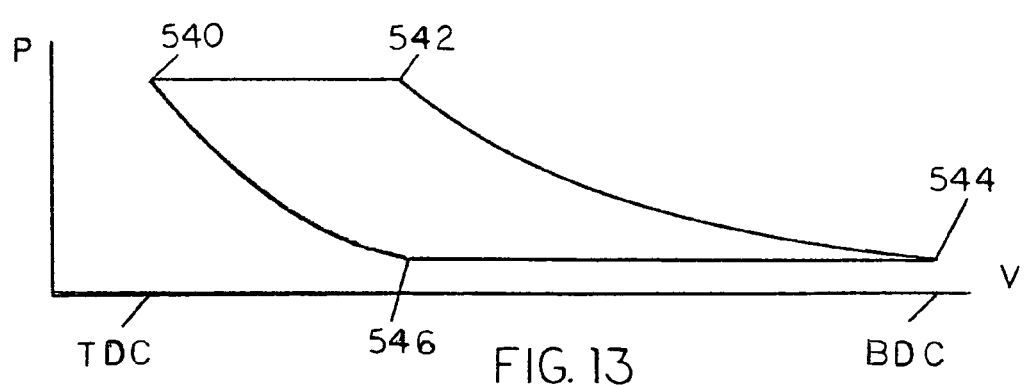
FIG. 13 is a pressure-volume diagram illustrating the primary cylinder operation, as shown in FIGS. 11A to 11D.

FIGS. 12 and 13 illustrate typical idealized pressure-volume diagrams of the first propulsion mode. Their shape is similar to the shape of compression braking diagrams, but the sequence and the nature of events is reversed.

A typical pressure-volume diagram of the first propulsion mode cycle taking place in one of the secondary engine cylinders is shown in FIG. 12. Third valve 24 (FIG. 10A) opens at a variable point 530 that is still before the top-dead-center, and later closes at a variable point 532 that is already after the top-dead-center. From point 530 to a point 531 (at top-dead-center), the engine piston is still on its upstroke, and some of the air is displaced from cylinder chamber 16 (FIG. 10A) into high-pressure manifold 52 (FIG. 1). From point 531 to point 532, the engine piston is on its downstroke, and, during this period, compressed air is received from high-pressure manifold 52 into cylinder chamber 16 at approximately constant pressure. This is necessary whenever the net volume of air that has to be received from high-pressure manifold 52 is less than the volume of the cylinder clearance volume, and also to provide a sufficient time period between points 530 and 532 to perform an effective opening and closing of third valve 24. The above-described part of the diagram corresponds to what is shown in FIG. 10A.

In the next period, from point 532 to a variable point 534 all valves are closed, and the air-charge is expanded until its pressure becomes equal to pressure in medium-pressure manifold 46 (FIG. 1). This takes place during a second part of the volume-increasing stroke and corresponds to FIG. 10B.

At point 534, second valve 22 (FIG. 10C) opens and remains open until its closure at a point 536. From point 534 to point 536, air is displaced from cylinder chamber 16 into medium-pressure manifold 46 at nearly constant pressure. This period takes place during a first part of the volume-decreasing stroke and corresponds to FIG. 10C.

From point 536 to point 530 all valves are closed, and the fraction of the air-charge, left in cylinder chamber 16, is compressed, preferably until its pressure becomes equal to the pressure in air-reservoir 56 (FIG. 1) at point 530. This period takes place during a second part of the volume-decreasing stroke and corresponds to FIG. 10D.

A typical pressure-volume diagram of the first propulsion mode cycle taking place in one of the primary engine cylinders is shown in FIG. 13. Second valve 22 (FIG. 11A) opens at a variable point 540 and later closes at a variable point 542. During this period, air is received from medium-pressure manifold 46 into cylinder chamber 16 (FIG. 11A) at approximately constant pressure. This period, which takes place during a first part of the volume-increasing stroke, corresponds to what is shown in FIG. 11A.

From point 542 to a variable point 544 all valves are closed, and the air-charge expands until its pressure becomes equal to pressure in exhaust manifold 51 (FIG. 1). This takes place during a second part of the volume-increasing stroke and corresponds to FIG. 11B.

At point 544 fourth valve 25 (FIG. 11C) opens and remains open until its closure at a point 546. From point 544 to a point 546, air is displaced from cylinder chamber 16 into exhaust manifold 51 (FIG. 1) at nearly constant pressure. This period takes place during a first part of the volume-decreasing stroke and corresponds to FIG. 11C.

From point 546 to point 540 all valves are closed, and the fraction of the air-charge, left in the cylinder chamber, is compressed, preferably until its pressure becomes equal to pressure in medium-pressure manifold 46. This period takes place during a second part of the volume-decreasing stroke and corresponds to FIG. 11D.

Net positive work performed in a primary cylinder during the above described cycle is equal to displacement work performed from point 540 (FIG. 13) to point 542, plus expansion work performed from point 542 to point 544, and minus compression work performed from point 546 to point 540. Net positive work performed in a secondary cylinder during the above described cycle is equal to displacement work performed from point 530 (FIG. 12) to point 532, plus expansion work performed from point 532 to point 534, minus displacement work performed from point 534 to point 536, and minus compression work preformed from point 536 to point 530.

A preferred method of controlling the work-per-cycle, during first propulsion mode, is by controlling the expansion work. Control system 70 (FIG. 2) can vary the expansion work, in a primary cylinder, by varying the timing of second valve 22 closure (point 542, FIG. 13), or the timing of fourth valve 25 opening (point 544), or the timing of both. Varying the timing of point 542 varies the quantity of air received into the cylinder. Varying the timing of point 546 varies the maximum pressure to which the residual air-charge is compressed. The expansion work performed in a secondary cylinder can be varied by varying the timing of third valve 24 closure (point 532, FIG. 12) relative to the timing of its opening (point 530), or the timing of second valve 22 opening (point 534), or the timing of both. Varying the timing of point 532 varies the quantity of air received into the cylinder. Varying the timing of point 536 varies the maximum pressure to which the residual air-charge is compressed.

Pressure in air-reservoir 56 (FIG. 1) decreases with every first propulsion mode cycle. Since each air-charge, received into a secondary cylinder, must be expanded, preferably, to a pressure equal to the pressure in medium-pressure manifold 46 (FIG. 1); control system 70 (FIG. 2) adjusts the required level of expansion in each secondary cylinder for every cycle. If necessary, the air, in the secondary cylinder, may be expanded to a pressure higher than that in medium-pressure manifold 46. This would result in a wasteful blowdown into the medium-pressure manifold, but it would also increase the work-per-cycle. The conditions that prevail in medium-pressure manifold 46 vary, since it receives air from secondary cylinders and discharges it into primary cylinders. There, the pressure may increase or decrease, depending on whether the outflow of air is smaller or greater than the inflow. Control system 70 adjusts the required level of expansion in each primary cylinder, up or down for every cycle, to assure that the air-charge is expanded to a pressure that, preferably, is equal to the pressure in exhaust manifold 51. However, if necessary, the air may be expanded to a pressure higher than that in exhaust manifold 51. This would result in a wasteful blowdown into the exhaust manifold, but it would also increase the work-per-cycle.

Using two stages of expansion offers a significant advantage, in terms of achievable acceleration torque, over a single-stage expansion used in an air-motor mode described in U.S. Pat. No. 6,223,846B1. At equal engine size, the peak positive acceleration torque can be much higher. The increase in peak acceleration torque is due to the fact that, at a comparable compression ratio, the positive work-per-cycle performed during the first stage of expansion is much greater than the work-per-cycle performed during the second stage. This means that an engine using two stages of expansion can produce a greater torque than an engine using only one stage of expansion. Greater torque is an important advantage when the vehicle is accelerated from zero speed.

In the above-described first propulsion mode, the engine operates as a two-stage air motor.

However, the same engine can also operate as a single-stage air motor, and, in some instances, it may be sensible to operate it in that way. For example, if the pressure in air-reservoir 56 (FIG. 1) were very low, using two-stage expansion would be inefficient. In that case, the engine can operate as a single-stage air motor. In a single-stage first propulsion mode, there is no division on primary and secondary cylinders. All engine cylinders receive air from air-reservoir 56, expand it, and displace it into outside atmosphere, bypassing medium-pressure manifold 46 (FIG. 1). The process is, essentially, the same as in the previously described second stage of expansion in primary cylinders. Therefore FIG. 13 can be used to illustrate the single-stage first propulsion mode. The only difference is that, at points 542 (FIG. 13), it is third valve 24 (rather than second valve 22) that opens and connects cylinder chamber 16 (FIG. 1) to high-pressure manifold 52 (FIG. 1).

The above description of first propulsion mode emphasized an engine operating as a two-stage air motor. However, those skilled in art will appreciate that, with some modifications, the engine can also operate as a multi-stage air motor using three or a greater number of expansion stages. While two expansion stages are likely to be sufficient in most cases, the possibility of using a greater number of expansion stages should not be precluded and should remain the prerogative of the system designer.

SECOND PROPULSION MODE—In the second propulsion mode, as in the case of the first propulsion mode, the engine cylinders can be divided into two types: secondary cylinders that perform a first stage of air expansion, and primary cylinders that perform a second stage of air or gas expansion. Each secondary engine cylinder operates as an air motor receiving compressed air from high-pressure air-reservoir 56 (FIG. 1), partially expanding it inside the cylinder, and exhausting it into medium-pressure manifold 46 (FIG. 1). This operation is identical to the operation of secondary cylinders in the above-described first propulsion mode and can be illustrated by FIGS. 10A to 10D and FIG. 12.

In the primary cylinders, the second propulsion mode involves performance of a four-stroke hybrid cycle, during which the cylinder operates both as an air-motor and as an internal combustion engine. In this mode of operation, compressed air is received into the cylinders from medium-pressure manifold 46. The compressed-air charge expands in each primary cylinder and performs work displacing the piston during a first volume-increasing stroke. Then the same air-charge is used in an internal combustion process, and expanding combustion gas performs additional work on the piston during a second volume-increasing stroke. Thus each four-stroke cycle includes two power strokes, one with compressed air and another one with combustion gas.

FIGS. 14A to 14F illustrate a typical second propulsion mode cycle taking place in a primary cylinder. It is described as applied to cylinder 12 (FIG. 14B), but, with proper shift in timing, it takes place in all the primary engine cylinders. Arrows in the diagrams show the directions of crankshaft rotation and piston motion, as well as motion of air into and exhaust gas out of the cylinder. Each downstroke of the piston is a volume-increasing stroke, and each upstroke is a volume-decreasing stroke. First valve 20 and third valve 24 are deactivated. The process can be considered consisting of six steps: cylinder charging, air expansion, compression and ignition, gas expansion, exhaust, and residual gas retention. Each six-step cycle is completed within two engine revolutions.

Figure 14A:
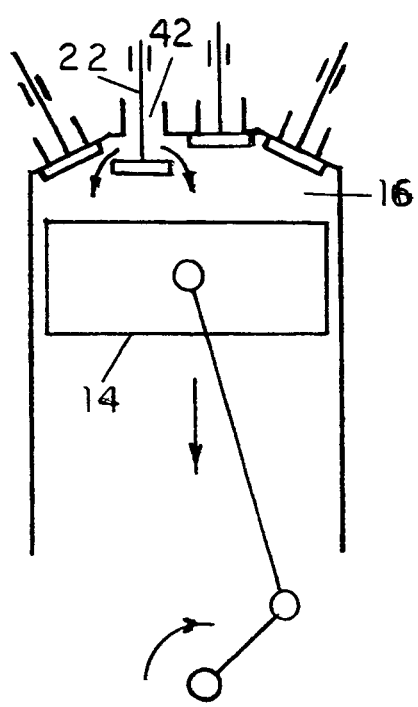

FIG. 14A is a diagram illustrating the first step—the cylinder charging. Second valve 22 is open while the other valves remain closed. Piston 14 moves downward, and cylinder chamber 16 is charged with compressed air flowing through second port 42 and open second valve 22 into an expanding volume of cylinder chamber 16. The air comes to second port 42 from medium-pressure manifold 46 (FIG. 1) through second passage 44 (FIG. 1). Cylinder charging ends when second valve 22 closes. Timing of second valve 22 closure determines the volume of the compressed-air charge received into the cylinder.

Figure 14B:
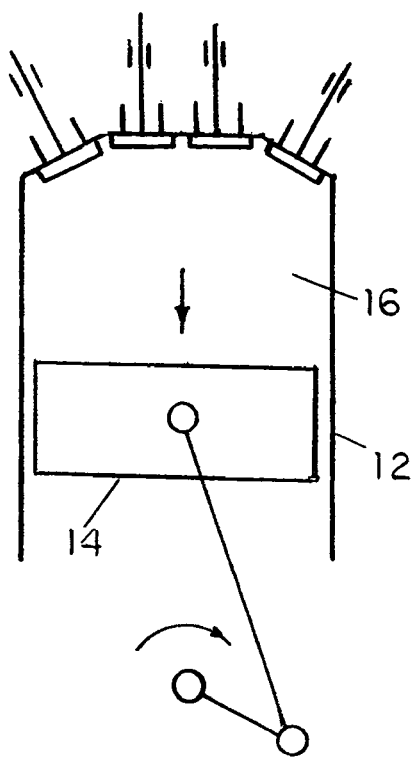

FIG. 14B illustrates the next step—the air expansion. All valves in cylinder 12 are closed, and a downward motion of piston 14 expands the air-charge trapped in cylinder chamber 16. The expansion ends when piston 14 reaches its bottom-dead-center position.

Figure 14C:
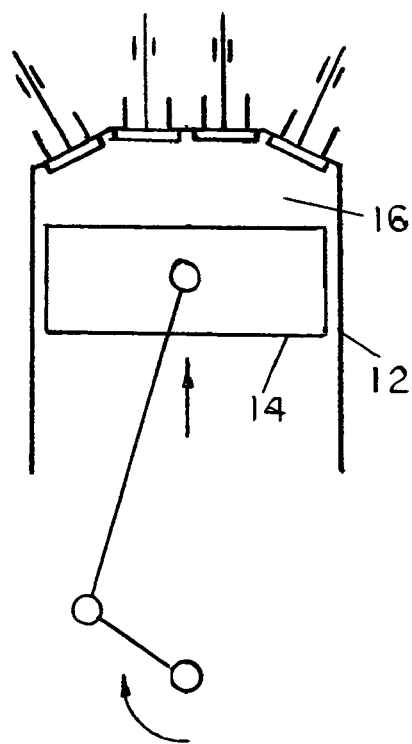

FIG. 14C illustrates the third step—compression and ignition. All valves in cylinder 12 remain closed, and an upward motion of piston 14 compresses the air-charge in cylinder chamber 16. Fuel is supplied into cylinder chamber 16 and is ignited, preferably before piston 14 reaches the top-dead-center. In spark-ignition engines fuel can be injected even before the bottom-dead-center. In some variants, fuel can be added to the air before the latter enters the cylinder.

Figure 14D:
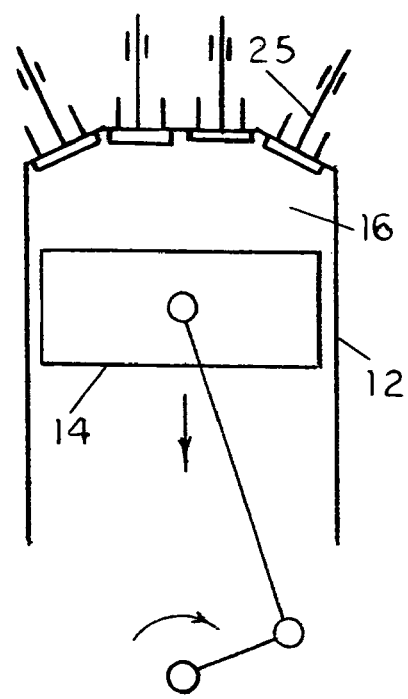

FIG. 14D illustrates the fourth step—the gas expansion. All valves in cylinder 12 remain closed. The air-fuel mixture burns in cylinder chamber 16, and the gaseous products of combustion expand, performing useful work on the downward moving piston 14. Expansion continues until fourth valve 25 opens.

FIG. 14E illustrates the next step—the exhaust. Fourth valve 25 is open while the other valves remain closed, and an upward motion of piston 14 expels the products of combustion, the combustion gas, from cylinder chamber 16 through the opened fourth valve 25 and exhaust port 47. From there, the gas flows through exhaust passage 49 (FIG. 1) into exhaust manifold 51 (FIG. 1). The exhaust ends when fourth valve 25 closes.

FIG. 14F illustrates the last step—the residual gas retention. Fourth valve 25 has closed before piston 14 reached the top-dead-center, and a certain quantity of combustion gas, the residual gas, remains trapped in cylinder chamber 16. This gas is needed to restrict production of harmful nitrogen oxide in the next cycle. Timing of fourth valve 25 closure determines the volume of residual gas retained in the cylinder. This step ends when second valve 22 opens, and then the same cycle is repeated again during the next two engine revolutions.

Control system 70 (FIG. 2) is programmed to control the second propulsion mode in a manner that assures that the process generates a propulsion force of required magnitude, as determined by the magnitude of the signal generated by sensor 92 (FIG. 2). The magnitude of the propulsion force increases or decreases with an increase or a decrease, respectively, in the net positive work-per-cycle performed on the piston in each of the engine cylinders. It also depends on frequency with which the cycles are repeated, and therefore it increases or decreases with an increase or a decrease, respectively, in the transmission ratio. Thus, the propulsion force can be varied by varying the work-per-cycle, or by varying the transmission ratio, or by varying both.

Two key contributors to the work-per-cycle are work performed by compressed air and work performed by combustion gas. Work performed by compressed air is a function of the timings of third valve 24 and second valve 22 opening and closing, which determine the quantity of air received from air-reservoir 56 (FIG. 1) into the secondary cylinders, and from medium-pressure manifold 46 (FIG. 1) into the primary cylinders. Work performed by combustion gas depends on the quantity of fuel added to the air in the cylinder. Thus, the work-per-cycle can be varied by varying five parameters: timings of third valve 24 opening and closing, timing of second valve 22 opening and closing, and the quantity of fuel added to the air-charge. Control system 70 (FIG. 2) controls the propulsion force by varying any, some, or all of the above parameters, and by varying the transmission ratio according to a program contained in the control system software. In vehicles with manual transmission control, it is the vehicle driver who varies the transmission ratio.

Figure 15:
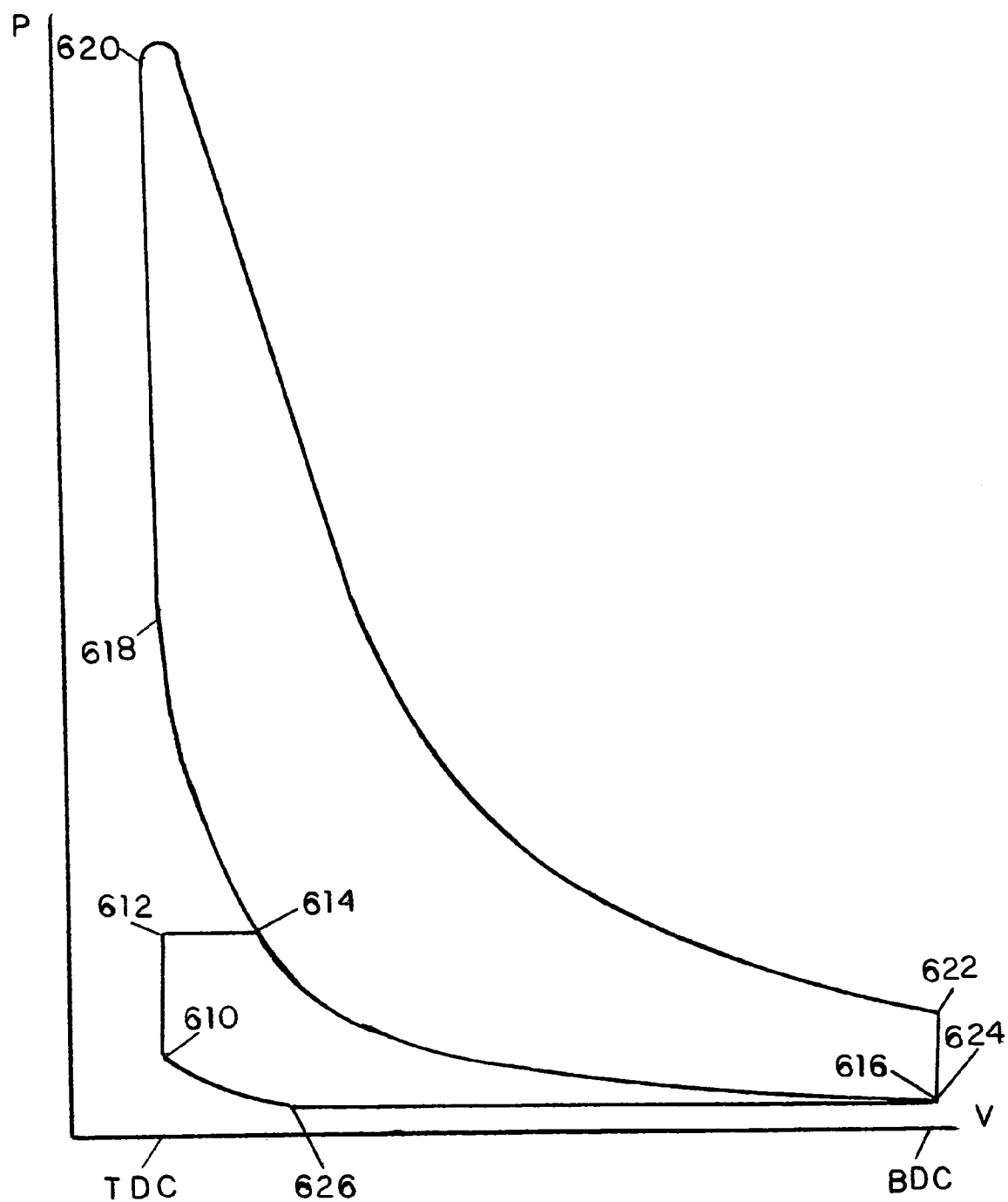
FIG. 15 is a pressure-volume diagram illustrating the primary cylinder operation, as shown in FIGS. 14A to 14F.

A typical idealized pressure-volume diagram of the second propulsion mode cycle performed in a primary cylinder is shown in FIG. 15. Second valve 22 (FIG. 14A) opens at a point 610, and the pressure in the cylinder increases to the level of pressure in medium-pressure manifold 46 (FIG. 1), which corresponds to a point 612. A preferred timing of second valve 22 opening is at the top-dead-center. From point 612 to a point 614 piston 14 (FIG. 14A) is displaced by a nearly constant air-pressure in cylinder chamber 16 (FIG. 14A). There is only a relatively small drop in pressure associated with expansion of air in medium-pressure manifold 46. This period takes place during a first part of a first volume-increasing stroke and corresponds to what is shown in FIG. 14A.

At point 614, second valve 22 closes, and from point 614 to a point 616, which is at the bottom-dead-center, the air-charge in cylinder chamber 16 expands. This takes place during a second part of the first volume-increasing stroke and corresponds to FIG. 14B.

From point 616 to a point 618 the cylinder charge is compressed, and from point 618 to a point 620 heat generated by combustion increases its pressure at nearly constant volume. This period takes place during a first volume-decreasing stroke and corresponds to FIG. 14C.

From point 620 to a point 622 combustion is completed, and the expanding combustion gas displaces piston 14 until it reaches its bottom-dead-center at point 622. This takes place during a second volume-increasing stroke and corresponds to FIG. 14D.

Fourth valve 25 (FIG. 14E) opens at or shortly before the bottom-dead-center, and the pressure in the cylinder drops to a level equal to the pressure in exhaust manifold, as shown at a point 624 (it coincides with point 616 in the diagram). From point 624 to a point 626 combustion gas is expelled from cylinder chamber 16 through the open fourth valve 25 (FIG. 14E). This period takes place during a first part of a second volume-decreasing stroke and corresponds to FIG. 14E.

At point 626, fourth valve 25 closes, and from point 626 to point 610 all valves are closed, and residual-gas compression takes place. This takes place during a second part of the second volume-decreasing stroke and corresponds to FIG. 14F.

Net positive work performed during the above described cycle is equal to displacement work performed from point 612 to point 614, plus expansion work performed from point 614 to point 616, minus compression work performed from point 616 to point 618, plus expansion work performed from point 620 to point 622, and minus compression work performed from point 626 to point 610. It is assumed here that negative exhaust work from point 624 to point 626 is negligibly small.

The above-described four-stroke cycle is just a typical example of a primary cylinder operation in the second propulsion mode. Those skilled in art will appreciate that other variants of that cycle, with other sequences of events can be used for such operation. For example, instead of closing second valve 22 at point 614 (FIG. 15) during the downstroke of piston 14, closure of the second valve 22 can be delayed until the piston returns to the same position during its upstroke. The volume of air received into the engine cylinder is determined by the position of the piston in the cylinder at the time of the second valve 22 closure, regardless of whether this position was reached during the downstroke or during the upstroke of the piston.

Another important variant of the primary cylinder operation involves supercharging cylinder chamber 16 with an increased quantity of compressed air by retarding the timing of second valve 22 closure at point 614 (FIG. 15). This increases the pressure at point 616 (FIG. 15) to a level higher than atmospheric pressure. Greater quantity of air trapped in the cylinder enables burning more fuel, which increases the peak power of the engine.

The fact that the above described four-stroke cycle includes two power strokes, one with compressed air and another with combustion gas, is a significant advantage over a conventional four-stroke internal combustion cycle including only one power stroke. Work performed by compressed air during one power stroke is added to work performed by combustion gas during a second power stroke. This reduces the work that the combustion gas must perform and, thus, reduces the quantity of fuel required. Since work performed by compressed air represents energy that was previously saved, a substantial reduction in fuel consumption is achieved.

Another important advantage of using stored compressed air to perform some of the engine work is that it reduces the peak temperature in engine cylinders during compressed-air-assisted combustion. This leads to a reduction in the amount of nitrogen oxide produced, which is an important improvement in harmful exhaust emission.

An additional advantage of the above-described four-stroke cycle is its ability to trap a variable and controllable quantity of residual gas in each primary engine cylinder at the end of the second volume-decreasing stroke. Retention of residual gas contributes to a reduction in harmful nitrogen oxide emission and eliminates the need for exhaust gas recirculation systems used for the same purpose in conventional internal combustion engines. This leads to a substantial reduction in costs.

Since the secondary cylinders receive compressed air directly from the air-reservoir 56 (FIG. 1), where the pressure is very high most of the time, and they complete the cycle once every engine revolution (as opposed to once every two revolutions in primary cylinders), they can produce peak torque equal or greater in magnitude than what the primary cylinders can produce. The additional work performed by compressed air in both the primary and the secondary cylinders increases the magnitude of the peak torque that can be produced by the engine. An increase in the peak engine torque and power, without an increase in engine displacement, creates an opportunity for a reduction in engine size (smaller engine displacement). This is a significant advantage, since a smaller engine consumes less fuel during part-load operation.

THIRD PROPULSION MODE—In the third propulsion mode, as in the case of the first propulsion mode, the engine cylinders can be divided into two types: secondary cylinders that perform air expansion, and primary cylinders that perform gas expansion. Each secondary engine cylinder operates as an air motor receiving compressed air from high-pressure air-reservoir 56 (FIG. 1), partially expanding it inside the cylinder, and exhausting it into medium-pressure manifold 46 (FIG. 1). This operation is identical to the operation of secondary cylinders in the above-described first propulsion mode and can be illustrated by FIGS. 10A to 10D and FIG. 12.

In the primary cylinders, the third propulsion mode involves performance of a two-stroke hybrid cycle, during which the cylinder operates as a two-stroke internal combustion engine with a compressed-air assist. In this mode of operation, compressed air is received into the cylinders from medium-pressure manifold 46 and subjected to additional compression during a part of the piston volume-decreasing stroke. Fuel is added to the air-charge, and the air-fuel mixture is ignited, preferably before the piston reaches the top-dead-center. Combustion and combustion gas expansion takes place during a volume-increasing stroke of the piston, followed by exhaust during an early part of the volume-decreasing stroke of the piston preceding the compressed air intake. An entire cycle in each engine cylinder is completed during a single engine revolution.

FIGS. 16A to 16D illustrate a typical third propulsion mode cycle taking place in a primary cylinder. It is described as applied to cylinder 12 (FIG. 16A), but, with or without a shift in timing, it takes place in all the primary engine cylinders. Arrows in the diagrams show the directions of crankshaft rotation and piston motion, as well as motion of air into and exhaust gas out of the cylinder. Each downstroke of the piston is a volume-increasing stroke, and each upstroke is a volume-decreasing stroke. First valve 20 and third valve 24 are deactivated. The process can be considered consisting of four steps: cylinder charging, compression and ignition, gas expansion, and exhaust. Each four-step cycle is completed within one engine revolution.

Figure 16A:
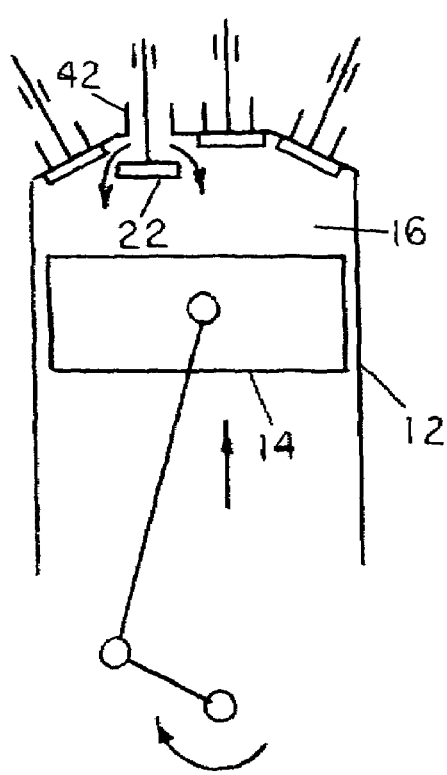
FIGS. 16A to 16D are schematic diagrams providing step-by-step illustrations of the primary cylinder operation when it performs the combustion, in accordance with the third propulsion mode in the preferred embodiment of the present invention.

FIG. 16A is a diagram illustrating the first step—the cylinder charging. Second valve 22 is open while the other valves remain closed. Piston 14 moves upward, and cylinder 12 is charged with compressed air flowing through second port 42 and open second valve 22 into a shrinking volume of cylinder chamber 16. The air comes to charging port 42 from medium-pressure manifold 46 (FIG. 1) through second passage 44 (FIG. 1). Inside cylinder chamber 16, the air is mixed with residual exhaust-gas. Cylinder charging ends when second valve 22 closes.

Figure 16B:
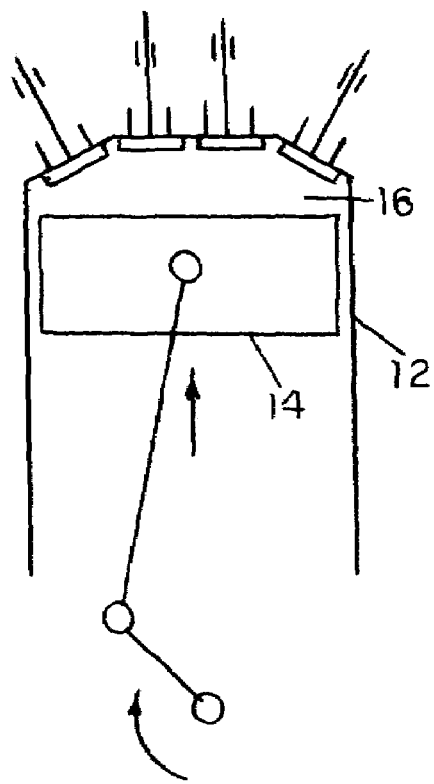

FIG. 16B illustrates the next step—compression and ignition. All valves in cylinder 12 are closed, and an upward motion of piston 14 compresses the mixture of air and residual gas. Fuel is added to the mixture of air and residual gas in cylinder chamber 16 and is ignited, preferably, before piston 14 reaches the top-dead-center.

Figure 16C:
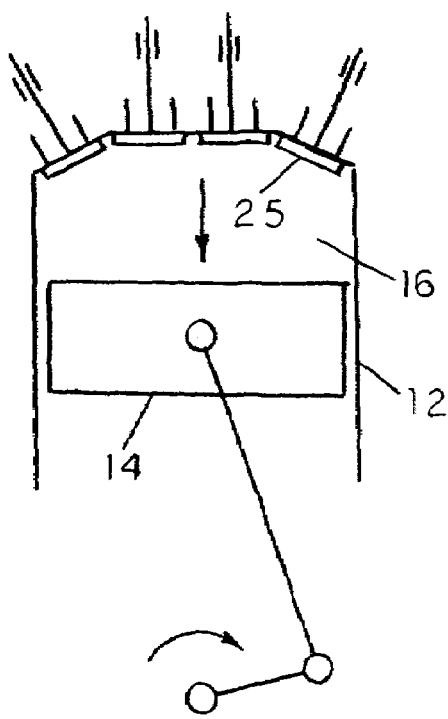

FIG. 16C illustrates the third step—the gas expansion. All valves in cylinder 12 remain closed. The air-fuel mixture in cylinder chamber 16 burns, and the gaseous products of combustion expand, performing useful work on the downward moving piston 14. Expansion continues until fourth valve 25 opens.

Figure 16D:
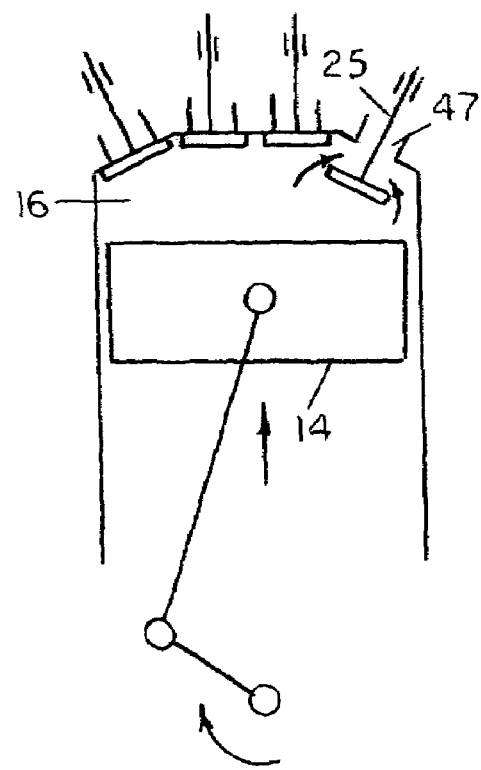

FIG. 16D illustrates the last step—the exhaust. Fourth valve 25 is open while the other valves remain closed, and an upward motion of piston 14 expels the products of combustion from cylinder chamber 16 through the open fourth valve 25, exhaust port 47, and exhaust passage 49 (FIG. 1) into exhaust manifold 51 (FIG. 1). This step precedes the first step of the next cycle, which takes place during the same piston stroke. The exhaust ends when fourth valve 25 closes.

Control system 70 (FIG. 2) controls the third propulsion mode in the same way as the second propulsion mode. The factors affecting the magnitude of the propulsion force are the same as in the case of the second propulsion mode. The propulsion force increases or decreases with an increase or a decrease, respectively, in the net positive work-per-cycle, and with an increase or a decrease, respectively, in the transmission ratio. As in the second propulsion mode, the work-per-cycle can be varied by varying five parameters: timing of third valve 24 opening and closing, timing of second valve 22 opening and closing, and the quantity of fuel added to the air-charge. Control system 70 (FIG. 2) controls the propulsion force by varying any, some, or all of the above parameters and by varying the transmission ratio according to a program contained in the control system software. In vehicles with manual transmission control, it is the vehicle driver who varies the transmission ratio.

Figure 17:
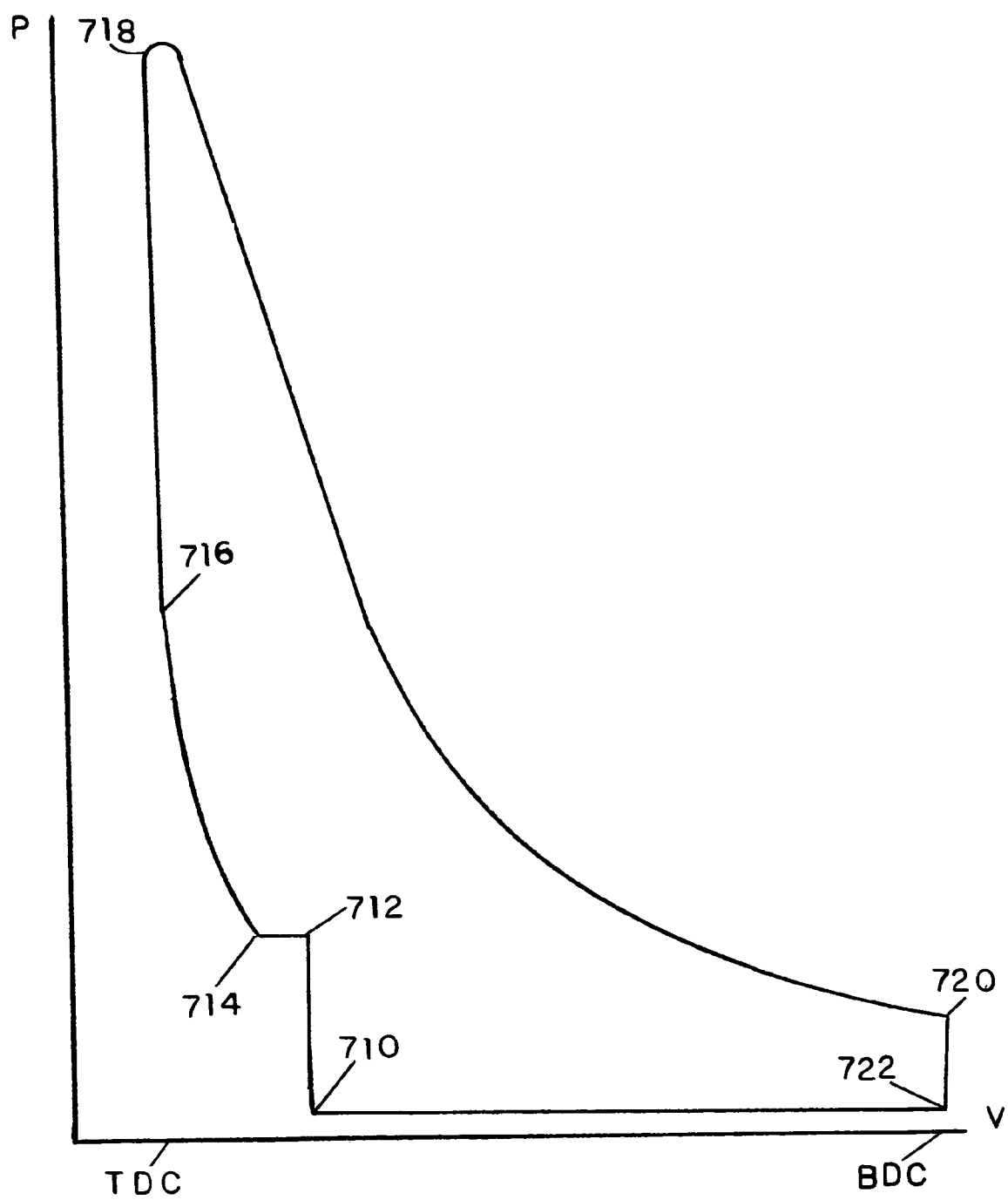
FIG. 17 is a pressure-volume diagram illustrating the primary cylinder operation, as shown in FIGS. 16A to 16D.

A typical idealized pressure-volume diagram of the third propulsion mode cycle, performed in a primary cylinder, is shown in FIG. 17. Second valve 22 (FIG. 16A) opens at a point 710, and the pressure in the cylinder increases to the level of pressure in medium-pressure manifold 46 (FIG. 1) during an upstroke of piston 14 (FIG. 16A), which corresponds to a point 712. From point 712 to a point 714 piston 14 moves against nearly constant pressure in cylinder chamber 16 (FIG. 16A). There is only a relatively small increase in pressure associated with compression of air in medium-pressure manifold 46. This takes place during a second part of the volume-decreasing stroke and corresponds to FIG. 16A.

At point 714, second valve 22 closes, from point 714 to a point 716 the cylinder charge is compressed, and from point 716 to a point 718 heat from combustion increases its pressure at nearly constant volume. This takes place during a third part of the volume-decreasing stroke and corresponds to FIG. 16B.

From point 718 to a point 720, combustion is completed, and the expanding combustion gas displaces piston 14 until it reaches its bottom-dead-center at point 720. This takes place during the volume-increasing stroke and corresponds to FIG. 16C.

Fourth valve 25 (FIG. 16D) opens at or shortly before the bottom-dead-center, and the pressure in the cylinder drops to nearly atmospheric pressure, as shown at a point 722. After point 722, upward motion of piston 14 (FIG. 16D) expels combustion gas from cylinder chamber 16 (FIG. 16D) through the open fourth valve 25 into exhaust manifold 51 (FIG. 1), until the valve closes. This takes place during a first part of the volume-decreasing stroke and corresponds to FIG. 16D. Timing of fourth valve 25 closure determines the quantity of residual gas retained in the cylinder. A preferred timing of fourth valve 25 closing coincides with the timing of second valve 22 (FIG. 16A) opening at point 710. From then on, the same cycle is repeated again during the next engine revolution.

The net positive work performed during the above described cycle is equal to expansion work performed from point 718 to point 720, minus displacement work performed from point 712 to point 714, and minus compression work performed from point 714 to point 716. It is assumed here that the exhaust work from point 722 to point 710 is negligibly small.

Charging each primary cylinder with compressed air during each volume-decreasing stroke reduces the amount of compression work required. This reduces the work, which the combustion gas must perform and, thus, reduces the quantity of fuel required. Since the work performed by compressed air represents energy, which was previously saved, a substantial reduction in fuel consumption is achieved.

Operation of primary cylinders can be switched from a four-stroke cycle (second propulsion mode) to a two-stroke cycle (third propulsion mode), or vice versa, simply by changing the sequence and frequency of operation of the engine valves, injectors, and spark plugs (when applicable). Such a change can be accomplished in one engine cycle. Ability to selectively switch the primary cylinders operation from a four-stroke cycle to a two-stroke cycle and back is an important advantage over conventional internal combustion engines, which, depending on their design, can operate only either as four-stroke, or as two-stroke engines. A switch from the four-stroke to the two-stroke cycle doubles the number of combustion events at a given engine speed, which leads to a significant step-up in engine torque and power. This is especially useful during acceleration from a low vehicle speed, when a sudden increase in torque is very desirable.

FOURTH PROPULSION MODE—The fourth propulsion mode involves repeated performance of a four-stroke cycle, during which the engine operates as a conventional four-stroke internal combustion engine. Second valves 22 and third valves 24 (FIG. 1) are deactivated, and air is received into the engine cylinders through first valves 20 (FIG. 1) from the outside atmosphere. Each cylinder receives its air-charge through open first valve 20 during a first volume-increasing stroke. Then, during a first volume-decreasing stroke, the air-charge is compressed, fuel is added to it, and the air-fuel mixture is ignited (in some other variants, fuel can be added to the air before it enters the cylinder). During a second volume increasing stroke the expanding combustion gas performs positive work on the piston, and during a second volume decreasing stroke the gas is expelled from the cylinder through an open fourth valve 25. As in other four-stroke internal combustion engines, work-per-cycle is a function of the quantity of fuel burned in each cylinder during the cycle. Control system 70 (FIG. 2) controls the magnitude of the propulsion force by controlling the quantity of fuel added to each air-charge and by varying the transmission ratio. In vehicles with manual transmission control, it is the vehicle driver who varies the transmission ratio.

Control system 70 (FIG. 2) controls the quantity of air received into each cylinder during each cycle by controlling the timing of first valve 20 opening and closing. Ability to vary the quantity of air received by varying the timing of the valve events is an important advantage over most other conventional four-stroke engines, since it eliminates the need for throttling the intake airflow. Elimination of throttling reduces the pumping loss and thus contributes to better fuel economy.

Control system 70 also controls the quantity of residual gas remaining in the cylinder after the end of each cycle by controlling the timing of fourth valve 25 closure. Such ability to control the quantity of residual gas is another important advantage, since it eliminates the need for an external exhaust gas recirculation system needed, in most engines, to restrict nitrogen oxide emission. Elimination of the external exhaust gas recirculation system leads to a reduction in costs.

Detailed Description of a First Alternative Embodiment

Figure 4A:
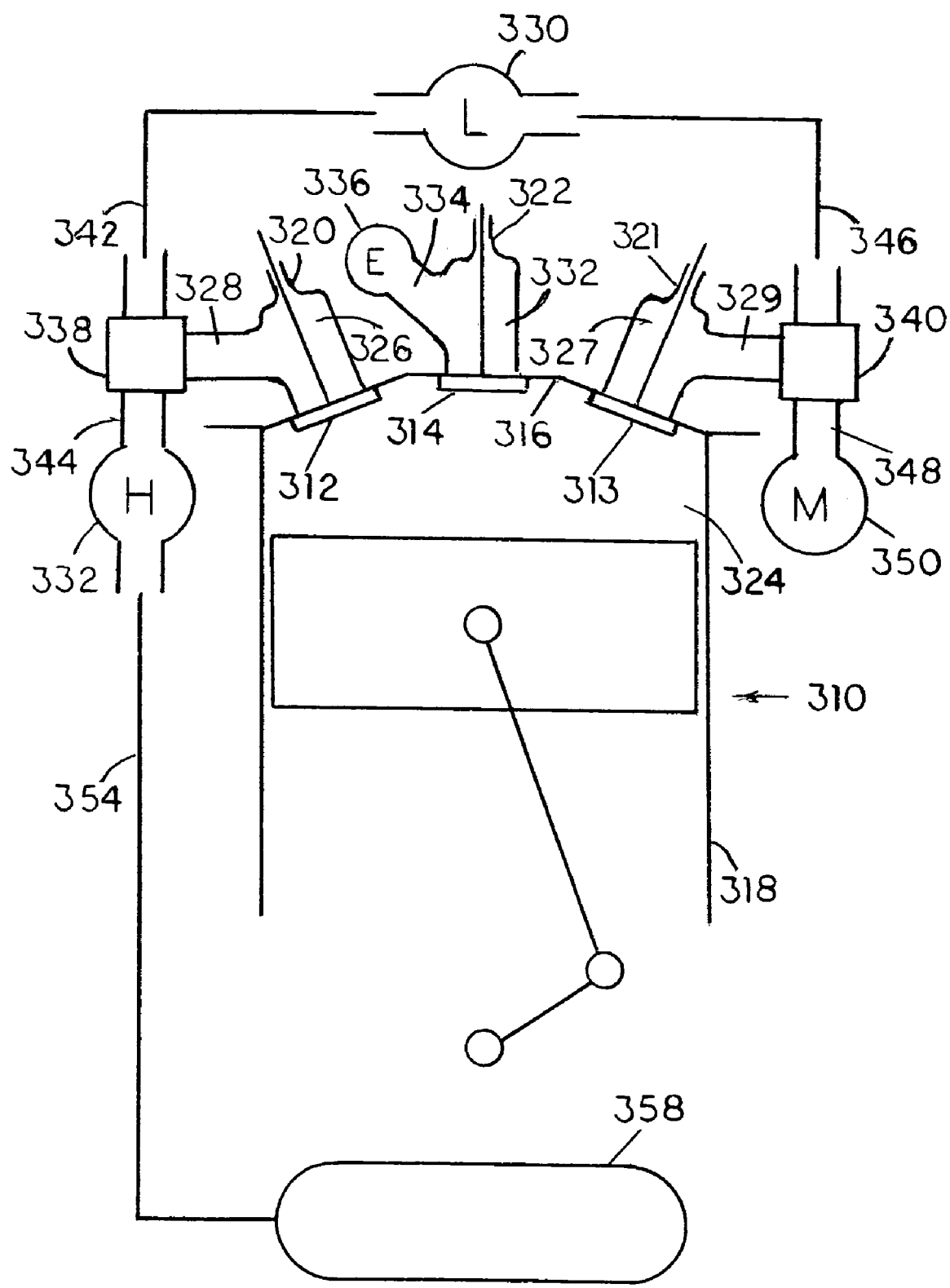
FIG. 4A is a schematic, cross-sectional side-view of an engine cylinder and head arrangement and its connection to a compressed-air reservoir, in accordance with a first alternative embodiment of the present invention.
Figure 5A:
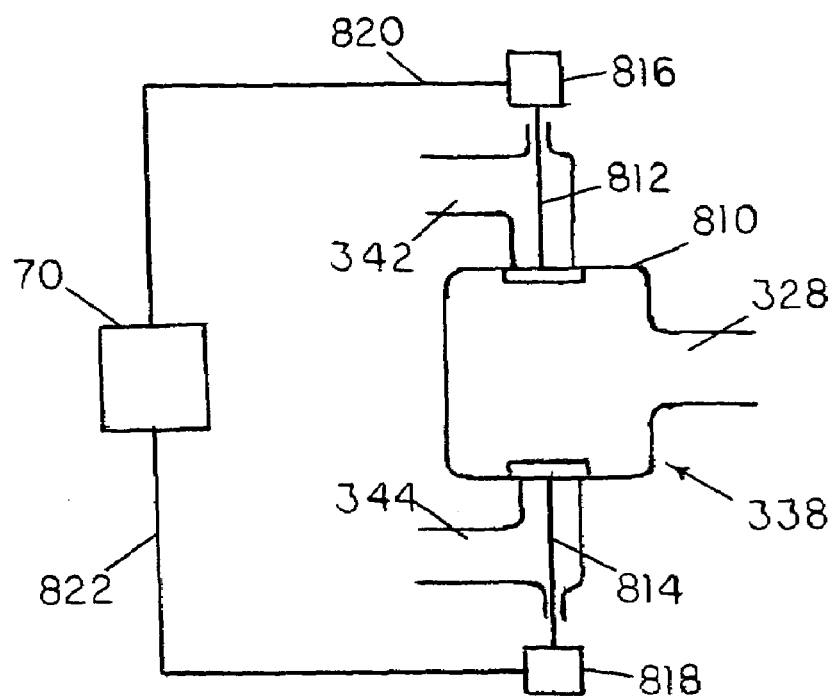
FIGS. 5A and 5B are schematic diagrams illustrating two different types of valve switching arrangements that can be used in alternative modes of operation of the present invention.

FIGS. 4A and 5A

FIG. 4A is a schematic, cross-sectional side-view of an engine cylinder and head arrangement and its connection to a compressed-air reservoir, in accordance with a first alternative embodiment of the present invention. In contrast to the above described preferred embodiment, the below described alternative embodiment features only three types of valves, a first air valve, a second air valve, and an exhaust valve, in each engine cylinder. There are also switching arrangements that can selectively change the nature of functions performed by the valves. The valves are operated by electrohydraulic actuators, and the operation of the valves is controlled by the control system in the same way as in the above-described preferred embodiment. The engine has at least two such cylinders.

As shown in FIG. 4A, an engine 310 has three types of normally-closed valves, a first air valve 312, a second air valve 313, and an exhaust valve 314, installed in a cylinder head 316 above an engine cylinder 318. Identical valve arrangements exist for all engine cylinders. Valves 312, 313, and 314 are slidably mounted in guides 320, 321, and 322, respectively. Depending on the needs of the engine, there may be more than one valve of each type in each engine cylinder.

First air valve 312 is shown in its closed position in which it separates a cylinder chamber 324 from a first air port 326 which opens into a first air passage 328. First air passage 328 connects to a two-way switching arrangement 338 that can be selectively connected either to a low-pressure manifold 330, via a duct 342, or to a high-pressure manifold 332, via a duct 344. A description of a typical two-way switching arrangement is given in a later text and is illustrated in FIG. 5A. A pipe 354 connects high-pressure manifold 332 to an air-reservoir 358.

Second air valve 313 is shown in its closed position in which it separates cylinder chamber 324 from a second air port 327 which opens into a second air passage 329. Second air passage 329 connects to a two-way switching arrangement 340 that can be selectively connected either to a low-pressure manifold 330, via a duct 346, or to a medium-pressure manifold 350, via a duct 348.

Exhaust valve 314 is shown in its closed position in which it separates cylinder chamber 324 from an exhaust port 332 which opens into an exhaust passage 334. Exhaust passage 334 connects to an exhaust manifold 336 to which all exhaust ports and all exhaust passages from all engine cylinders are connected.

Low-pressure manifold 330, medium-pressure manifold 350, high-pressure manifold 332, and exhaust manifold 336 are labeled by letters L, M, H, and E, respectively.

FIG. 5A illustrates a typical two-way switching arrangement that can be used in the present embodiment. The arrangement is described as applied to the case of switching arrangement 338 (FIG. 4A), but it can also be used in the case of switching arrangement 340 (FIG. 4A) and in other cases. A housing 810 contains two valves, 812 and 814, which can be operated by actuators 816 and 818, respectively. In the drawing, both valves are shown in closed position. Various electrical, pneumatic, or hydraulic devices can be used as the above actuators. Control system 70 can selectively open or close the two valves, 812 and 814, by sending control signals to actuators 816 and 818, respectively, via electric lines 820 and 822, respectively. The switching arrangement can be in one or another of two positions: In one, valve 812 is open while valve 814 is closed. In this position, first air passage 328 (FIG. 4A) is connected to duct 342 (FIG. 4A). In the second position, valve 814 is open while valve 812 is closed. In this position, first air passage 328 is connected to duct 344 (FIG. 4A).

In the above described example of the alternative embodiment there is only one low-pressure manifold, one medium-pressure manifold, one high-pressure manifold, and one exhaust manifold. In other cases, however, the engine may have more than one of each type of air manifolds and more than one exhaust manifold. There may also be more than two switching arrangements.

In all other respects, the above-described alternative embodiment is identical to the previously described preferred embodiment. Those skilled in art will appreciate in view of this disclosure that other valve switching arrangements and other types of switching valves, possibly including rotary valves, may be used to effectuate connection of cylinder chambers in all engine cylinders through respective air valves, selectively, to one or another of the three air manifolds, and, through respective exhaust valves, to the engine exhaust system according to the present invention.

Operation of the First Alternative Embodiment

FIGS. 4A, 8, 9, 12, 13, 15, 17, and 18A to 18C

Figure 18A:
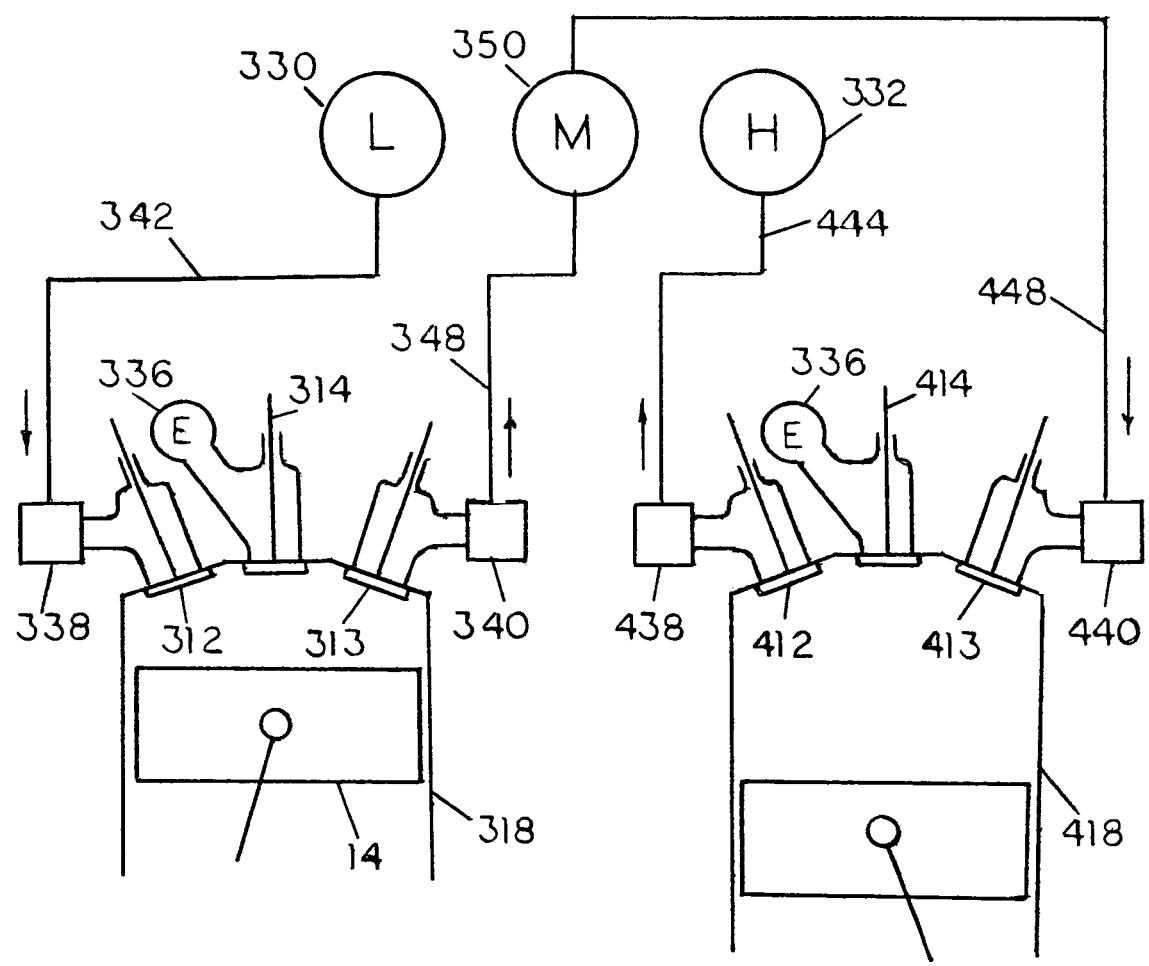
FIG. 18A is a schematic diagram illustrating operation of the primary and secondary cylinders in a compression-braking mode in the first alternative embodiment of the present invention.
Figure 18B:
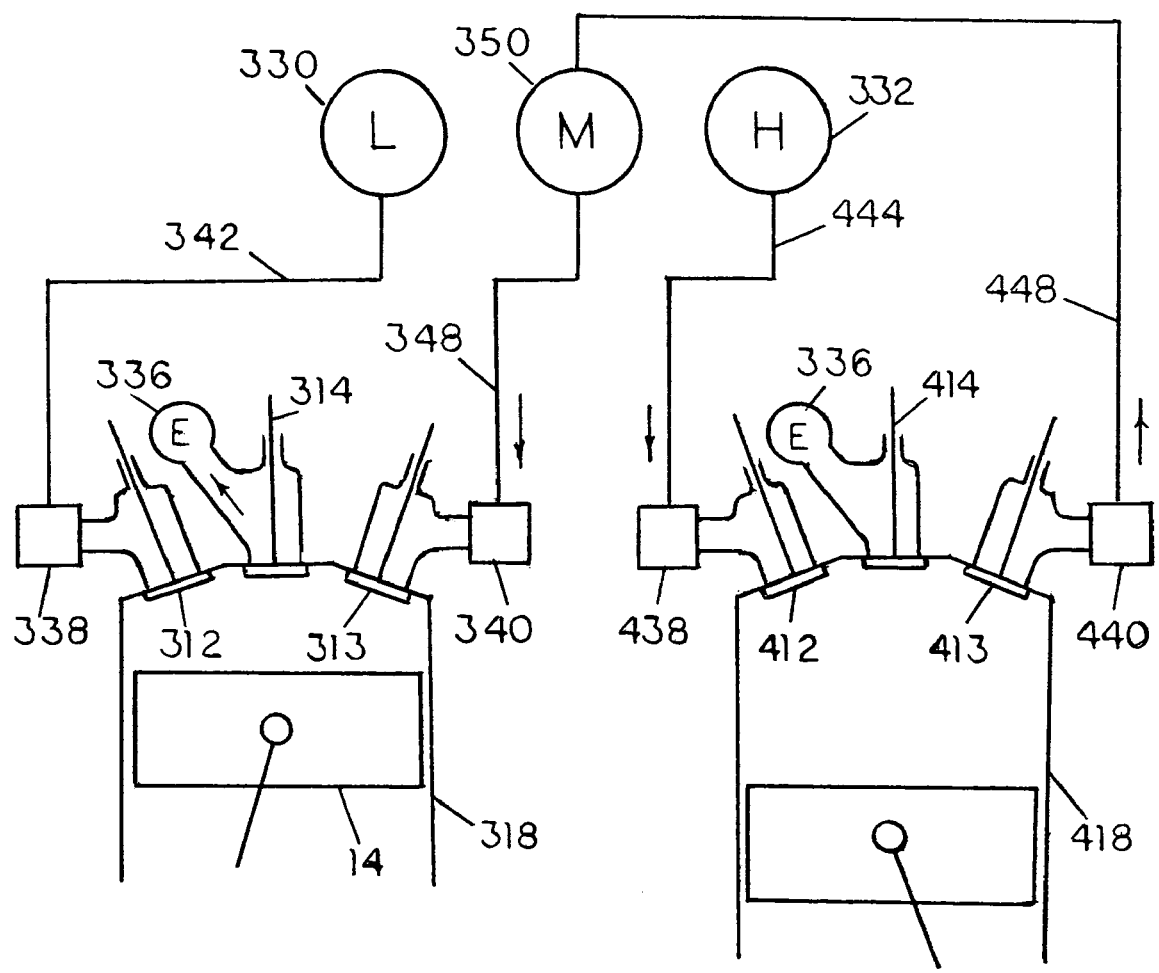
FIG. 18B is a schematic diagram illustrating operation of the primary and secondary cylinders in first, second, and third propulsion modes in the first alternative embodiment of the present invention.
Figure 18C:
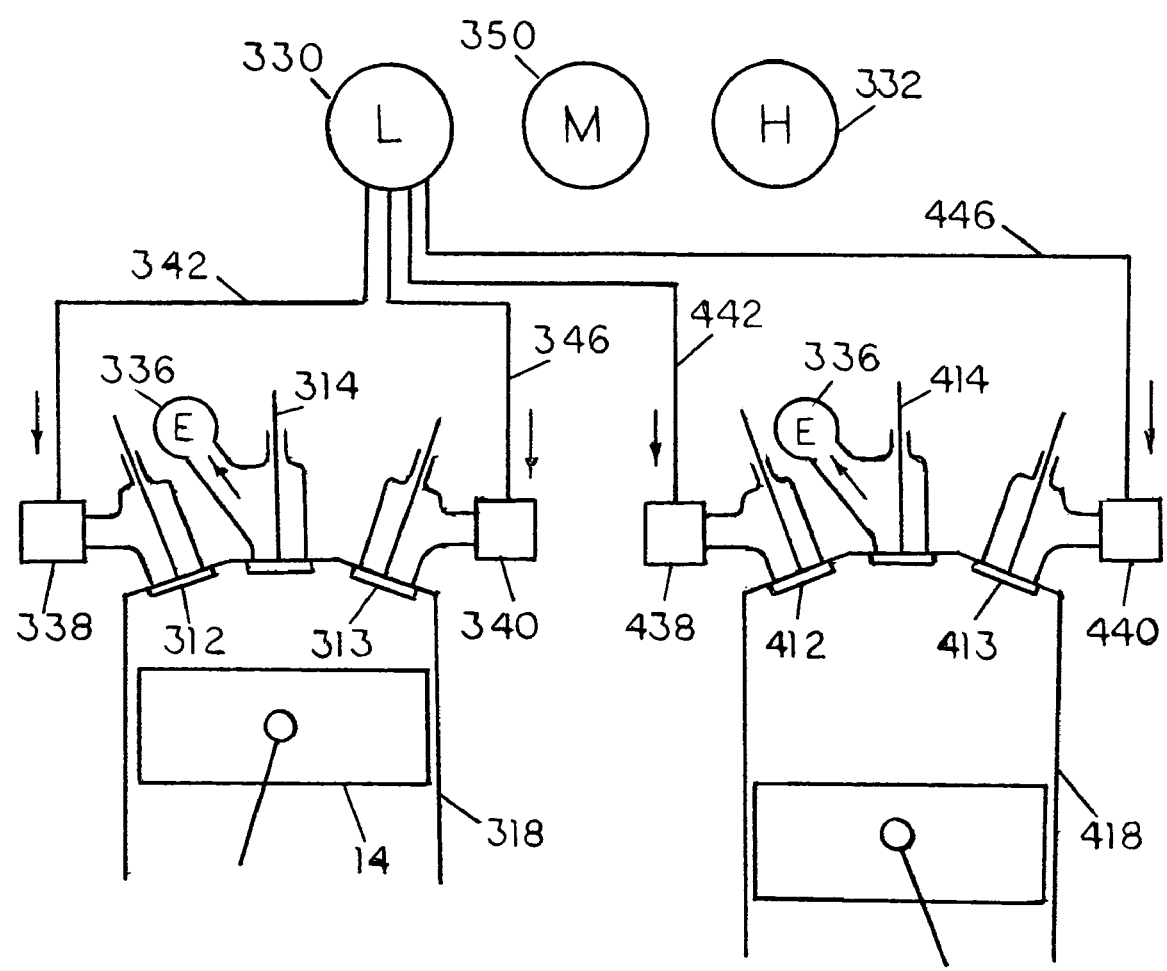
FIG. 18C is a schematic diagram illustrating operation of the primary and secondary cylinders in a fourth propulsion mode in the first alternative embodiment of the present invention.

The first alternative embodiment of the present invention, illustrated in FIG. 4A, can operate in a variety of alternative modes of operation, including compression braking and first, second, third, and fourth propulsion modes. Its ability to operate in each mode depends on a specific configuration of switching arrangements that can selectively connect each of the two air valves to one or another of the three air manifolds. FIGS. 18A, 18B, and 18C illustrate the connections for various modes of operation in two different switching configurations for the first alternative embodiment. Although the design of all engine cylinders is identical, functionally the cylinders can be divided into two types: primary cylinders that perform a first stage of air compression or a second stage of air expansion, and secondary cylinders that perform a second stage of air compression or a first stage of air expansion. This is the case described below. In some other cases, the primary cylinders may perform the first stages of both compression and expansion, while the secondary cylinders perform the second stages of both compression and expansion.

FIGS. 18A and 18B both show a first switching configuration. In this configuration low-pressure manifold 330 is connected to first air valve 312 in primary cylinder 318, via duct 342 and switching arrangement 338; medium-pressure manifold 350 is connected to second air valve 313 in primary cylinder 318, via duct 348 and switching arrangement 340, and to second air valve 413 in secondary cylinder 418, via duct 448 and switching arrangement 440; and high-pressure manifold 332 is connected to first air valve 412 in secondary cylinder 418, via duct 444 and switching arrangement 438.

FIG. 18C shows a second switching configuration. In this configuration, low-pressure manifold 330 is connected to first valve 312 via duct 342 and switching arrangement 338, to second valve 313 via duct 346 and switching arrangement 340, to first valve 412 via duct 442 and switching arrangement 438, and to second valve 413 via duct 446 and switching arrangement 440. Medium-pressure manifold 350 and high-pressure manifold 332 are disconnected from all engine valves.

The drawings 18A, 18B, and 18C show only ducts that provide connections between the manifolds and the switching arrangements in each specific case. Arrows in the drawings indicate the direction of air or gas flow. Low-pressure manifold 330, medium-pressure manifold 350 high-pressure manifold 332, and exhaust manifold 336 are labeled by letters L, M, H, and E, respectively.

COMPRESSION BRAKING—Compression braking requires the system to be in the first switching configuration, as illustrated in FIG. 18A. The engine operates as a two-stage compressor, and its cycle is similar to that in the previously described preferred embodiment and can be illustrated by similar pressure-volume diagrams. A description given below refers to the pressure-volume diagrams shown in FIGS. 8 and 9.

A typical pressure-volume diagram of compression braking cycle taking place in primary cylinder 318 (FIG. 18A) can be illustrated by FIG. 8. Exhaust valve 314 is deactivated. From point 510 to point 512 all valves are closed, and the fraction of the air-charge, left in the cylinder from the previous cycle, expands, preferably until its pressure drops to the level of pressure in the low-pressure manifold at point 512. This period takes place during a first part of the volume-increasing stroke.

First air valve 312 (FIG. 18A) opens at variable point 512 and later closes at variable point 514. During this period, atmospheric air is received from low-pressure manifold 330 (FIG. 18A) into the cylinder at constant pressure. This period takes place during a second part of the volume-increasing stroke.

From point 514 to variable point 516, all valves are closed, and the air-charge is compressed until its pressure becomes equal to pressure in medium-pressure manifold 350 (FIG. 18A). This takes place during a first part of the volume-decreasing stroke.

At point 516, second air valve 313 (FIG. 18A) opens and remains open until its closure at point 510. From point 516 to point 510, air is displaced from the cylinder into medium-pressure manifold 350 (FIG. 18A) at nearly constant pressure. This period takes place during a second part of the volume-decreasing stroke.

A typical pressure-volume diagram of compression braking cycle taking place in secondary cylinder 418 (FIG. 18A) can be illustrated by FIG. 9. Exhaust valve 414 is deactivated. From point 520 to point 522 all valves are closed, and the fraction of the air-charge, left in the cylinder from the previous cycle, expands, preferably until its pressure becomes equal to pressure in medium-pressure manifold 350. This period takes place during a first part of the volume-increasing stroke.

Second air valve 413 (FIG. 18A) opens at variable point 522 and later closes at variable point 524. During this period, previously compressed air is received from medium-pressure manifold 350 into the cylinder at approximately constant pressure. This period takes place during a second part of the volume-increasing stroke.

From point 524 to variable point 526, all valves are closed, and the air-charge is compressed until its pressure becomes equal to pressure in high-pressure manifold 332. This takes place during a first part of the volume-decreasing stroke.

At point 526, first air valve 412 (FIG. 18A) opens and remains open until its closure at point 520, which is already after the top-dead-center. From point 526 to a point 521, air is displaced from the cylinder into high-pressure manifold 332 (FIG. 18A) at nearly constant pressure. This period takes place during a second part of the volume-decreasing stroke. From point 521 to point 520 the engine piston is already on its downstroke, and some of the air displaced into high-pressure manifold 332 flows back into the cylinder chamber. This is necessary whenever the time period between points 526 and 520 is too short to perform an effective opening and closing of first air valve 412.

FIRST PROPULSION MODE—The first propulsion mode requires the system to be in the first switching configuration. However, the flow of air is different from that in FIG. 18A, and it is illustrated in FIG. 18B. The engine operates as a two-stage air motor, and its cycle is similar to that in the previously described preferred embodiment and can be illustrated by similar pressure-volume diagrams. A description given below refers to the pressure-volume diagrams shown in FIGS. 12 and 13.

A typical pressure-volume diagram of the first propulsion mode cycle taking place in secondary cylinder 418 is shown in FIG. 12. Exhaust valve 414 is deactivated. First air valve 412 (FIG. 18B) opens at variable point 530 that is still before the top-dead-center, and later closes at variable point 532. From point 530 to point 531, the engine piston is still on its upstroke and some of the air is displaced from the cylinder into high-pressure manifold 332 (FIG. 18B). From point 531 to point 532, the engine piston is on its downstroke, and, during this period, compressed air is received from high-pressure manifold 332 into the cylinder at approximately constant pressure. This is necessary whenever the net volume of air that has to be received from high-pressure manifold 332 is less than the volume of the cylinder clearance volume, and also to provide a sufficient time period between points 530 and 532 to perform an effective opening and closing of first valve 412.

From point 532 to variable point 534 all valves are closed, and the air-charge is expanded until its pressure becomes equal to pressure in medium-pressure manifold 350 (FIG. 18B). This takes place during a second part of the volume-increasing stroke.

At point 534, second air valve 413 (FIG. 18B) opens and remains open until its closure at point 536. From point 534 to point 536, air is displaced from the cylinder into medium-pressure manifold 350 at nearly constant pressure. This period takes place during a first part of the volume-decreasing stroke.

From point 536 to point 530 all valves are closed, and the fraction of the air-charge, left in the cylinder, is compressed, preferably until its pressure becomes equal to the pressure in high-pressure manifold 332 (FIG. 18B) at point 530. This period takes place during a second part of the volume-decreasing stroke.

A typical pressure-volume diagram of the first propulsion mode cycle, taking place in the primary cylinder 318, is shown in FIG. 13. First air valve 312 is deactivated. Second air valve 313 (FIG. 18B) opens at variable point 540 and later closes at variable point 542. During this period, air is received from medium-pressure manifold 350 (FIG. 18B) into the cylinder at approximately constant pressure. This period takes place during a first part of the volume-increasing stroke.

From point 542 to variable point 544, all valves are closed, and the air-charge expands until its pressure becomes equal to pressure in exhaust manifold 336 (FIG. 18B). This takes place during a second part of the volume-increasing stroke.

At point 544, exhaust valve 314 (FIG. 18B) opens and remains open until its closure at point 546. From point 544 to point 546, air is displaced from the cylinder into exhaust manifold 336 (FIG. 18B) at nearly constant pressure. This period takes place during a first part of the volume-decreasing stroke.

From point 546 to point 540 all valves are closed, and the fraction of the air-charge, left in the cylinder chamber, is compressed, preferably until its pressure becomes equal to pressure in medium-pressure manifold 350. This period takes place during a second part of the volume-decreasing stroke.

SECOND PROPULSION MODE—The second propulsion mode requires the system to be in the first switching configuration, as illustrated in FIG. 18B. The engine operates as an air motor, in the secondary cylinder; and as an air motor and an internal combustion engine, in the primary cylinder. Its cycle is similar to that in the previously described preferred embodiment and can be illustrated by similar pressure-volume diagrams. A description given below refers to the pressure-volume diagrams shown in FIGS. 12 and 15.

A typical pressure-volume diagram of the second propulsion mode cycle taking place in secondary cylinder 418 (FIG. 18B) is shown in FIG. 12. Exhaust valve 414 is deactivated. First air valve 412 (FIG. 18B) opens at variable point 530 that is still before the top-dead-center, and later closes at variable point 532. From point 530 to point 531, the engine piston is still on its upstroke and some of the air is displaced from the cylinder into high-pressure manifold 332 (FIG. 18B). From point 531 to point 532, the engine piston is on its downstroke, and, during this period, compressed air is received from high-pressure manifold 332 into the cylinder at approximately constant pressure. This is necessary whenever the net volume of air that has to be received from high-pressure manifold 332 is less than the volume of the cylinder clearance volume, and also to provide a sufficient time period between points 530 and 532 to perform an effective opening and closing of first air valve 412.

From point 532 to variable point 534 all valves are closed, and the air-charge is expanded until its pressure becomes equal to pressure in medium-pressure manifold 350 (FIG. 18B). This takes place during a second part of the volume-increasing stroke.

At point 534, second air valve 413 (FIG. 18B) opens and remains open until its closure at point 536. From point 534 to point 536, air is displaced from the cylinder into medium-pressure manifold 350 at nearly constant pressure. This period takes place during a first part of the volume-decreasing stroke.

From point 536 to point 530 all valves are closed, and the fraction of the air-charge, left in the cylinder, is compressed, preferably until its pressure becomes equal to the pressure in high-pressure manifold 332 (FIG. 18B) at point 530. This period takes place during a second part of the volume-decreasing stroke.

A typical idealized pressure-volume diagram of the second propulsion mode cycle performed in primary cylinder 318 (FIG. 18B) is shown in FIG. 15. First air valve 312 is deactivated. Second air valve 313 (FIG. 18B) opens at point 610, and the pressure in the cylinder increases to the level of pressure in medium-pressure manifold 350 (FIG. 18B), which corresponds to a point 612. A preferred timing of second air valve 313 opening is at the top-dead-center. From point 612 to a point 614, the engine piston is displaced by a nearly constant air-pressure in the cylinder. There is only a relatively small drop in pressure associated with expansion of air in medium-pressure manifold 350. This period takes place during a first part of a first volume-increasing stroke.

At point 614 second air valve 313 closes, and from point 614 to point 616, which is at the bottom-dead-center, the air-charge in cylinder chamber 16 expands. This takes place during a second part of the first volume-increasing stroke.

From point 616 to point 618 the cylinder charge is compressed, fuel is added to it, and the air-fuel mixture is ignited (in some other variants, fuel can be added to the air before it enters the cylinder). From point 618 to point 620 heat generated by combustion increases the pressure at nearly constant volume. This period takes place during a first volume-decreasing stroke.

From point 620 to point 622 combustion is completed, and the expanding combustion gas displaces the engine piston until it reaches its bottom-dead-center at point 622. This takes place during a second volume-increasing stroke.

Exhaust valve 314 (FIG. 18B) opens at or shortly before the bottom-dead-center, and the pressure in the cylinder drops to a nearly atmospheric pressure, as shown at point 624 (it coincides with point 616 in the diagram). From point 624 to point 626 combustion gas is expelled from the cylinder through the open exhaust valve 314 into exhaust manifold 336 (FIG. 18B). This period takes place during a first part of a second volume-decreasing stroke.

At point 626 exhaust valve 314 closes, and from point 626 to point 610 all valves are closed and residual-gas compression takes place. This takes place during a second part of the second volume-decreasing stroke.

THIRD PROPULSION MODE—The third propulsion mode requires the system to be in the first switching configuration, as illustrated in FIG. 18B. The engine operates as an air motor, in the secondary cylinder; and as a two-stroke internal combustion engine, in the primary cylinder. Its cycle is similar to that in the previously described preferred embodiment and can be illustrated by similar pressure-volume diagrams. A description given below refers to the pressure-volume diagrams shown in FIGS. 12 and 17.

Operation of secondary cylinder 418 (FIG. 18B) in the third propulsion mode is identical to its operation in the above described second propulsion mode, and it can be illustrated by the pressure-volume diagram FIG. 12.

A typical idealized pressure-volume diagram of the third propulsion mode cycle, performed in primary cylinder 318 (FIG. 18B), is shown in FIG. 17. First air valve 312 is deactivated. Second air valve 313 (FIG. 18B) opens at point 710, and the pressure in the cylinder increases to the level of pressure in medium-pressure manifold 350 (FIG. 18B) during an upstroke of piston 14 (FIG. 18B), which corresponds to point 712. From point 712 to point 714, the engine piston moves against nearly constant pressure in the cylinder. There is only a relatively small increase in pressure associated with compression of air in medium-pressure manifold 350. This takes place during a second part of the volume-decreasing stroke.

At point 714, second air valve 313 closes, from point 714 to point 716 the cylinder charge is compressed, fuel is added to it, and the air-fuel mixture is ignited (in some other variants, fuel can be added to the air before it enters the cylinder). From point 716 to point 718 heat from combustion increases the pressure at nearly constant volume. This takes place during a third part of the volume-decreasing stroke.

From point 718 to point 720, combustion is completed, and the expanding combustion gas displaces the engine piston until it reaches its bottom-dead-center at point 720. This takes place during the volume-increasing stroke.

Exhaust valve 314 (FIG. 18B) opens at or shortly before the bottom-dead-center, and the pressure in the cylinder drops to the level equal to pressure in exhaust manifold 336, as shown at point 722. After point 722, upward motion of the engine piston expels combustion gas from the cylinder through the open exhaust valve 314 into exhaust manifold 336 (FIG. 18B) until the valve closes. This takes place during a first part of the volume-decreasing stroke. Timing of exhaust valve 314 closure determines the quantity of residual gas retained in the cylinder. A preferred timing of exhaust valve 314 closing coincides with the timing of second air valve 313 (FIG. 18B) opening at point 710. From then on, the same cycle is repeated again during the next engine revolution.

FOURTH PROPULSION MODE—The fourth propulsion mode requires the system to be in the second switching configuration, as illustrated in FIG. 18C. The fourth propulsion mode involves repeated performance of a four-stroke cycle, during which the engine operates as a conventional four-stroke internal combustion engine. All first and second air valves in all engine cylinders are connected to low-pressure manifold 330 (FIG. 18C). Each primary cylinder 318 receives its air-charge through open first air valve 312 and second air valve 313 during a first volume-increasing stroke. Then, during a first volume-decreasing stroke, the air-charge is compressed, fuel is added to it, and the air-fuel mixture is ignited (in some other variants, fuel can be added to the air before it enters the cylinder). During a second volume-increasing stroke the expanding combustion gas performs positive work on the piston, and, during a second volume-decreasing stroke, the gas is expelled from the cylinder through an open exhaust valve 314. Secondary cylinder 418 (FIG. 18C) operates in the same way as primary cylinder 318.

Detailed Description of a Second Alternative Embodiment

Figure 4B:
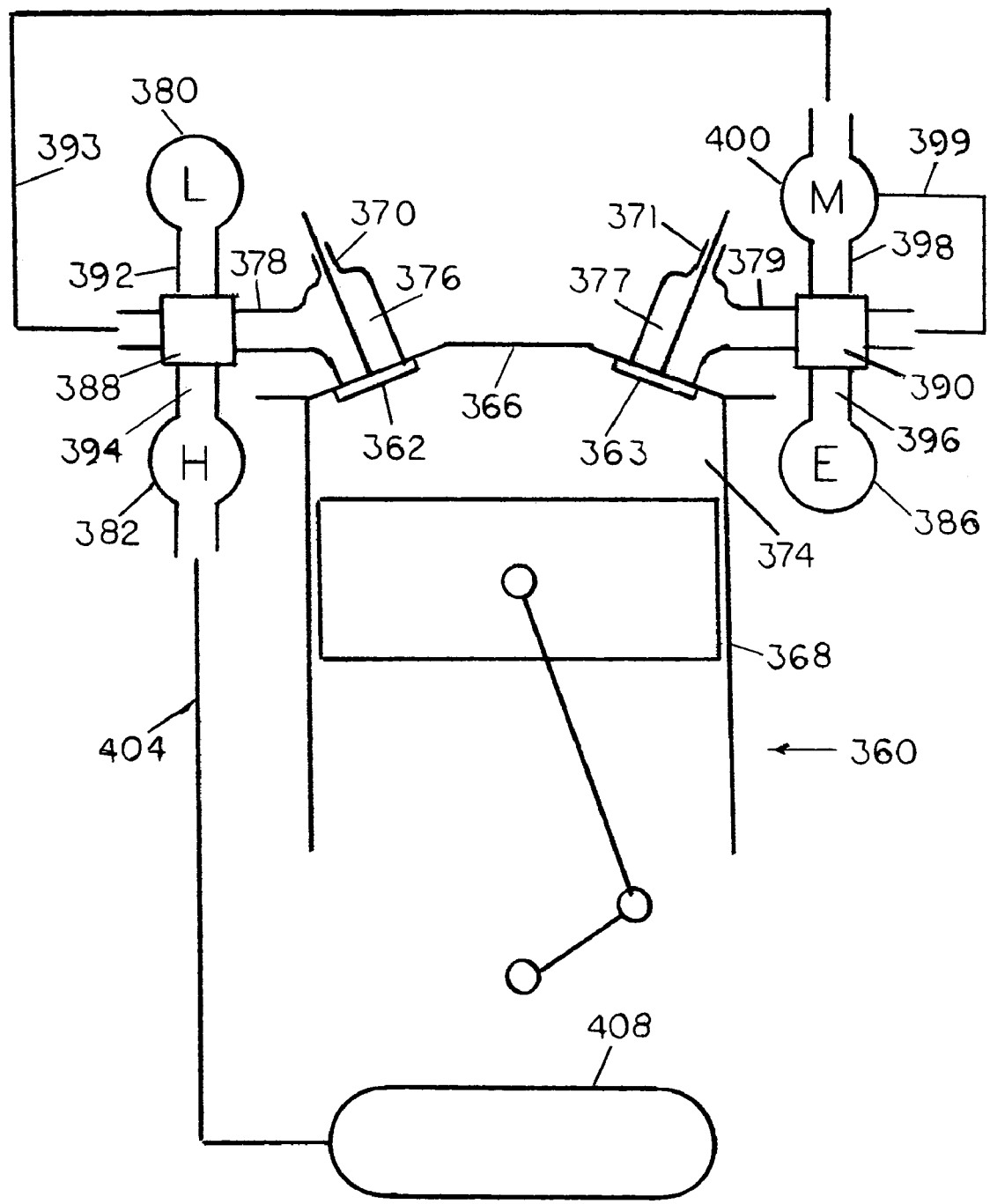
FIG. 4B is a schematic, cross-sectional side-view of an engine cylinder and head arrangement and its connection to a compressed-air reservoir, in accordance with a second alternative embodiment of the present invention.
Figure 5B:
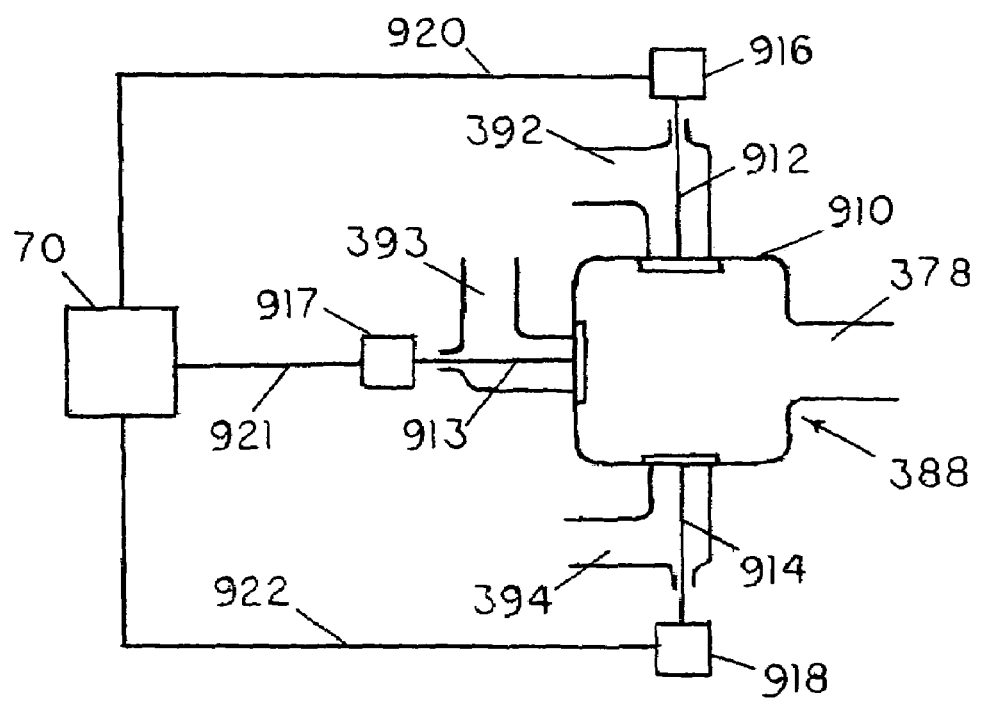

FIGS. 4B and 5B

FIG. 4B is a schematic, cross-sectional side-view of an engine cylinder and head arrangement and its connection to a compressed-air reservoir, in accordance with a second alternative embodiment of the present invention. In contrast to the above described preferred embodiment, the below described alternative embodiment features only two types of valves, a first engine valve and a second engine valve, in each engine cylinder. There are also switching arrangements, which can selectively change the nature of functions performed by the valves. The valves are operated by electrohydraulic actuators, and the operation of the valves is controlled by the control system in the same way as in the above-described preferred embodiment. The engine has at least two such cylinders.

As shown in FIG. 4B, an engine 360 has two types of normally-closed valves, a first engine valve 362 and an second engine valve 363, installed in a cylinder head 366 above an engine cylinder 368. Identical valve arrangements exist for all engine cylinders. Valves 362 and 363 are slidably mounted in guides 370 and 371, respectively. Depending on the needs of the engine, there may be more than one valve of each type in each engine cylinder.

First engine valve 362 is shown in its closed position in which it separates a cylinder chamber 374 from an air port 376, which opens into an air passage 378. Air passage 378 connects to a three-way switching arrangement 388 that can be selectively connected either to a low-pressure air manifold 380, via a duct 392, or to a medium-pressure air manifold 400, via a duct 393, or to a high-pressure air manifold 382, via a duct 394. A description of a typical three-way switching arrangement is given in a later text and is illustrated in FIG. 5B. A pipe 404 connects high-pressure air manifold 382 to an air-reservoir 408.

Second engine valve 363 is shown in its closed position in which it separates cylinder chamber 374 from an exhaust port 377, which opens into an exhaust passage 379. Exhaust passage 379 connects to a three-way switching arrangement 390 that can be selectively connected either to an exhaust manifold 386, via a duct 396, or to medium-pressure air manifold 400, via ducts 398 and 399.

Low-pressure manifold 380, medium-pressure manifold 400, high-pressure manifold 382, and exhaust manifold 386 are labeled by letters L, M, H, and E, respectively.

FIG. 5B illustrates a typical three-way switching arrangement that can be used in the present embodiment. The arrangement is described as applied to the case of switching arrangement 388 (FIG. 4B), but it can also be used in the case of switching arrangement 390 (FIG. 4B) and in other cases. A housing 910 contains three valves, 912, 913, and 914, which can be operated by actuators 916, 917, and 918, respectively. Various electrical, pneumatic, or hydraulic devices can be used as the above actuators. Control system 70 can selectively open or close the three valves, 912, 913, and 914, by sending control signals to actuators 916, 917, and 918, respectively, via electric lines 920, 921, and 922, respectively. The switching arrangement can be in one or another of three positions: In one, valve 912 is open while valves 913 and 914 are closed. In this position, first air passage 378 (FIG. 4B) is connected to duct 392 (FIG. 4B). In the second position, valve 913 is open while valves 912 and 914 are closed. In this position, first air passage 378 is connected to duct 393 (FIG. 4B). In the third position, valve 914 is open while valves 912 and 913 are closed. In this position, first air passage 378 is connected to duct 394 (FIG. 4B).

In the above described example of the second alternative embodiment there is only one low-pressure air manifold, one medium-pressure air manifold, one high-pressure air manifold, and one exhaust manifold. In other cases, however, the engine may have more than one of each type of air manifolds and more than one exhaust manifold. There may also be more than two switching arrangements.

In all other respects, the above-described alternative embodiment is identical to the previously described preferred embodiment. Those skilled in art will appreciate in view of this disclosure that other valve switching arrangements and other types of switching valves, possibly including rotary valves, may be used to effectuate connection of cylinder chambers in all engine cylinders through respective first and second engine valves, selectively, to one or another of the three air manifolds and to the exhaust manifold.

Operation of the Second Alternative Embodiment

FIGS. 4A, 8, 9, 12, 13, 15, 17, and 19A to 19C

Figure 19A:
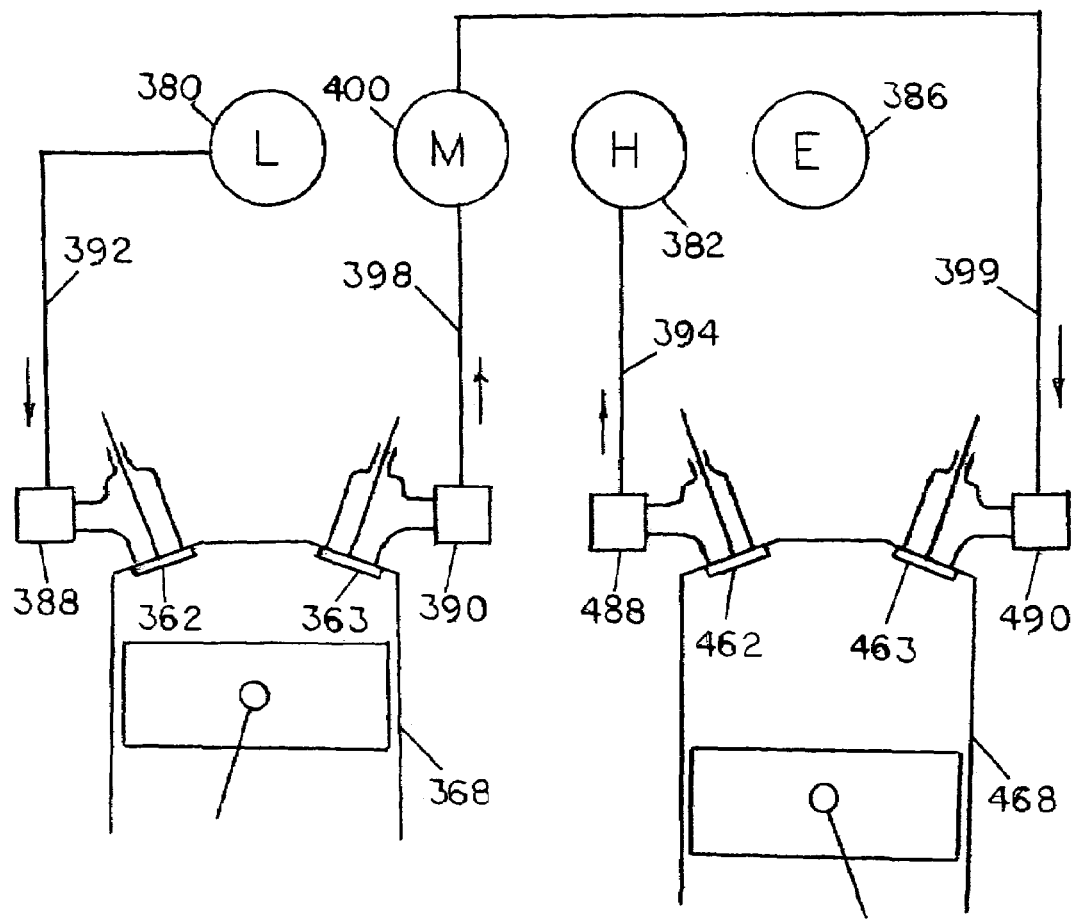
FIG. 19A is a schematic diagram illustrating operation of the primary and secondary cylinders in a compression-braking mode in the second alternative embodiment of the present invention.
Figure 19B:
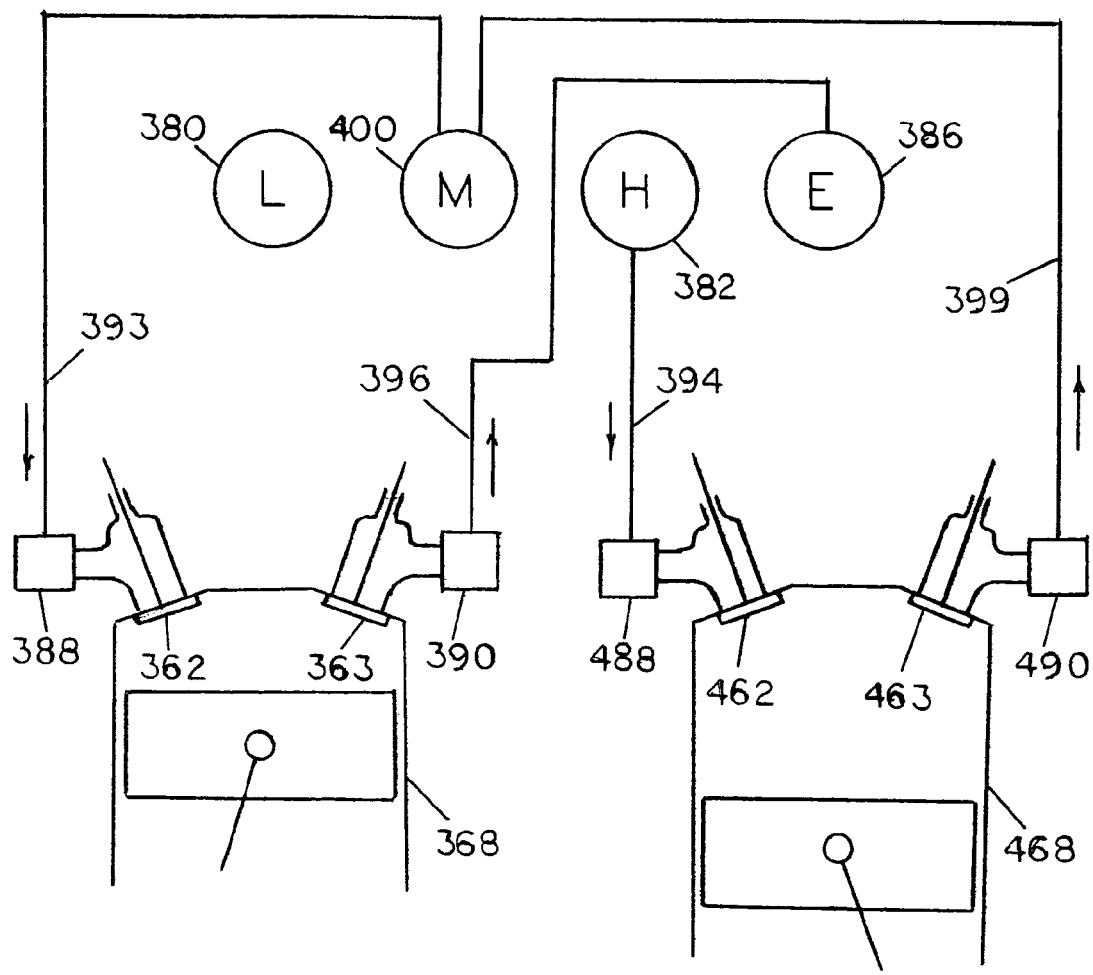
FIG. 19B is a schematic diagram illustrating operation of the primary and secondary cylinders in first, second, and third propulsion modes in the second alternative embodiment of the present invention.
Figure 19C:
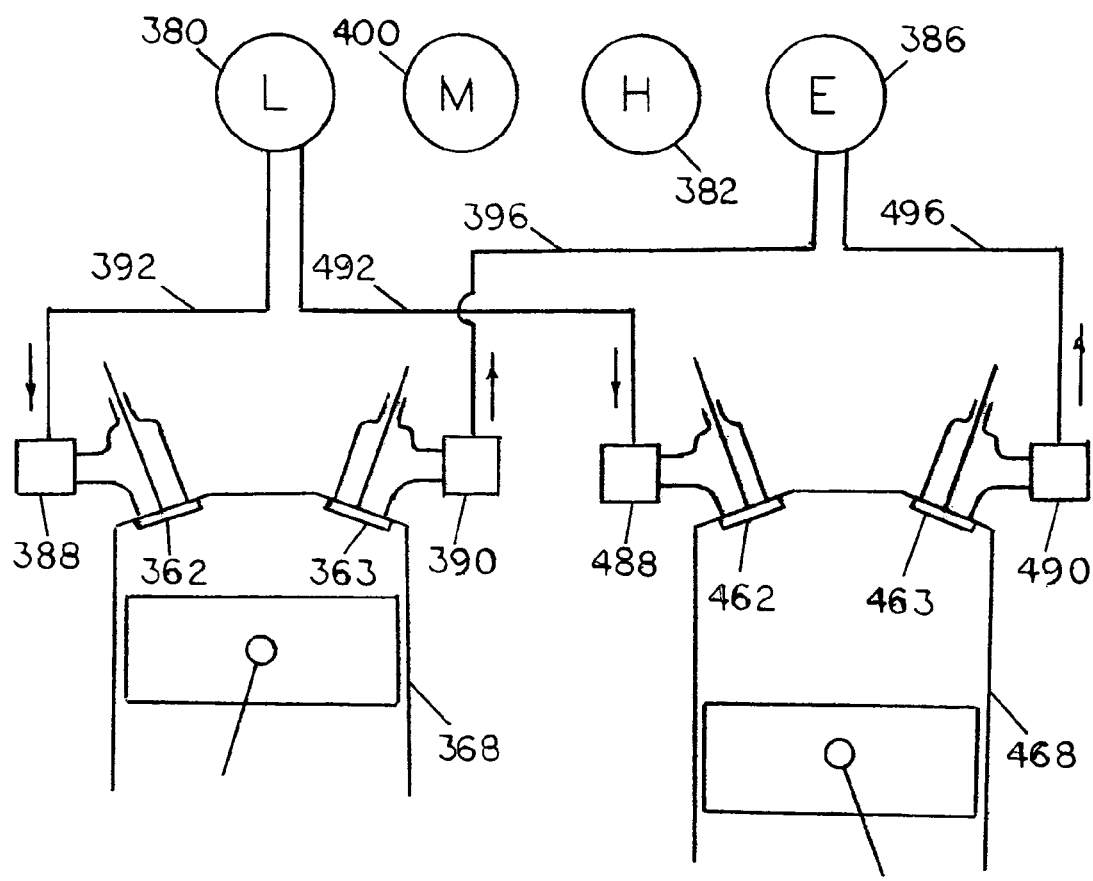
FIG. 19C is a schematic diagram illustrating operation of the primary and secondary cylinders in a fourth propulsion mode in the second alternative embodiment of the present invention.

The second alternative embodiment of the present invention, illustrated in FIG. 4B, can operate in a variety of alternative modes of operation, including compression braking, as well as first, second, third, and fourth propulsion modes. Its ability to operate in each mode depends on a specific configuration of switching arrangements that can selectively connect each of the two engine valves to one or another of the three air manifolds and to the exhaust manifold. FIGS. 19A, 19B and 19C illustrate three different switching configurations for the second alternative embodiment. Although the design of all engine cylinders is identical, functionally the cylinders can be divided into two types: primary cylinders that perform a first stage of air compression or a second stage of air expansion, and secondary cylinders that perform a second stage of air compression or a first stage of air expansion. This is the case described below. In some other cases, the primary cylinders may perform the first stages of both compression and expansion, while the secondary cylinders perform the second stages of both compression and expansion.

FIG. 19A shows a first switching configuration for a primary cylinder 368 and a secondary cylinder 468. Low-pressure manifold 380 is connected to first engine valve 362 in primary cylinder 368 via duct 392 and switching arrangement 388. Medium-pressure manifold 400 is connected to second engine valve 363 in primary cylinder 368 via duct 398 and switching arrangement 390, and to second engine valve 463 in secondary cylinder 468 via duct 399 and switching arrangement 490. High-pressure manifold 382 is connected to first engine valve 462 in secondary cylinder 468 via duct 394 and switching arrangement 488. Exhaust manifold 386 is disconnected from the engine valves.

FIG. 19B shows a second switching configuration for primary cylinder 368 and secondary cylinder 468. Low-pressure manifold 380 is disconnected from the engine valves. Medium-pressure manifold 400 is connected to first engine valve 362 in primary cylinder 368 via duct 393 and switching arrangement 388, and to second engine valve 463 in secondary cylinder 468 via duct 399 and switching arrangement 490. High-pressure manifold 382 is connected to first engine valve 462 in secondary cylinder 468 via duct 394 and switching arrangement 488. Exhaust manifold 386 is connected to second engine valve 363 in primary cylinder 368 via duct 396 and switching arrangement 390.

FIG. 19C shows a third switching configuration. Low-pressure manifold 380 is connected to first engine valve 362 in primary cylinder 368 via duct 392 and switching arrangement 388, and to first engine valve 462 in secondary cylinder 468 via duct 492 and switching arrangement 488. Exhaust manifold 386 is connected to second engine valve 363 in primary cylinder 368 via duct 396 and switching arrangement 390, and to second engine valve 463 in secondary cylinder 468 via duct 496 and switching arrangement 490. Medium-pressure manifold 400 and high-pressure manifold 382 are disconnected from the engine valves.

The drawings 19A, 19B, and 19C show only ducts that provide connections between the manifolds and the switching arrangements in each specific case. Arrows in the drawings indicate the direction of air or gas flow. Low-pressure manifold 380, medium-pressure manifold 400 high-pressure manifold 382, and exhaust manifold 386 are labeled by letters L, M, H, and E, respectively.

COMPRESSION BRAKING—Compression braking requires the system to be in the first switching configuration, as illustrated in FIG. 19A. The engine operates as a two-stage compressor, and its cycle is similar to that in the previously described preferred embodiment and can be illustrated by similar pressure-volume diagrams. A description given below refers to the pressure-volume diagrams shown in FIGS. 8 and 9.

A typical pressure-volume diagram of compression braking cycle taking place in primary cylinder 368 (FIG. 19A) can be illustrated by FIG. 8. From point 510 to point 512 all valves are closed, and the fraction of the air-charge, left in the cylinder from the previous cycle, expands, preferably until its pressure drops to the level of pressure in the low-pressure manifold at point 512. This period takes place during a first part of the volume-increasing stroke.

First engine valve 362 (FIG. 19A) opens at variable point 512 and later closes at variable point 514. During this period, atmospheric air is received from low-pressure manifold 380 (FIG. 19A) into the cylinder at constant pressure. This period takes place during a second part of the volume-increasing stroke.

From point 514 to variable point 516, all valves are closed, and the air-charge is compressed until its pressure becomes equal to pressure in medium-pressure manifold 400 (FIG. 19A). This takes place during a first part of the volume-decreasing stroke.

At point 516, second engine valve 363 (FIG. 19A) opens and remains open until its closure at point 510. From point 516 to point 510, air is displaced from the cylinder into medium-pressure manifold 400 (FIG. 19A) at nearly constant pressure. This period takes place during a second part of the volume-decreasing stroke.

A typical pressure-volume diagram of compression braking cycle taking place in secondary cylinder 468 (FIG. 19A) can be illustrated by FIG. 9. From point 520 to point 522 all valves are closed, and the fraction of the air-charge, left in the cylinder from the previous cycle, expands, preferably until its pressure becomes equal to pressure in medium-pressure manifold 400. This period takes place during a first part of the volume-increasing stroke.

Second engine valve 463 (FIG. 19A) opens at variable point 522 and later closes at variable point 524. During this period, previously compressed air is received from medium-pressure manifold 400 into the cylinder at approximately constant pressure. This period takes place during a second part of the volume-increasing stroke.

From point 524 to variable point 526, all valves are closed, and the air-charge is compressed until its pressure becomes equal to pressure in high-pressure manifold 382. This takes place during a first part of the volume-decreasing stroke.

At point 526, first engine valve 462 (FIG. 19A) opens and remains open until its closure at point 520, which is already after the top-dead-center. From point 526 to a point 521, air is displaced from the cylinder into high-pressure manifold 382 (FIG. 19A) at nearly constant pressure. This period takes place during a second part of the volume-decreasing stroke. From point 521 to point 520 the engine piston is already on its downstroke, and some of the air displaced into high-pressure manifold 382 flows back into the cylinder chamber. This is necessary whenever the time period between points 526 and 520 is too short to perform an effective opening and closing of first air valve 462.

FIRST PROPULSION MODE—The first propulsion mode requires the system to be in the second switching configuration, as illustrated in FIG. 19B. The engine operates as a two-stage air motor, and its cycle is similar to that in the previously described preferred embodiment and can be illustrated by similar pressure-volume diagrams. A description given below refers to the pressure-volume diagrams shown in FIGS. 12 and 13.

A typical pressure-volume diagram of the first propulsion mode cycle taking place in secondary cylinder 468 is shown in FIG. 12. First engine valve 462 (FIG. 19B) opens at variable point 530 that is still before the top-dead-center, and later closes at variable point 532. From point 530 to point 531, the engine piston is still on its upstroke and some of the air is displaced from the cylinder into high-pressure manifold 382 (FIG. 19B). From point 531 to point 532, the engine piston is on its downstroke, and, during this period, compressed air is received from high-pressure manifold 382 into the cylinder at approximately constant pressure. This is necessary whenever the net volume of air that has to be received from high-pressure manifold 382 is less than the volume of the cylinder clearance volume, and also to provide a sufficient time period between points 530 and 532 to perform an effective opening and closing of first engine valve 462.

From point 532 to variable point 534 all valves are closed, and the air-charge is expanded until its pressure becomes equal to pressure in medium-pressure manifold 400 (FIG. 19B). This takes place during a second part of the volume-increasing stroke.

At point 534 second engine valve 463 (FIG. 19B) opens and remains open until its closure at point 536. From point 534 to point 536, air is displaced from the cylinder into medium-pressure manifold 400 at nearly constant pressure. This period takes place during a first part of the volume-decreasing stroke.

From point 536 to point 530 all valves are closed, and the fraction of the air-charge, left in the cylinder, is compressed, preferably until its pressure becomes equal to the pressure in high-pressure manifold 382 (FIG. 19B) at point 530. This period takes place during a second part of the volume-decreasing stroke.

A typical pressure-volume diagram of the first propulsion mode cycle, taking place in the primary cylinder 368, is shown in FIG. 13. First engine valve 362 (FIG. 19B) opens at variable point 540 and later closes at variable point 542. During this period, air is received from medium-pressure manifold 400 (FIG. 19B) into the cylinder at approximately constant pressure. This period takes place during a first part of the volume-increasing stroke.

From point 542 to variable point 544, all valves are closed, and the air-charge expands until its pressure becomes equal to pressure in exhaust manifold 386 (FIG. 19B). This takes place during a second part of the volume-increasing stroke.

At point 544, second engine valve 363 (FIG. 19B) opens and remains open until its closure at point 546. From point 544 to point 546, air is displaced from the cylinder into exhaust manifold 386 (FIG. 19B) at nearly constant pressure. This period takes place during a first part of the volume-decreasing stroke.

From point 546 to point 540 all valves are closed, and the fraction of the air-charge, left in the cylinder chamber, is compressed, preferably until its pressure becomes equal to pressure in medium-pressure manifold 400. This period takes place during a second part of the volume-decreasing stroke.

SECOND PROPULSION MODE—The second propulsion mode requires the system to be in the second switching configuration, as illustrated in FIG. 19B. The engine operates as an air motor, in the secondary cylinder; and as an air motor and an internal combustion engine, in the primary cylinder. Its cycle is similar to that in the previously described preferred embodiment and can be illustrated by similar pressure-volume diagrams. A description given below refers to the pressure-volume diagrams shown in FIGS. 12 and 15.

A typical pressure-volume diagram of the second propulsion mode cycle taking place in secondary cylinder 468 (FIG. 19B) is shown in FIG. 12. First engine valve 462 (FIG. 19B) opens at variable point 530 that is still before the top-dead-center, and later closes at variable point 532. From point 530 to point 531, the engine piston is still on its upstroke and some of the air is displaced from the cylinder into high-pressure manifold 382 (FIG. 19B). From point 531 to point 532, the engine piston is on its downstroke, and, during this period, compressed air is received from high-pressure manifold 382 into the cylinder at approximately constant pressure. This is necessary whenever the net volume of air that has to be received from high-pressure manifold 382 is less than the volume of the cylinder clearance volume, and also to provide a sufficient time period between points 530 and 532 to perform an effective opening and closing of first air valve 462.

From point 532 to variable point 534 all valves are closed, and the air-charge is expanded until its pressure becomes equal to pressure in medium-pressure manifold 400 (FIG. 19B). This takes place during a second part of the volume-increasing stroke.

At point 534, second engine valve 463 (FIG. 19B) opens and remains open until its closure at point 536. From point 534 to point 536, air is displaced from the cylinder into medium-pressure manifold 400 at nearly constant pressure. This period takes place during a first part of the volume-decreasing stroke.

From point 536 to point 530 all valves are closed, and the fraction of the air-charge, left in the cylinder, is compressed, preferably until its pressure becomes equal to the pressure in high-pressure manifold 382 (FIG. 19B) at point 530. This period takes place during a second part of the volume-decreasing stroke.

A typical idealized pressure-volume diagram of the second propulsion mode cycle performed in primary cylinder 368 (FIG. 19B) is shown in FIG. 15. First engine valve 362 (FIG. 19B) opens at point 610, and the pressure in the cylinder increases to the level of pressure in medium-pressure manifold 400 (FIG. 21), which corresponds to a point 612. A preferred timing of first engine valve 362 opening is at the top-dead-center. From point 612 to a point 614, the engine piston is displaced by a nearly constant air-pressure in the cylinder. There is only a relatively small drop in pressure associated with expansion of air in medium-pressure manifold 400. This period takes place during a first part of a first volume-increasing stroke.

At point 614 first engine valve 362 closes, and from point 614 to point 616, which is at the bottom-dead-center, the air-charge in cylinder chamber 16 expands. This takes place during a second part of the first volume-increasing stroke.

From point 616 to point 618 the cylinder charge is compressed, fuel is added to it, and the air-fuel mixture is ignited (in some other variants, fuel can be added to the air before it enters the cylinder). From point 618 to point 620 heat generated by combustion increases its pressure at nearly constant volume. This period takes place during a first volume-decreasing stroke.

From point 620 to point 622 combustion is completed, and the expanding combustion gas displaces the engine piston until it reaches its bottom-dead-center at point 622. This takes place during a second volume-increasing stroke.

Second engine valve 363 (FIG. 19B) opens at or shortly before the bottom-dead-center, and the pressure in the cylinder drops to a level equal to the pressure in exhaust manifold, as shown at point 624 (it coincides with point 616 in the diagram). From point 624 to point 626 combustion gas is expelled from the cylinder through the open second engine valve 363 into exhaust manifold 386 (FIG. 19B). This period takes place during a first part of a second volume-decreasing stroke.

At point 626 second engine valve 363 closes, and from point 626 to point 610 all valves are closed and residual-gas compression takes place. This takes place during a second part of the second volume-decreasing stroke.

THIRD PROPULSION MODE—The third propulsion mode requires the system to be in the second switching configuration, as illustrated in FIG. 19B. The engine operates as an air motor, in the secondary cylinder; and as a two-stroke internal combustion engine, in the primary cylinder. Its cycle is similar to that in the previously described preferred embodiment and can be illustrated by similar pressure-volume diagrams. A description given below refers to the pressure-volume diagrams shown in FIGS. 12 and 17.

Operation of secondary cylinder 468 (FIG. 19B) in the third propulsion mode is identical to its operation in the above described second propulsion mode, and it can be illustrated by the pressure-volume diagram FIG. 12.

A typical idealized pressure-volume diagram of the third propulsion mode cycle, performed in primary cylinder 368 (FIG. 19B), is shown in FIG. 17. First engine valve 362 (FIG. 19B) opens at point 710, and the pressure in the cylinder increases to the level of pressure in medium-pressure manifold 400 (FIG. 19B) during an upstroke of the engine piston, which corresponds to point 712. From point 712 to point 714, the engine piston moves against nearly constant pressure in the cylinder. There is only a relatively small increase in pressure associated with compression of air in medium-pressure manifold 400. This takes place during a second part of the volume-decreasing stroke.

At point 714, first engine valve 362 closes, from point 714 to point 716 the cylinder charge is compressed, fuel is added to it, and the air-fuel mixture is ignited (in some other variants, fuel can be added to the air before it enters the cylinder). From point 716 to point 718 heat from combustion increases its pressure at nearly constant volume. This takes place during a third part of the volume-decreasing stroke.

From point 718 to point 720, combustion is completed, and the expanding combustion gas displaces piston 14 until it reaches its bottom-dead-center at point 720. This takes place during the volume-increasing stroke.

Second engine valve 363 (FIG. 19B) opens at or shortly before the bottom-dead-center, and the pressure in the cylinder drops to a level of pressure equal to the pressure in exhaust manifold 386, as shown at point 722. After point 722, upward motion of piston 14 (FIG. 19B) expels combustion gas from the cylinder through the open second engine valve 363 into exhaust manifold 386 (FIG. 19B) until the valve closes. This takes place during a first part of the volume-decreasing stroke. Timing of second engine valve 363 closure determines the quantity of residual gas retained in the cylinder. A preferred timing of second engine valve 363 closing coincides with the timing of first engine valve 362 (FIG. 19B) opening at point 710. From then on, the same cycle is repeated again during the next engine revolution.

FOURTH PROPULSION MODE—The fourth propulsion mode requires the system to be in the third switching configuration, as illustrated in FIG. 19C. The fourth propulsion mode involves repeated performance of a four-stroke cycle, during which the engine operates as a conventional four-stroke internal combustion engine. All first engine valves in all engine cylinders are connected to low-pressure manifold 380 (FIG. 19C), and all second engine valves in all engine cylinders are connected to exhaust manifold 386. Each primary cylinder 368 receives its air-charge through open first engine valve 362 during a first volume-increasing stroke. Then, during a first volume-decreasing stroke, the air-charge is compressed, fuel is added to it, and the air-fuel mixture is ignited (in some other variants, fuel can be added to the air before it enters the cylinder). During a second volume-increasing stroke, the expanding combustion gas performs positive work on the piston, and, during a second volume-decreasing stroke, the gas is expelled from the cylinder through an open second engine valve 363. Secondary cylinder 468 (FIG. 19C) operates in the same way as primary cylinder 368.

Detailed Description of a Third Alternative Embodiment

Figure 4C:
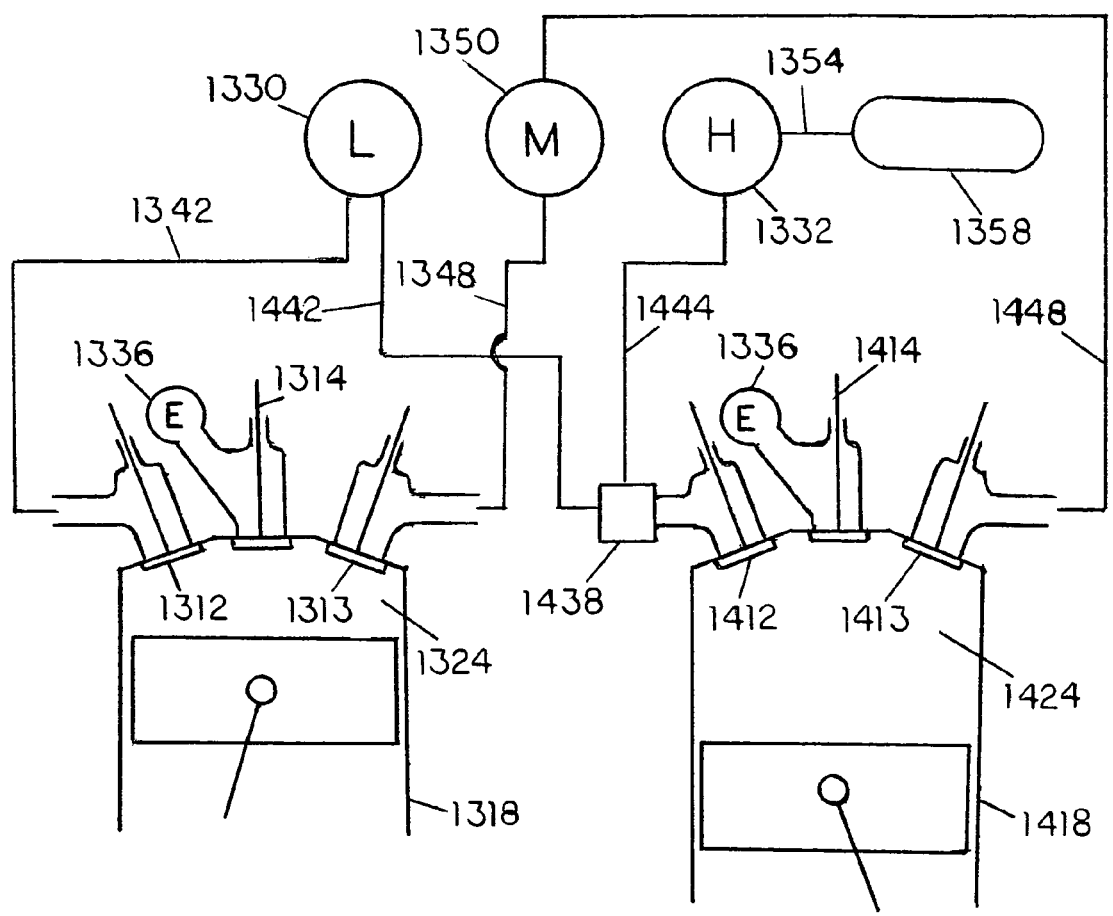
FIG. 4C is a schematic, cross-sectional side-view of engine primary and secondary cylinders and their connection to the engine manifolds and to a compressed-air reservoir, in accordance with a third alternative embodiment of the present invention.

FIGS. 4C and 5A

In a third alternative embodiment of the present invention, the engine has two types of cylinders. These are primary cylinders, in which the connections of the engine valves to the engine manifolds remain unchanged in all modes of operation, and secondary cylinders, in which the connections of the valves to the engine manifolds can be changed during engine operation. FIG. 4C is a schematic, cross-sectional side-view of the engine primary and secondary cylinders and their connections to the engine manifolds and to a compressed-air reservoir, in accordance with the third alternative embodiment of the present invention. Each cylinder has three types of valves that are installed in a cylinder head with the same ports and passages as in the previously described first alternative embodiment. The valves are operated by electrohydraulic actuators, and the operation of the valves is controlled by the control system in the same way as in the above-described preferred embodiment. The engine has at least two cylinders.

As shown in FIG. 4C, a primary cylinder 1318 has three types of normally-closed valves, a first primary air valve 1312, a second primary air valve 1313, and an exhaust valve 1314. A secondary cylinder 1418 has three types of normally-closed valves, a first secondary air valve 1412, a second secondary air valve 1413, and an exhaust valve 1414. Depending on the needs of the engine, there may be more than one valve of each type in each engine cylinder.

First primary air valve 1312 is shown in its closed position in which it separates a cylinder chamber 1324 from a duct 1342 leading to a low-pressure manifold 1330. Second primary air valve 1313 is shown in its closed position in which it separates cylinder chamber 1324 from a duct 1348 leading to a medium-pressure manifold 1350. Exhaust valve 1314 is shown in its closed position in which it separates cylinder chamber 1324 from an exhaust manifold 1336.

First secondary air valve 1412 is shown in its closed position in which it separates a cylinder chamber 1424 from a two-way switching arrangement 1438 that can be selectively connected either to a low-pressure manifold 1330, via a duct 1442, or to a high-pressure manifold 1332, via a duct 1444. A description of a typical two-way switching arrangement was given in a previous text and was illustrated in FIG. 5A. A pipe 1354 connects high-pressure manifold 1332 to an air-reservoir 1358. Second secondary air valve 1413 is shown in its closed position in which it separates cylinder chamber 1424 from a duct 1448 leading to a medium-pressure manifold 1350. Exhaust valve 1414 is shown in its closed position in which it separates cylinder chamber 1424 from exhaust manifold 1336.

Low-pressure manifold 1330, medium-pressure manifold 1350, high-pressure manifold 1332, and exhaust manifold 1336 are labeled by letters L, M, H, and E, respectively.

In the above described example of the third alternative embodiment there is only one low-pressure manifold, one medium-pressure manifold, one high-pressure manifold, and one exhaust manifold. In other cases, however, the engine may have more than one of each type of air manifolds and more than one exhaust manifold.

In all other respects, the above-described alternative embodiment is identical to the previously described preferred embodiment. Those skilled in art will appreciate in view of this disclosure that other valve switching arrangements and other types of switching valves, possibly including rotary valves, may be used to effectuate connection of cylinder chambers in all engine cylinders through respective air and exhaust valves, selectively, to one or another of the three air manifolds and to the exhaust manifold.

The third alternative embodiment needs only one switching arrangement. When compared to other previously described alternative arrangements, this presents an advantage in terms of cost and complexity. The disadvantage of this arrangement is in that, when operating in the fourth propulsion mode, only one of the two air valves in each cylinder is connected to the source of atmospheric air. This may be deleterious to achieving peak engine power in that mode.

Operation of the Third Alternative Embodiment

FIGS. 4C, 8, 9, 12, 15, 17, and 20A to 20C

Figure 20A:
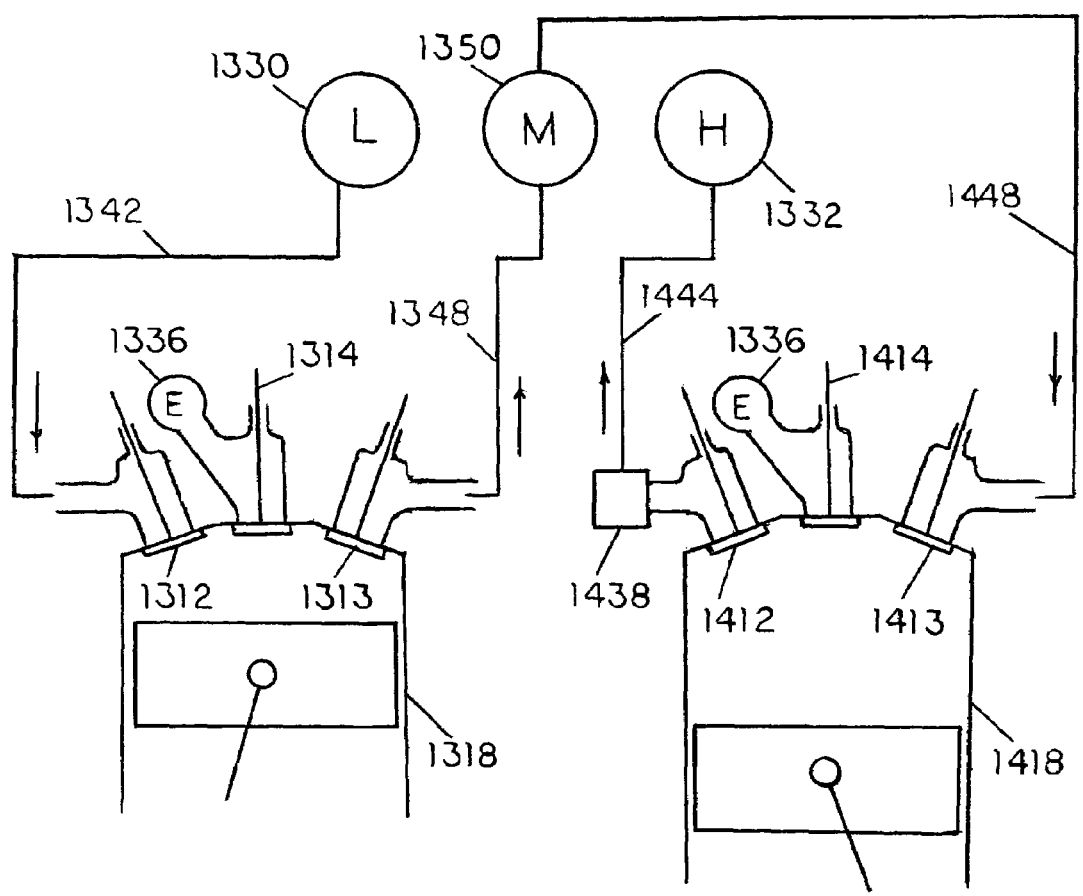
FIG. 20A is a schematic diagram illustrating operation of the primary and secondary cylinders in a compression-braking mode in the third alternative embodiment of the present invention.
Figure 20B:
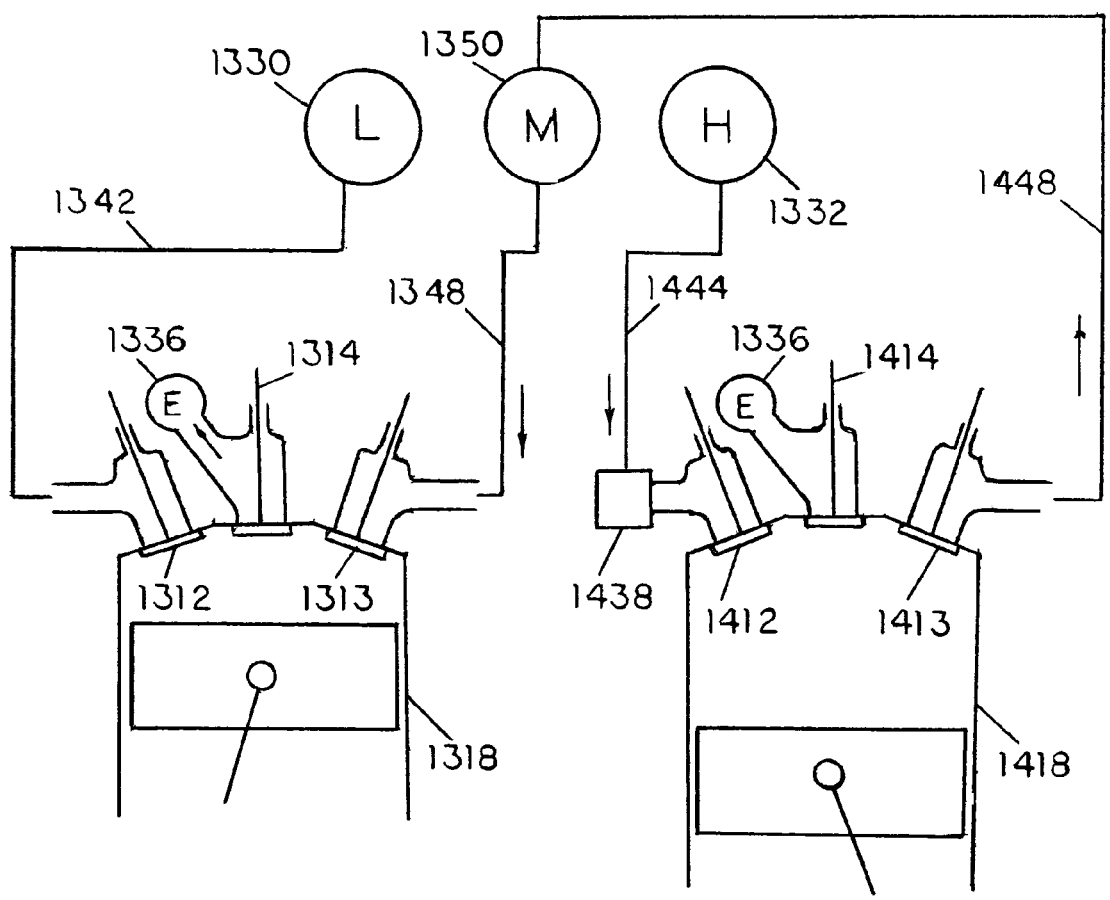
FIG. 20B is a schematic diagram illustrating operation of the primary and secondary cylinders in first, second, and third propulsion modes in the third alternative embodiment of the present invention.
Figure 20C:
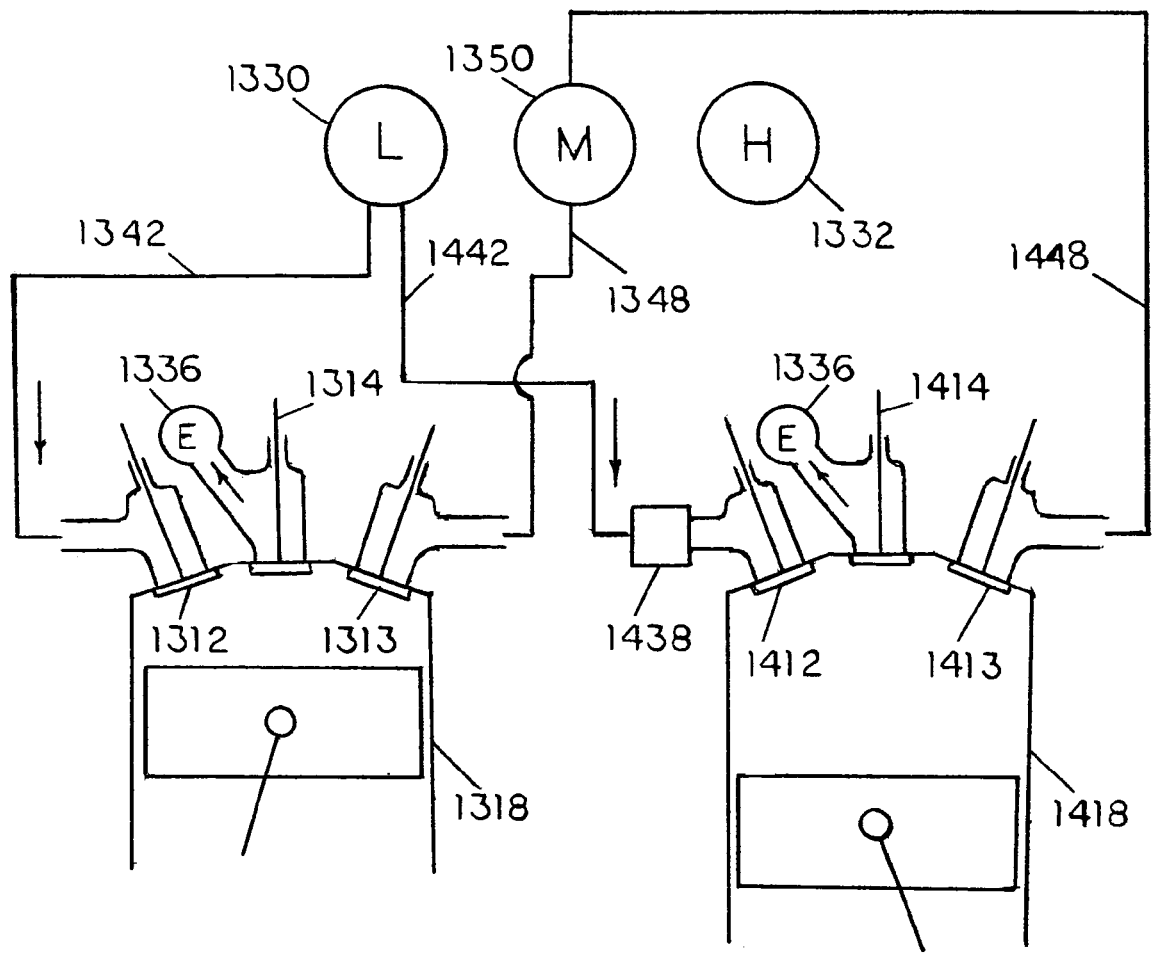
FIG. 20C is a schematic diagram illustrating operation of the primary and secondary cylinders in a fourth propulsion mode in the third alternative embodiment of the present invention.

The third alternative embodiment of the present invention, illustrated in FIG. 4C, can operate in a variety of alternative modes of operation, including compression braking and first, second, third, and fourth propulsion modes. Its ability to operate in each mode depends on a specific configuration of a switching arrangement that can selectively connect one of the two air valves in the secondary cylinders to one or another of the air manifolds. FIGS. 20A, 20B and 20C illustrate the connections for various modes of operation in two different switching configurations for the third alternative embodiment. The engine cylinders are divided into two types: primary cylinders that perform a first stage of air compression or a second stage of air expansion, and secondary cylinders that perform a second stage of air compression or a first stage of air expansion. This is the case described below. In some other cases, the primary cylinders may perform the first stages of both compression and expansion, while the secondary cylinders perform the second stages of both compression and expansion.

FIGS. 20A and 20B both show a first switching configuration. In this configuration low-pressure manifold 1330 is connected to first primary air valve 1312 in primary cylinder 1318, via duct 1342; medium-pressure manifold 1350 is connected to second primary air valve 1313 in primary cylinder 1318, via duct 1348, and to second secondary air valve 1413 in secondary cylinder 1418, via duct 1448; and high-pressure manifold 1332 is connected to first secondary air valve 1412 in secondary cylinder 1418, via duct 1444 and switching arrangement 1438.

FIG. 20C shows a second switching configuration. In this configuration low-pressure manifold 1330 is connected to first primary air valve 1312 in primary cylinder 1318, via duct 1342, and to first secondary valve 1412 in secondary cylinder 1418, via duct 1442 and switching arrangement 1438; medium-pressure manifold 1350 is connected to second primary air valve 1313 in primary cylinder 1318, via duct 1348, and to second secondary air valve 1413 in secondary cylinder 1418, via duct 1448; and high-pressure manifold 1332 is disconnected from first air valve 1412 in secondary cylinder 1418.

In all cases, exhaust valves 1314 and 1414 are connected to exhaust manifold 1336.

The drawings 20A, 20B, and 20C show only ducts that provide connections between the manifolds and the switching arrangements in each specific case. Arrows in the drawings indicate the direction of air or gas flow. Low-pressure manifold 1330, medium-pressure manifold 1350 high-pressure manifold 1332, and exhaust manifold 1336 are labeled by letters L, M, H, and E, respectively.

COMPRESSION BRAKING—Compression braking requires the system to be in the first switching configuration, as illustrated in FIG. 20A. The engine operates as a two-stage compressor, and its cycle is similar to that in the previously described preferred embodiment and can be illustrated by similar pressure-volume diagrams. A description given below refers to the pressure-volume diagrams shown in FIGS. 8 and 9.

A typical pressure-volume diagram of compression braking cycle taking place in primary cylinder 1318 (FIG. 20A) can be illustrated by FIG. 8. Exhaust valve 1314 is deactivated. From point 510 to point 512 all valves are closed, and the fraction of the air-charge, left in the cylinder from the previous cycle, expands, preferably until its pressure drops to the level of pressure in the low-pressure manifold at point 512. This period takes place during a first part of the volume-increasing stroke.

First primary air valve 1312 (FIG. 20A) opens at variable point 512 and later closes at variable point 514. During this period, atmospheric air is received from low-pressure manifold 1330 (FIG. 20A) into the cylinder at constant pressure. This period takes place during a second part of the volume-increasing stroke.

From point 514 to variable point 516, all valves are closed, and the air-charge is compressed until its pressure becomes equal to pressure in medium-pressure manifold 1350 (FIG. 20A). This takes place during a first part of the volume-decreasing stroke.

At point 516, second primary air valve 1313 (FIG. 20A) opens and remains open until its closure at point 510. From point 516 to point 510, air is displaced from the cylinder into medium-pressure manifold 1350 (FIG. 20A) at nearly constant pressure. This period takes place during a second part of the volume-decreasing stroke.

A typical pressure-volume diagram of compression braking cycle taking place in secondary cylinder 1418 (FIG. 20A) can be illustrated by FIG. 9. Exhaust valve 1414 is deactivated. From point 520 to point 522 all valves are closed, and the fraction of the air-charge, left in the cylinder from the previous cycle, expands, preferably until its pressure becomes equal to pressure in medium-pressure manifold 1350. This period takes place during a first part of the volume-increasing stroke.

Second secondary air valve 1413 (FIG. 20A) opens at variable point 522 and later closes at variable point 524. During this period, previously compressed air is received from medium-pressure manifold 1350 into the cylinder at approximately constant pressure. This period takes place during a second part of the volume-increasing stroke.

From point 524 to variable point 526, all valves are closed, and the air-charge is compressed until its pressure becomes equal to pressure in high-pressure manifold 1332. This takes place during a first part of the volume-decreasing stroke.

At point 526, first secondary air valve 1412 (FIG. 20A) opens and remains open until its closure at point 520, which is already after the top-dead-center. From point 526 to a point 521, air is displaced from the cylinder into high-pressure manifold 1332 (FIG. 20A) at nearly constant pressure. This period takes place during a second part of the volume-decreasing stroke. From point 521 to point 520 the engine piston is already on its downstroke, and some of the air displaced into high-pressure manifold 1332 flows back into the cylinder chamber. This is necessary whenever the time period between points 526 and 520 is too short to perform an effective opening and closing of first air valve 412.

FIRST PROPULSION MODE—The first propulsion mode requires the system to be in the first switching configuration. However, the flow of air is different from that in FIG. 20A, and it is illustrated in FIG. 20B. The engine operates as a two-stage air motor, and its cycle is similar to that in the previously described preferred embodiment and can be illustrated by similar pressure-volume diagrams. A description given below refers to the pressure-volume diagrams shown in FIGS. 12 and 13.

A typical pressure-volume diagram of the first propulsion mode cycle taking place in secondary cylinder 1418 is shown in FIG. 12. Exhaust valve 1414 is deactivated. First secondary air valve 1412 (FIG. 20B) opens at variable point 530 that is still before the top-dead-center, and later closes at variable point 532. From point 530 to point 531, the engine piston is still on its upstroke and some of the air is displaced from the cylinder into high-pressure manifold 1332 (FIG. 20B). From point 531 to point 532, the engine piston is on its downstroke, and, during this period, compressed air is received from high-pressure manifold 1332 into the cylinder at approximately constant pressure. This is necessary whenever the net volume of air that has to be received from high-pressure manifold 1332 is less than the volume of the cylinder clearance volume, and also to provide a sufficient time period between points 530 and 532 to perform an effective opening and closing of first secondary air valve 1412.

From point 532 to variable point 534 all valves are closed, and the air-charge is expanded until its pressure becomes equal to pressure in medium-pressure manifold 1350 (FIG. 20B). This takes place during a second part of the volume-increasing stroke.

At point 534 second secondary air valve 1413 (FIG. 20B) opens and remains open until its closure at point 536. From point 534 to point 536, air is displaced from the cylinder into medium-pressure manifold 1350 at nearly constant pressure. This period takes place during a first part of the volume-decreasing stroke.

From point 536 to point 530 all valves are closed, and the fraction of the air-charge, left in the cylinder, is compressed, preferably until its pressure becomes equal to the pressure in high-pressure manifold 1332 (FIG. 20B) at point 530. This period takes place during a second part of the volume-decreasing stroke.

A typical pressure-volume diagram of the first propulsion mode cycle, taking place in the primary cylinder 1318, is shown in FIG. 13. First primary air valve 1312 is deactivated. Second primary air valve 1313 (FIG. 20B) opens at variable point 540 and later closes at variable point 542. During this period, air is received from medium-pressure manifold 1350 (FIG. 20B) into the cylinder at approximately constant pressure. This period takes place during a first part of the volume-increasing stroke.

From point 542 to variable point 544, all valves are closed, and the air-charge expands until its pressure becomes equal to pressure in exhaust manifold 1336 (FIG. 20B). This takes place during a second part of the volume-increasing stroke.

At point 544, exhaust valve 1314 (FIG. 20B) opens and remains open until its closure at point 546. From point 544 to point 546, air is displaced from the cylinder into exhaust manifold 1336 (FIG. 20B) at nearly constant pressure. This period takes place during a first part of the volume-decreasing stroke.

From point 546 to point 540 all valves are closed, and the fraction of the air-charge, left in the cylinder chamber, is compressed, preferably until its pressure becomes equal to pressure in medium-pressure manifold 1350. This period takes place during a second part of the volume-decreasing stroke.

SECOND PROPULSION MODE—The second propulsion mode requires the system to be in the first switching configuration, as illustrated in FIG. 20B. The engine operates as an air motor, in the secondary cylinder; and as an air motor and an internal combustion engine, in the primary cylinder. Its cycle is similar to that in the previously described preferred embodiment and can be illustrated by similar pressure-volume diagrams. A description given below refers to the pressure-volume diagrams shown in FIGS. 12 and 15.

A typical pressure-volume diagram of the second propulsion mode cycle taking place in secondary cylinder 1418 (FIG. 20B) is shown in FIG. 12. Exhaust valve 1414 is deactivated. First secondary air valve 1412 (FIG. 20B) opens at variable point 530 that is still before the top-dead-center, and later closes at variable point 532. From point 530 to point 531, the engine piston is still on its upstroke and some of the air is displaced from the cylinder into high-pressure manifold 1332 (FIG. 20B). From point 531 to point 532, the engine piston is on its downstroke, and, during this period, compressed air is received from high-pressure manifold 1332 into the cylinder at approximately constant pressure. This is necessary whenever the net volume of air that has to be received from high-pressure manifold 1332 is less than the volume of the cylinder clearance volume, and also to provide a sufficient time period between points 530 and 532 to perform an effective opening and closing of first secondary air valve 1412.

From point 532 to variable point 534 all valves are closed, and the air-charge is expanded until its pressure becomes equal to pressure in medium-pressure manifold 1350 (FIG. 20B). This takes place during a second part of the volume-increasing stroke.

At point 534 second secondary air valve 1413 (FIG. 20B) opens and remains open until its closure at point 536. From point 534 to point 536, air is displaced from the cylinder into medium-pressure manifold 1350 at nearly constant pressure. This period takes place during a first part of the volume-decreasing stroke.

From point 536 to point 530 all valves are closed, and the fraction of the air-charge, left in the cylinder, is compressed, preferably until its pressure becomes equal to the pressure in high-pressure manifold 1332 (FIG. 20B) at point 530. This period takes place during a second part of the volume-decreasing stroke.

A typical idealized pressure-volume diagram of the second propulsion mode cycle performed in primary cylinder 1318 (FIG. 20B) is shown in FIG. 15. First primary air valve 1312 is deactivated. Second primary air valve 1313 (FIG. 20B) opens at point 610, and the pressure in the cylinder increases to the level of pressure in medium-pressure manifold 1350 (FIG. 20B), which corresponds to a point 612. A preferred timing of second primary air valve 1313 opening is at the top-dead-center. From point 612 to a point 614 the engine piston is displaced by a nearly constant air-pressure in the cylinder. There is only a relatively small drop in pressure associated with expansion of air in medium-pressure manifold 1350. This period takes place during a first part of a first volume-increasing stroke.

At point 614 second primary air valve 1313 closes, and from point 614 to point 616, which is at the bottom-dead-center, the air-charge in the cylinder expands. This takes place during a second part of the first volume-increasing stroke.

From point 616 to point 618 the cylinder charge is compressed, fuel is added to it, and the air-fuel mixture is ignited (in some other variants, fuel can be added to the air before it enters the cylinder). From point 618 to point 620 heat generated by combustion increases the pressure at nearly constant volume. This period takes place during a first volume-decreasing stroke.

From point 620 to point 622 combustion is completed, and the expanding combustion gas displaces the engine piston until it reaches its bottom-dead-center at point 622. This takes place during a second volume-increasing stroke.

Exhaust valve 1314 (FIG. 20B) opens at or shortly before the bottom-dead-center, and the pressure in the cylinder drops to a nearly atmospheric pressure, as shown at point 624 (it coincides with point 616 in the diagram). From point 624 to point 626 combustion gas is expelled from the cylinder through the open exhaust valve 1314 into exhaust manifold 1336 (FIG. 20B). This period takes place during a first part of a second volume-decreasing stroke.

At point 626 exhaust valve 1314 closes, and from point 626 to point 610 all valves are closed and residual-gas compression takes place. This takes place during a second part of the second volume-decreasing stroke.

THIRD PROPULSION MODE—The third propulsion mode requires the system to be in the first switching configuration, as illustrated in FIG. 20B. The engine operates as an air motor, in the secondary cylinder; and as a two-stroke internal combustion engine, in the primary cylinder. Its cycle is similar to that in the previously described preferred embodiment and can be illustrated by similar pressure-volume diagrams. A description given below refers to the pressure-volume diagrams shown in FIGS. 12 and 17.

Operation of secondary cylinder 1418 (FIG. 20B) in the third propulsion mode is identical to its operation in the above described second propulsion mode, and it can be illustrated by the pressure-volume diagram FIG. 12.

A typical idealized pressure-volume diagram of the third propulsion mode cycle, performed in primary cylinder 1318 (FIG. 20B), is shown in FIG. 17. First primary air valve 1312 is deactivated. Second primary air valve 1313 (FIG. 20) opens at point 710, and the pressure in the cylinder increases to the level of pressure in medium-pressure manifold 1350 (FIG. 20B) during an upstroke of the engine piston, which corresponds to point 712. From point 712 to point 714, the engine piston moves against nearly constant pressure in the cylinder. There is only a relatively small increase in pressure associated with compression of air in medium-pressure manifold 1350. This takes place during a second part of the volume-decreasing stroke.

At point 714, second primary air valve 1313 closes, from point 714 to point 716 the cylinder charge is compressed, fuel is added to it, and the air-fuel mixture is ignited (in some other variants, fuel can be added to the air before it enters the cylinder). From point 716 to point 718 heat from combustion increases the pressure at nearly constant volume. This takes place during a third part of the volume-decreasing stroke.

From point 718 to point 720, combustion is completed, and the expanding combustion gas displaces the engine piston until it reaches its bottom-dead-center at point 720. This takes place during the volume-increasing stroke.

Exhaust valve 1314 (FIG. 20B) opens at or shortly before the bottom-dead-center, and the pressure in the cylinder drops to the level equal to pressure in exhaust manifold 1336, as shown at point 722. After point 722, upward motion of the engine piston expels combustion gas from the cylinder through the open exhaust valve 1314 into exhaust manifold 1336 (FIG. 20B) until the valve closes. This takes place during a first part of the volume-decreasing stroke. Timing of exhaust valve 1314 closure determines the quantity of residual gas retained in the cylinder. A preferred timing of exhaust valve 1314 closing coincides with the timing of second primary air valve 1313 (FIG. 20B) opening at point 710. From then on, the same cycle is repeated again during the next engine revolution.

FOURTH PROPULSION MODE—The fourth propulsion mode requires the system to be in the second switching configuration, as illustrated in FIG. 20C. The fourth propulsion mode involves repeated performance of a four-stroke cycle, during which the engine operates as a conventional four-stroke internal combustion engine. All first primary and first secondary air valves in all engine cylinders are connected to low-pressure manifold 1330 (FIG. 20C). Each primary cylinder 1318 receives its air-charge through open first primary air valve 1312, and each secondary cylinder 1418 receives its air-charge through open first secondary air valve 1412 during a first volume-increasing stroke. Then, during a first volume-decreasing stroke, the air-charge is compressed, fuel is added to it, and the air-fuel mixture is ignited (in some other variants, fuel can be added to the air before it enters the cylinder). During a second volume-increasing stroke the expanding combustion gas performs positive work on the piston, and, during a second volume-decreasing stroke, the gas is expelled from the cylinders through open exhaust valves 1314 and 1414.

Generalized Description of Operation

It is clear from the previous descriptions of the preferred and various alternative embodiments and various modes of operation that the system of the present invention can be arranged and can be operated in a variety of ways. Some of these embodiments and methods of operation were described above, and many other can still be described. It is possible, however, to give a generalized description of the methods of operation employed by this invention that, in abbreviated form, would apply to all embodiments in various modes of operation. This is given below.

COMPRESSION BRAKING—Each primary cylinder receives air from outside atmosphere through at least one of its valves, compresses it, and displaces it through another at least one of its valves into the medium-pressure manifold. Each secondary cylinder receives compressed air from the medium-pressure manifold through at least one of its valves, subjects it to additional compression, and displaces it through another at least one of its valves into the air-reservoir.

FIRST PROPULSION MODE—Each secondary cylinder receives compressed air from the air-reservoir through at least one of its valves, partially expands it, and displaces it through another at least one of its valves into the medium-pressure manifold. Each primary cylinder receives compressed air from the medium-pressure manifold through at least one of its valves, subjects it to additional expansion, and displaces it through another at least one of its valves into outside atmosphere.

SECOND PROPULSION MODE—Each secondary cylinder receives compressed air from the air-reservoir through at least one of its valves, partially expands it, and displaces it through another at least one of its valves into the medium-pressure manifold. Each primary cylinder receives compressed air from the medium-pressure manifold through at least one of its valves, subjects it to additional expansion and uses it for combustion in a four-stroke internal-combustion cycle, and displaces the combustion gas through another at least one of its valves into outside atmosphere.

THIRD PROPULSION MODE—Each secondary cylinder receives compressed air from the air-reservoir through at least one of its valves, partially expands it, and displaces it through another at least one of its valves into the medium-pressure manifold. Each primary cylinder receives compressed air from the medium-pressure manifold through at least one of its valves, uses it for combustion in a two-stroke internal-combustion cycle, and displaces the combustion gas through another at least one of its valves into outside atmosphere.

It was assumed, in the above description, that the primary cylinders perform the first stage of compression and the second stage of expansion, while the secondary cylinders perform the second stage of compression and the first stage of expansion. In other cases, however, the primary cylinders can perform the first stages in both compression and expansion, while the secondary cylinders perform the second stages in both compression and expansion.

Other Modes of Operation

FIGS. 1, 4A, 4B, 10A, 10B, 14C to 14F, and 16B to 16D

During operation in first, second, or third propulsion modes, the engine uses up the supply of compressed air, and the pressure in the air reservoir gradually drops. At some point, pressure in the air-reservoir drops to a level at which two-stage air expansion becomes unnecessary. In such case, the control system can switch the engine to operation with a single-stage air expansion, as described below.

FIFTH PROPULSION MODE—In the fifth propulsion mode, the engine operates as a two-stroke air motor. All engine cylinders receive compressed air from the air-reservoir and, after expansion, exhaust the air into outside atmosphere.

In the preferred embodiment (see FIG. 1), each cylinder receives compressed air from air-reservoir 56 through third valve 24 (via pipe 54 and high-pressure manifold 52) and expands it in cylinder chamber 16, as shown in FIGS. 10A and 10B. Then, the air is exhausted into outside atmosphere through fourth valve 25 (via exhaust manifold 51), as shown in FIG. 11C.

In the first alternative embodiment (see FIG. 4A), each cylinder receives compressed air from air-reservoir 358 through first air valve 312 (via pipe 354, high-pressure manifold 332, and switching arrangement 338) and expands it in cylinder chamber 324. Then, the air is exhausted into outside atmosphere through exhaust valve 314 (via exhaust manifold 336).

In the second alternative embodiment (see FIG. 4B), each cylinder receives compressed air from air-reservoir 408 through first engine valve 362 (via pipe 404, high-pressure manifold 382, and switching arrangement 388) and expands it in cylinder chamber 374. Then, the air is exhausted into outside atmosphere through second engine valve 363 (via switching arrangement 390 and exhaust manifold 386).

The pressure-volume diagram in FIG. 13 can be used to illustrate the cycle in all three cases.

SIXTH PROPULSION MODE—In the sixth propulsion mode, the engine operates using a hybrid four-stroke internal combustion cycle involving two power strokes in all engine cylinders. All engine cylinders receive compressed air from the air-reservoir and, after performing the hybrid cycle, exhaust the air into outside atmosphere.

In the preferred embodiment (see FIG. 1), each cylinder receives compressed air from air-reservoir 56 through third valve 24 (via pipe 54 and high-pressure manifold 52) and expands it in cylinder chamber 16, as shown in FIGS. 10A and 10B. Then, the air is used to perform the hybrid four-stroke internal combustion cycle and is exhausted into outside atmosphere through fourth valve 25 (via exhaust manifold 51), as shown in FIGS. 14C to 14F.

In the first alternative embodiment (see FIG. 4A), each cylinder receives compressed air from air-reservoir 358 through first air valve 312 (via pipe 354, high-pressure manifold 332, and switching arrangement 338) and expands it in cylinder chamber 324. Then, the air is used to perform the hybrid four-stroke internal combustion cycle, and exhaust gas is exhausted into outside atmosphere through exhaust valve 314 (via exhaust manifold 336).

In the second alternative embodiment (see FIG. 4B), each cylinder receives compressed air from air-reservoir 408 through first engine valve 362 (via pipe 404, high-pressure manifold 382, and switching arrangement 388) and expands it in cylinder chamber 374. Then, the air is used to perform the hybrid four-stroke internal combustion cycle, and exhaust gas is exhausted into outside atmosphere through second engine valve 363 (via switching arrangement 390 and exhaust manifold 386).

The pressure-volume diagram in FIG. 15 can be used to illustrate the cycle in all three cases.

SEVENTH PROPULSION MODE—In the seventh propulsion mode, the engine operates using a hybrid two-stroke internal combustion cycle, in which the energy of compressed air supplements the energy released in combustion, in all engine cylinders. All engine cylinders receive compressed air from the air-reservoir and, after performing the hybrid cycle, exhaust the air into outside atmosphere.

In the preferred embodiment (see FIG. 1), each cylinder receives compressed air from air-reservoir 56 through third valve 24 (via pipe 54 and high-pressure manifold 52). Then, the air is used to perform the hybrid two-stroke internal combustion cycle and is exhausted into outside atmosphere through fourth valve 25 (via exhaust manifold 51), as shown in FIGS. 16B to 16D.

In the first alternative embodiment (see FIG. 4A), each cylinder receives compressed air from air-reservoir 358 through first air valve 312 (via pipe 354, high-pressure manifold 332, and switching arrangement 338). Then, the air is used to perform the hybrid two-stroke internal combustion cycle, and exhaust gas is exhausted into outside atmosphere through exhaust valve 314 (via exhaust manifold 336).

The pressure-volume diagram in FIG. 17 can be used to illustrate the cycle in all three cases.

In the second alternative embodiment (see FIG. 4B), each cylinder receives compressed air from air-reservoir 408 through first engine valve 362 (via pipe 404, high-pressure manifold 382, and switching arrangement 388). Then, the air is used to perform the hybrid two-stroke internal combustion cycle, and exhaust gas is exhausted into outside atmosphere through second engine valve 363 (via switching arrangement 390 and exhaust manifold 386).

Description of a Turbocharged Engine Arrangement

FIGS. 1, 4A, 4B, 4C, 4D, 4E, and 25

Figure 4D:
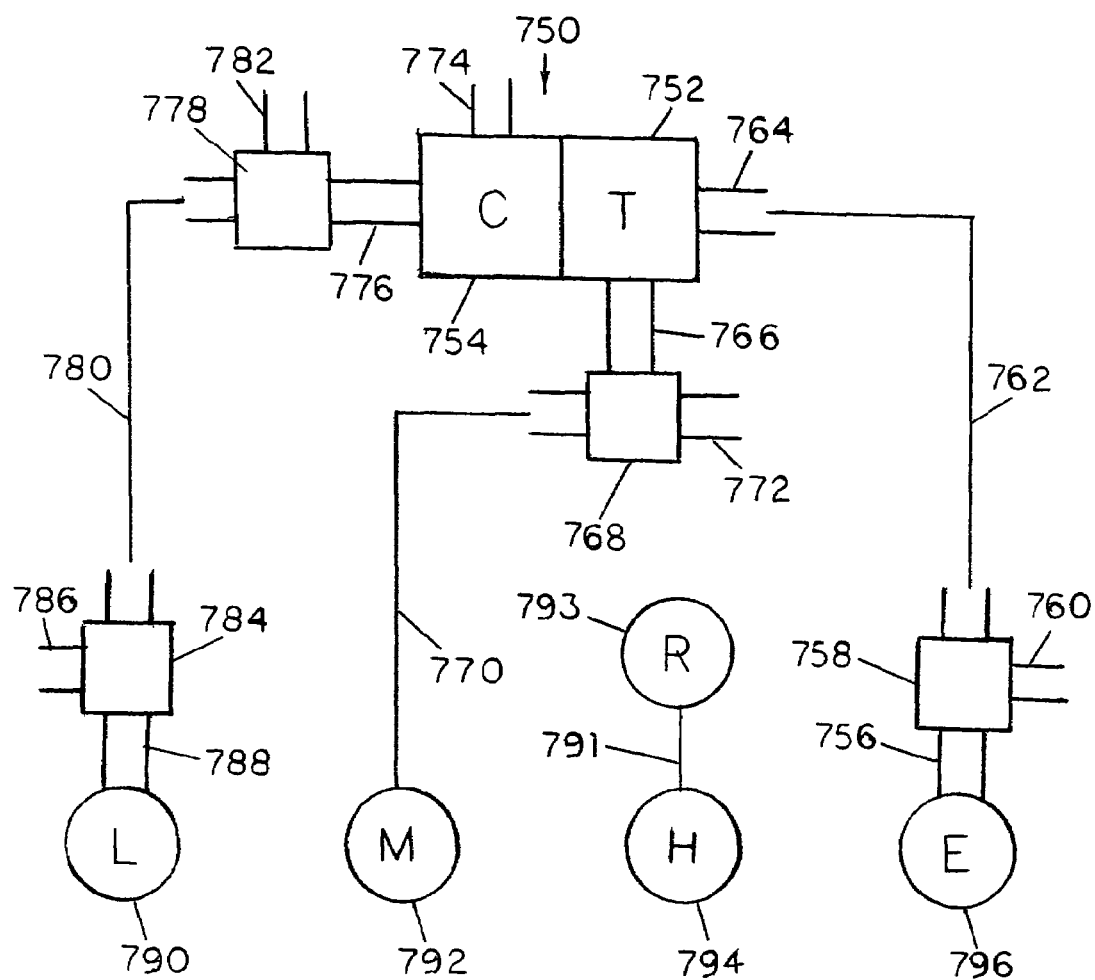
FIGS. 4D and 4E are schematic diagrams showing how a turbocharger can be connected to engine manifolds in accordance with the present invention.
Figure 4E:
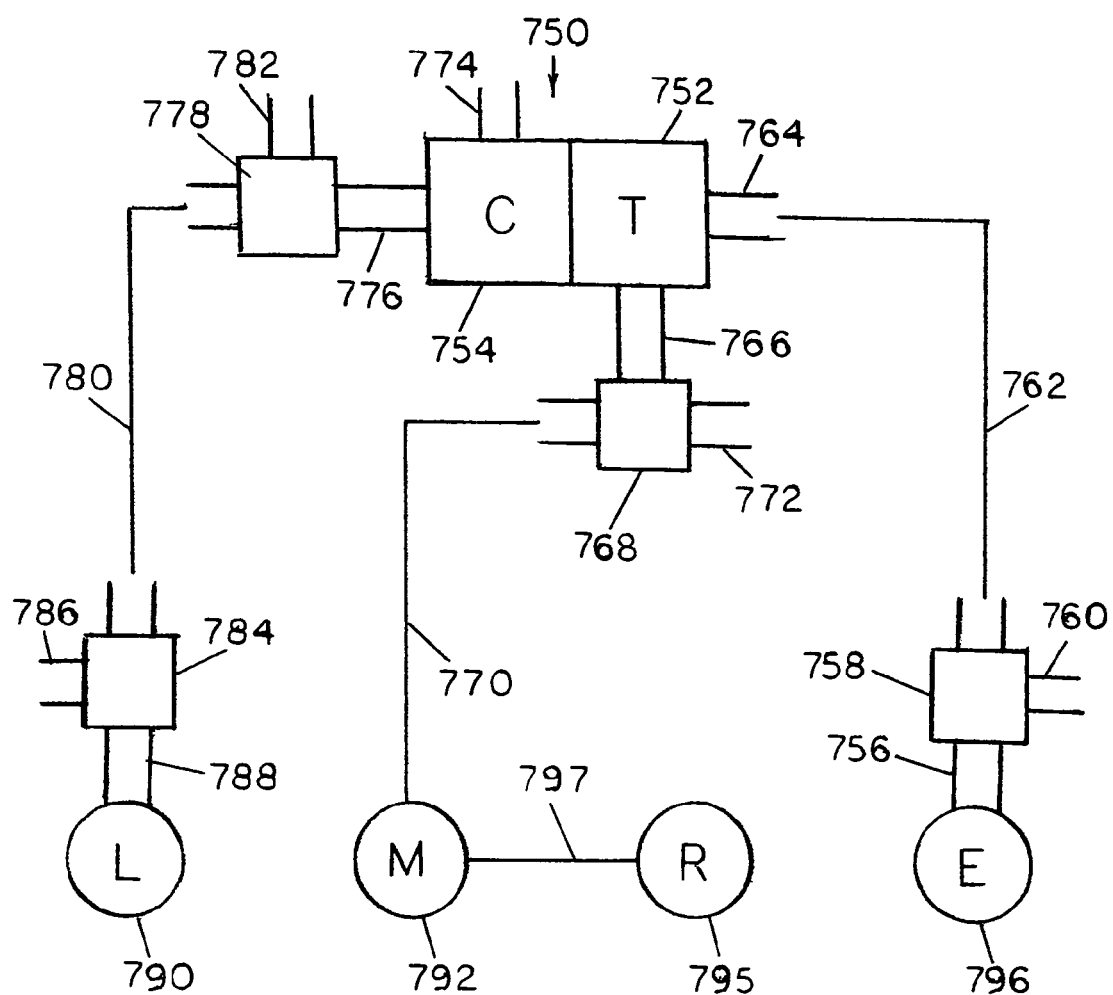

Internal combustion engines are often equipped with one or two turbochargers. The turbocharger is a device that includes a turbine driven by engine exhaust gas, and a turbine-driven compressor that can compress the engine intake air. In this way, the engine can receive greater quantity of air, and its power can be increased. When applied to the present invention, engine turbocharging can also significantly increase the engine braking torque during operation in compression-braking mode. FIGS. 4D and 4E illustrate how a turbocharger can be connected to the engine manifolds in accordance with the present invention. Although only one turbocharger is described, the engine may have more than one turbocharger.

FIG. 4D illustrates an arrangement that can be used with a system using a two-stage compression and a two-stage expansion during compression braking and during air-power-assisted propulsion, respectively. A turbocharger 750 includes a turbine 752 and a compressor 754. A passage 756 connects an exhaust manifold 796 to a two-way switching arrangement 758 that can be selectively connected either to a duct 760, connected to outside atmosphere, or to a duct 762 leading to turbine inlet 764. A passage 788 connects a low-pressure manifold 790 to a two-way switching arrangement 784 that can be selectively connected either to a duct 786, connected to outside atmosphere, or to a duct 780 leading towards compressor 754. A turbine outlet duct 766 connects to a two-way switching arrangement 768 that can be selectively connected either to a duct 772, connected to outside atmosphere, or to a medium-pressure manifold 792, via a duct 770. A compressor outlet 776 connects to a two-way switching arrangement 778 that can be selectively connected either to a duct 782, connected to outside atmosphere, or to duct 780 connected to low-pressure manifold 790, via switching arrangement 784 and passage 788. (In some engines, duct 780 incorporates an intercooler that cools the air.) A compressor inlet duct 774 connects compressor 754 to outside atmosphere. A high-pressure manifold 794 is connected to a high-pressure air-reservoir 793 via a pipe 791.

Low-pressure manifold 790, medium-pressure manifold 792, high-pressure manifold 794, exhaust manifold 796, and high-pressure air-reservoir 793 are labeled by letters L, M, H, E, and R, respectively. Turbine 752 and compressor 754 are labeled by letters T and C, respectively.

During turbocharged engine operation, switching arrangement 758 keeps exhaust manifold 796 connected to turbine inlet 764, and switching arrangement 784 keeps low-pressure manifold 790 connected to compressor outlet 776. If switching arrangements 758 and 784 are switched to connect exhaust manifold 796 and low-pressure manifold 790 directly to outside atmosphere, via ducts 760 and 786, respectively, turbocharger 750 becomes disconnected from the engine and remains inactive. This is done only if non-turbocharged engine operation becomes preferable, which may be the case under light-load operation for braking or propulsion.

The above-described arrangement can be used with any of the previously described embodiments. In case of the preferred embodiment, shown in FIG. 1, the manifolds 790, 792, 794, and 796 correspond to manifolds 40, 46, 52, and 51, respectively. In case of the first alternative embodiment, shown in FIG. 4A, the manifolds 790, 792, 794, and 796 correspond to manifolds 330, 350, 332, and 336, respectively. In case of the second alternative embodiment, shown in FIG. 4B, the manifolds 790, 792, 794, and 796 correspond to manifolds 380, 400, 382, and 386, respectively. In case of the third alternative embodiment, shown in FIG. 4C, the manifolds 790, 792, 794, and 796 correspond to manifolds 1330, 1350, 1332, and 1336, respectively.

A turbocharged engine arrangement very similar to the one described above can be used with a system using a single-stage compression and a single-stage expansion during compression braking and during air-power-assisted propulsion, respectively. Such arrangement is illustrated in FIG. 4E. It is almost identical with the system shown in FIG. 4D and includes, mostly, the same components. The only difference is that high-pressure manifold 794 and high-pressure air-reservoir are absent. Instead, there is a medium-pressure air-reservoir 795 connected to a medium-pressure manifold 792 via a pipe 797. Low-pressure manifold 790, medium-pressure manifold 792, exhaust manifold 796, and medium-pressure air-reservoir 795 are labeled by letters L, M, E, and R, respectively. Turbine 752 and compressor 754 are labeled by letters T and C, respectively.

The engine has at least one cylinder. The cylinder arrangement is similar to that in the above-described embodiments using two-stage compression and expansion. However, the valve system and the connections are simpler. For example, in a preferred embodiment shown in FIG. 25, a valve 990, in an engine cylinder 799, connects to low-pressure manifold 790 via a connection 826, a valve 992 connects to medium-pressure manifold 792 via connection 830, and a valve 796 connects to exhaust manifold 796 via a connection 828. There may also be alternative embodiments using valve-switching arrangements. In all other respects, this system is the same as in the embodiments using two-stage compression and expansion.

Description of Operation with the Turbocharged Engine Arrangement Using Two-Stage Compression and Expansion FIGS. 4D and 21A to 21C The turbocharged engine arrangement, illustrated in FIG. 4D, can be applied to all previously described preferred and alternative embodiments. In each embodiment, the engine can operate in a variety of alternative modes of operation, including compression braking and first, second, third, and fourth propulsion modes. Its ability to operate in each mode depends on a specific configuration of switching arrangements that can selectively connect the outlets from the turbine and the compressor to one or another of the engine air manifolds, or to outside atmosphere. In all cases, the inlet to the turbine is connected to the engine exhaust manifold, and the inlet to the compressor is connected to outside atmosphere.

Figure 21A:
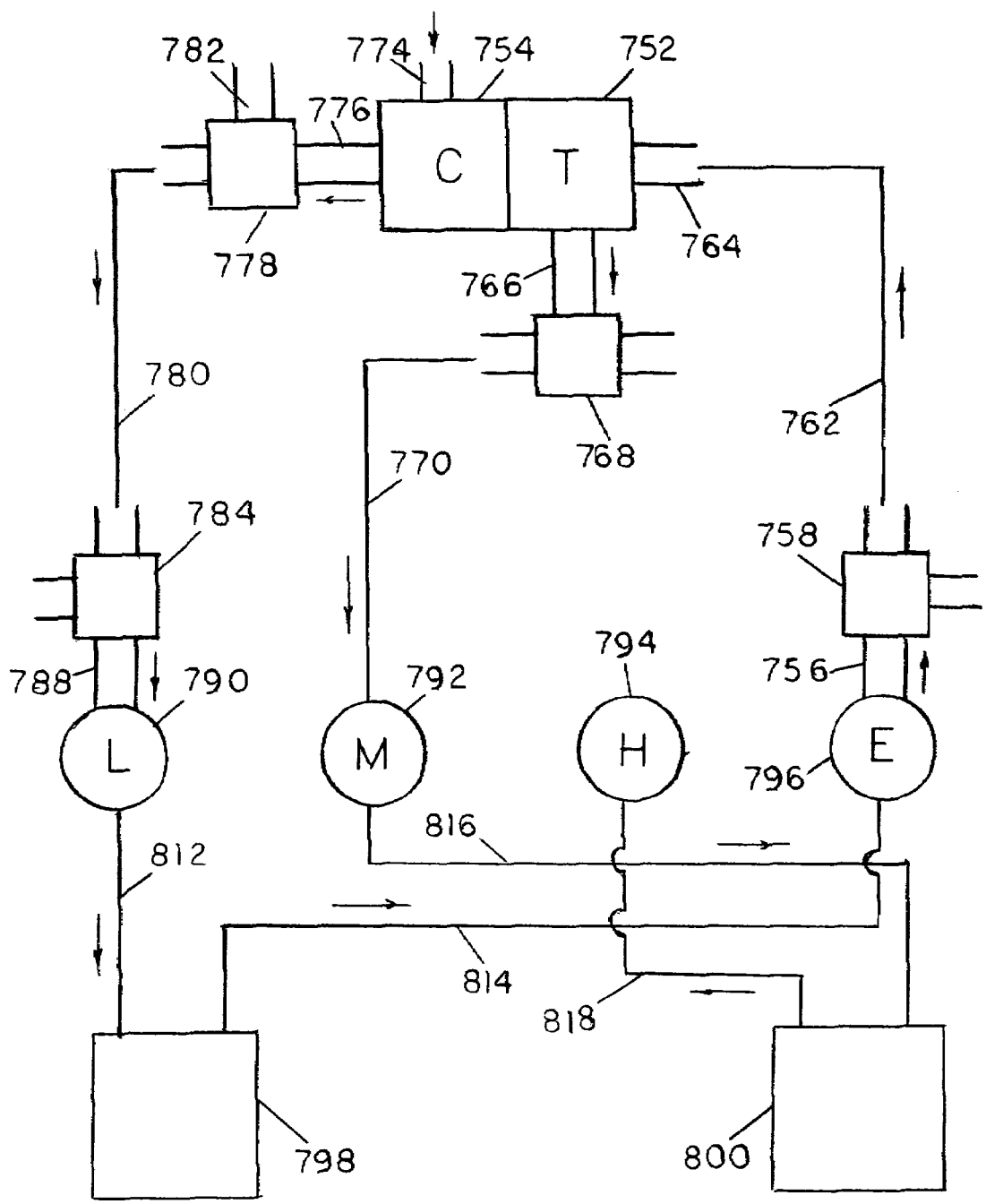
FIG. 21A is a schematic diagram illustrating operation of the primary and secondary cylinders in a compression-braking mode in a turbocharged engine using two stages of compression and two stages of expansion in accordance with the present invention.

FIG. 21A shows a first turbocharger-switching configuration. Switching arrangement 768 connects turbine outlet duct 766 to medium-pressure manifold 792, via duct 770. Switching arrangement 778 connects compressor outlet 776 to low-pressure manifold 790, via duct 780, switching arrangement 784, and passage 788.

Figure 21B:
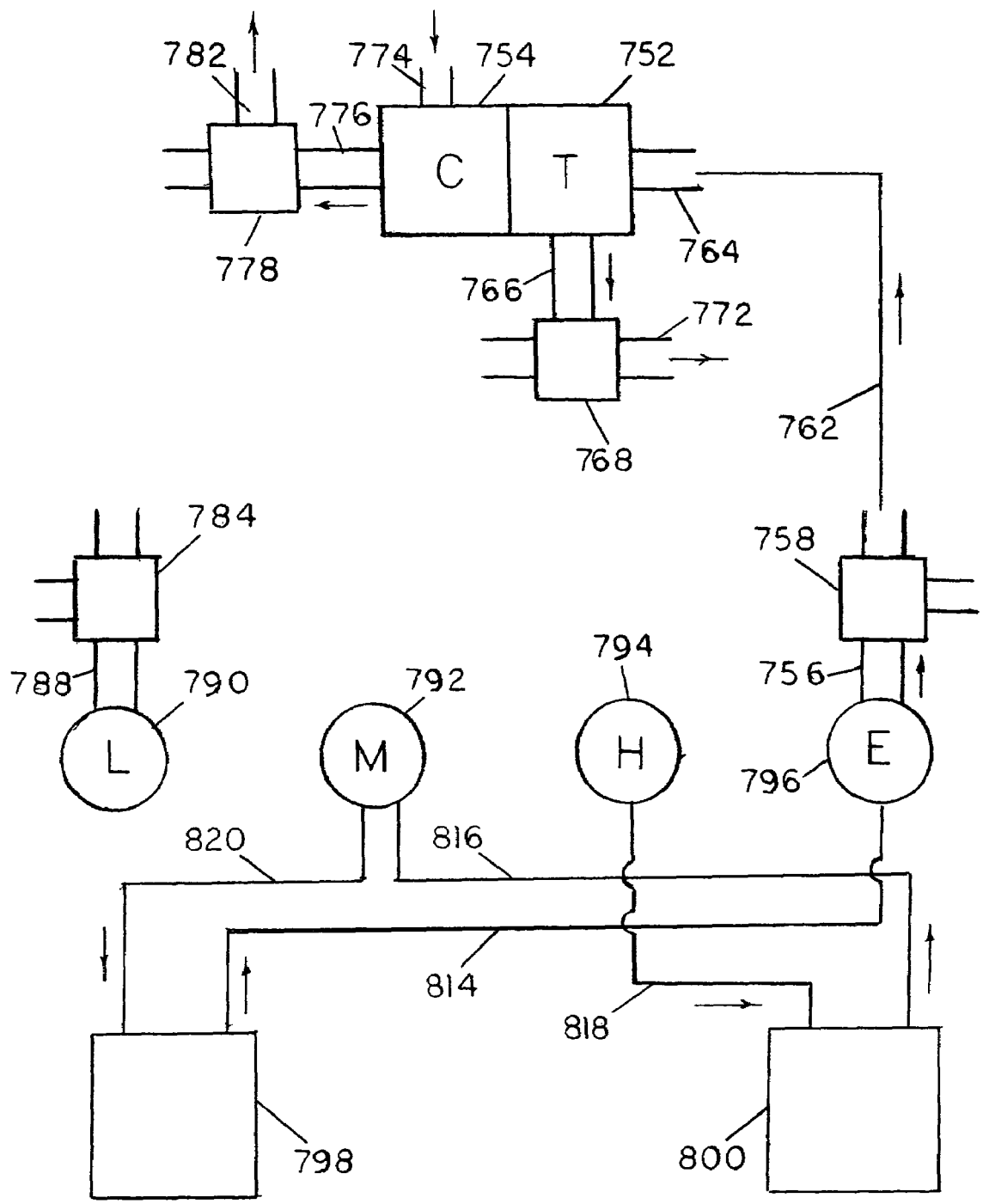
FIG. 21B is a schematic diagram illustrating operation of the primary and secondary cylinders in first, second, and third propulsion modes in a turbocharged engine using two stages of compression and two stages of expansion in accordance with the present invention.

FIG. 21B shows a second turbocharger-switching configuration. Switching arrangements 768 and 778 connect turbine outlet duct 766 and compressor outlet 776, respectively, to outside atmosphere. The turbocharger operates, but the air pumped out by compressor 754 is exhausted into the atmosphere.

Figure 21C:
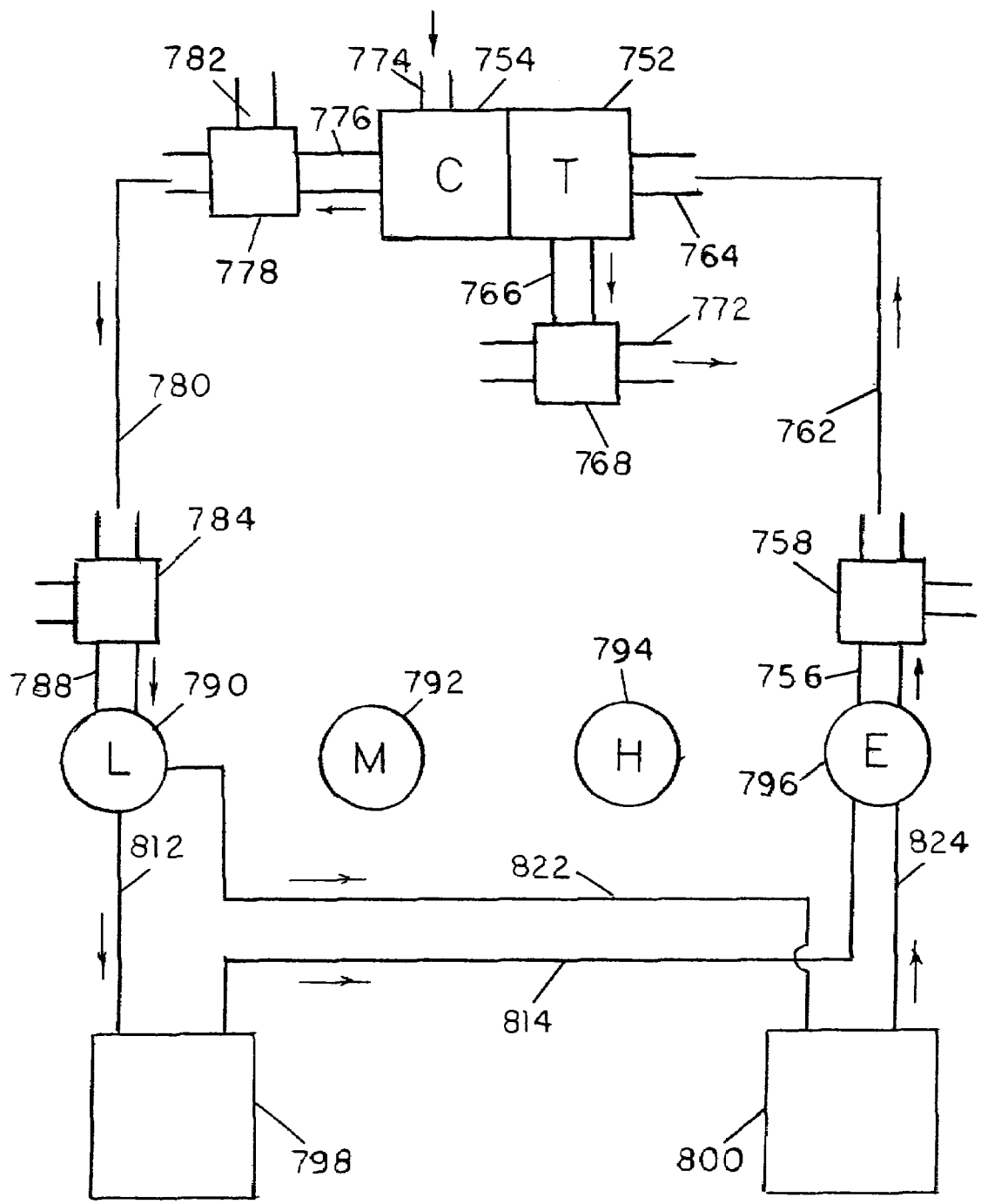
FIG. 21C is a schematic diagram illustrating operation of the primary and secondary cylinders in a fourth propulsion mode in a turbocharged engine using two stages of compression and two stages of expansion in accordance with the present invention.

FIG. 21C shows a third turbocharger-switching configuration. Switching arrangement 768 connects turbine outlet duct 766 to outside atmosphere. Switching arrangement 778 connects compressor outlet 776 to low-pressure manifold 790, via duct 780, switching arrangement 784, and passage 788.

The drawings 21A, 21B, and 21C show only ducts that provide connections between the manifolds and the turbocharger in each specific case. Also high-pressure-reservoir 793 (FIG. 4D) and its connection to high-pressure manifold 794 is not shown. The connections between the manifolds and the primary and secondary cylinders are shown, in each case, as required for each specific mode of engine operation for which the specific turbocharger-switching configuration was tailored. Arrows in the drawings indicate the direction of air or gas flow. Low-pressure manifold 790, medium-pressure manifold 792 high-pressure manifold 794, and exhaust manifold 796 are labeled by letters L, M, H, and E, respectively. Turbine 752 and compressor 754 are labeled by letters T and C, respectively.

COMPRESSION BRAKING—Compression braking requires the system to be in the first turbocharger-switching configuration, as illustrated in FIG. 21A. Compressor 754 receives atmospheric air through compressor inlet duct 774, compresses it, and pumps the compressed air into low-pressure manifold 790, via a compressor outlet 776, switching arrangement 778, duct 780, switching arrangement 784, and passage 788.

A primary cylinder 798 receives air from low-pressure manifold 790 through one of its valves and a connection 812, compresses it, and discharges the compressed air through another one of its valves and a connection 814 into exhaust manifold 796. From there, the compressed air flows through passage 756, switching arrangement 758, duct 762, and turbine inlet 764 into turbine 752, where it drives the turbine wheel. After passing through turbine 752, compressed air flows through turbine outlet duct 766, switching arrangement 768, and duct 770 into medium-pressure manifold 792. Connections 812 and 814, as well as other, subsequently referred to, connections between the manifolds and the engine valves, may include ducts, passages, and switching arrangements, depending on which specific embodiment and mode of operation is used.

A secondary cylinder 800 receives compressed air from medium-pressure manifold 792 through one of its valves and a connection 816, further compresses it, and discharges the compressed air through another one of its valves and a connection 818 into high-pressure manifold 794.

Turbocharging the compression-braking mode of engine operation leads to a substantial increase in the mass of the air charge the engine receives from outside atmosphere during each compression-braking cycle. This increases the negative work-per-cycle and thus increases the vehicle braking torque the engine can provide. Ability to produce a greater peak braking torque is a substantial advantage, especially for big vehicles such as heavy trucks and buses, which require a very high braking torque.

With turbocharged compression braking, greater amount of compressed air is deposited into the air-reservoir. There, it becomes available for assisting in vehicle propulsion during operation in the various air-assisted propulsion modes. The more compressed air is available for propulsion, the less fuel is needed. Hence turbocharging the compression braking improves the engine fuel economy.

FIRST, SECOND, AND THIRD PROPULSION MODES—Each of the above three propulsion modes requires the system to be in the second turbocharger-switching configuration, as illustrated in FIG. 21B. Turbine 752 is driven by air or exhaust gas flowing from exhaust manifold 796 through passage 756, switching arrangement 758, duct 762, and turbine inlet 764, but the output of compressor 754 is discharged into the atmosphere through compressor outlet 776, switching arrangement 778, and duct 782. Hence the turbocharger has no effect on the engine operation, and the engine operates as it was explained in previously described preferred and alternative embodiments without the turbocharging.

Secondary cylinder 800 receives compressed air from high-pressure manifold 794 through one of its valves and connection 818, partially expands it, and displaces it through another one of its valves and connection 816 into medium-pressure manifold 792.

Primary cylinder 798 receives air from medium-pressure manifold 792 through one of its valves and a connection 820 and subjects it to further expansion. In case of a first propulsion mode, the expanded air is discharged from primary cylinder 798 through another one of its valves and connection 814 into exhaust manifold 796. In case of a second propulsion mode, the expanded air is used for combustion in a four-stroke internal-combustion cycle and the exhaust gas is discharged from primary cylinder 798 through another one of its valves and connection 814 into exhaust manifold 796. In case of a third propulsion mode, the expanded air is used for combustion in a two-stroke internal-combustion cycle and the exhaust gas is discharged from primary cylinder 798 through another one of its valves and connection 814 into exhaust manifold 796.

FOURTH PROPULSION MODE—The fourth propulsion mode requires the system to be in the third turbocharger-switching configuration, as illustrated in FIG. 21C. The engine operates as a conventional turbocharged internal combustion engine. Compressor 754 receives atmospheric air through compressor inlet duct 774, compresses it, and pumps the compressed air into low-pressure manifold 790, via a compressor outlet 776, switching arrangement 778, duct 780, switching arrangement 784, and passage 788. Primary cylinder 798 and secondary cylinder 800 receive compressed air from low-pressure manifold 790 through one of the valves, in each cylinder, and connections 812 and 822, respectively, use it for combustion in a four-stroke internal-combustion cycle, and discharge the exhaust gas through another one of the valves, in each cylinder, and connections 814 and 824, respectively, into exhaust manifold 796. From there, the exhaust gas flows through passage 756, switching arrangement 758, duct 762, and turbine inlet 764 into turbine 752, where it drives the turbine wheel. After passing through turbine 752, exhaust gas flows through turbine outlet duct 766, switching arrangement 768, and duct 772 into outside atmosphere.

Description of Operation with the Turbocharged Engine Arrangement Using Single-Stage Compression and Expansion FIGS. 4E, 5A, and 22A to 22C The turbocharged engine arrangement can also be used with a system that employs only a single-stage compression and a single-stage expansion (see FIG. 4E). In that case, there is no division on primary and secondary cylinders. All engine cylinders operate in the same way. The engine can operate in a variety of alternative modes of operation, including compression braking and a variety of compressed-air-assisted modes comprising first, second, third, and fourth propulsion modes.

In the compression-braking mode, each engine cylinder receives compressed air from the compressor, subjects it to further compression in the cylinder, and exhausts it into the exhaust manifold. The exhausted air drives the turbine and, then, is deposited into the air-reservoir.

In the first propulsion mode, each engine cylinder receives compressed air from the air-reservoir, expands it, and exhausts it into the exhaust manifold. The exhausted air drives the turbine, but the air pumped by the compressor is exhausted into the atmosphere.

In the second propulsion mode, each engine cylinder receives compressed air from the air-reservoir, expands it, uses it for combustion in a four-stroke internal-combustion cycle, and exhausts the combustion gas into the exhaust manifold. The exhausted gas drives the turbine, but the air pumped by the compressor is exhausted into the atmosphere.

In the third propulsion mode, each engine cylinder receives compressed air from the air-reservoir, uses it for combustion in a two-stroke internal-combustion cycle, and exhausts the combustion gas into the exhaust manifold. The exhausted gas drives the turbine, but the air pumped by the compressor is exhausted into the atmosphere.

In the fourth propulsion mode, the engine operates as a conventional turbocharged internal-combustion engine.

The engine ability to operate in each mode depends on a specific configuration of switching arrangements that can selectively connect the outlets from the turbine and the compressor to one or another of the engine air manifolds, or to outside atmosphere. In all cases, the inlet to the turbine is connected to the engine exhaust manifold, and the inlet to the compressor is connected to outside atmosphere.

Figure 22A:
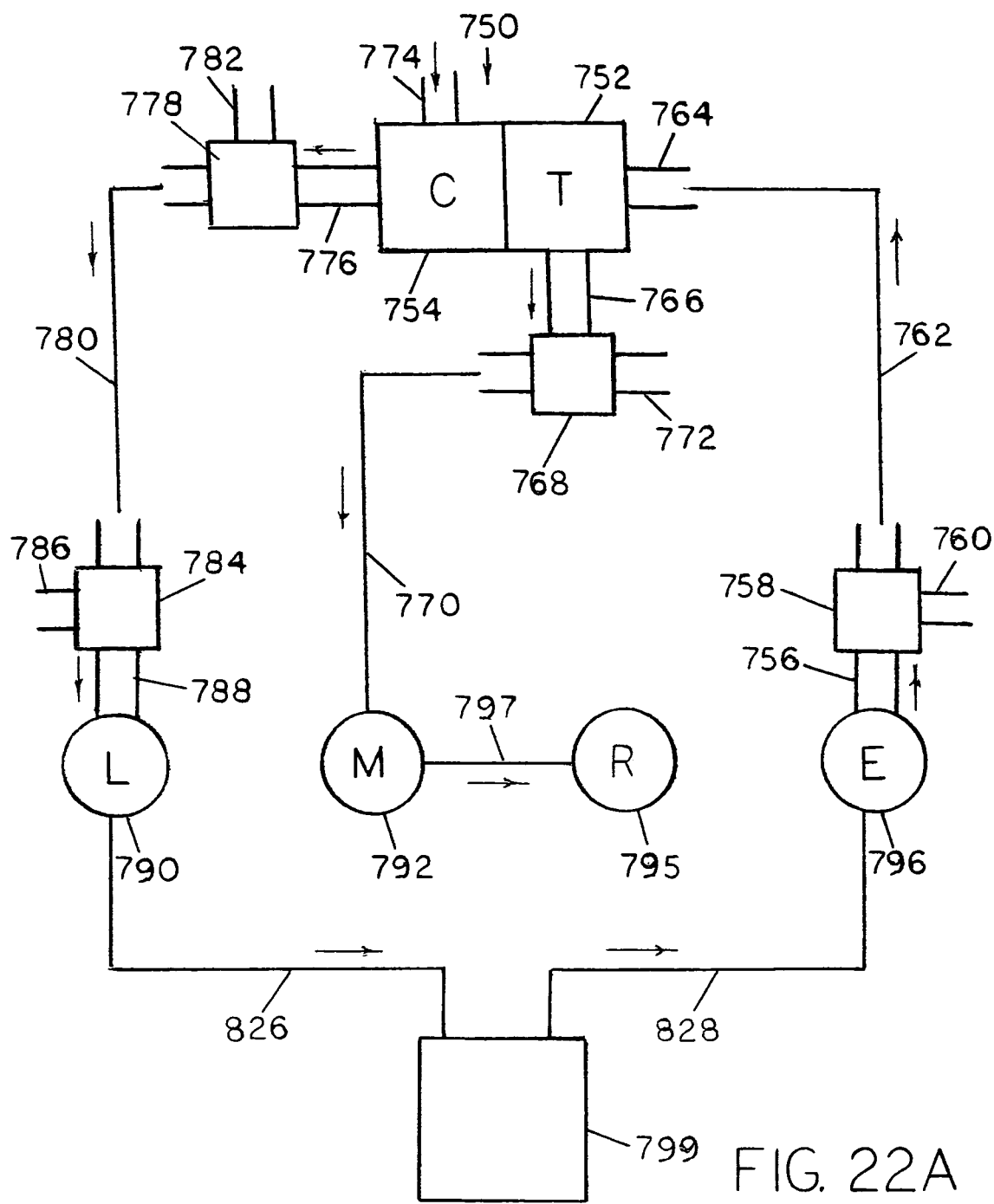
FIG. 22A is a schematic diagram illustrating operation of an engine cylinder in a compression-braking mode in a turbocharged engine using one stage of compression and one stage of expansion in accordance with the present invention.

FIG. 22A shows a first turbocharger-switching configuration. Switching arrangement 768 connects turbine outlet duct 766 to medium-pressure manifold 792, via duct 770. Medium-pressure manifold 792 is always connected to medium-pressure reservoir 795, via pipe 797.

Switching arrangement 778 connects compressor outlet 776 to low-pressure manifold 790, via duct 780, switching arrangement 784, and passage 788.

Figure 22B:
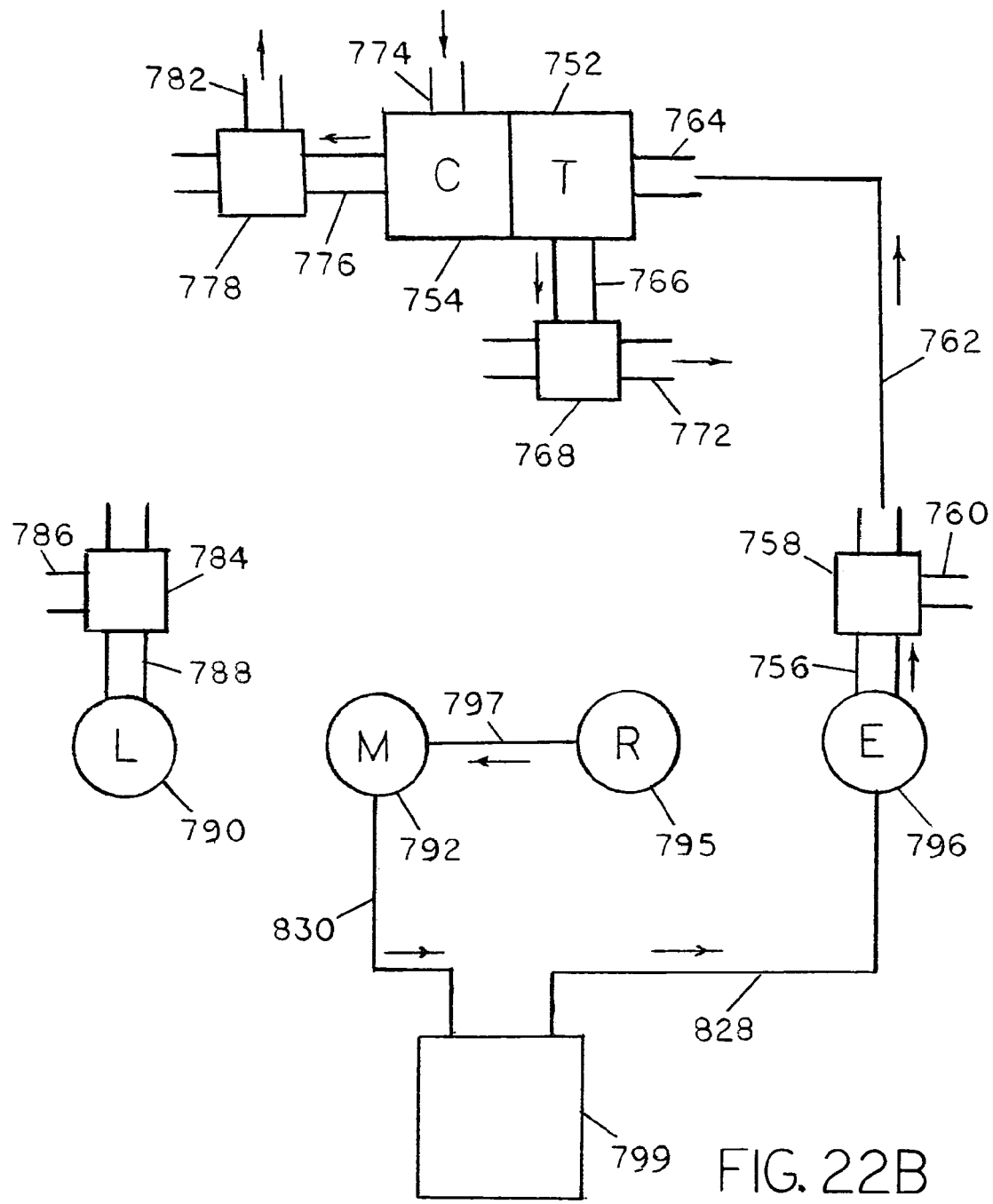
FIG. 22B is a schematic diagram illustrating operation of an engine cylinder in first, second, and third propulsion modes in a turbocharged engine using one stage of compression and one stage of expansion in accordance with the present invention.

FIG. 22B shows a second turbocharger-switching configuration. Switching arrangements 768 and 778 connect turbine outlet duct 766 and compressor outlet 776, respectively, to outside atmosphere. The turbocharger operates, but the air pumped out by compressor 754 is exhausted into the atmosphere.

Figure 22C:
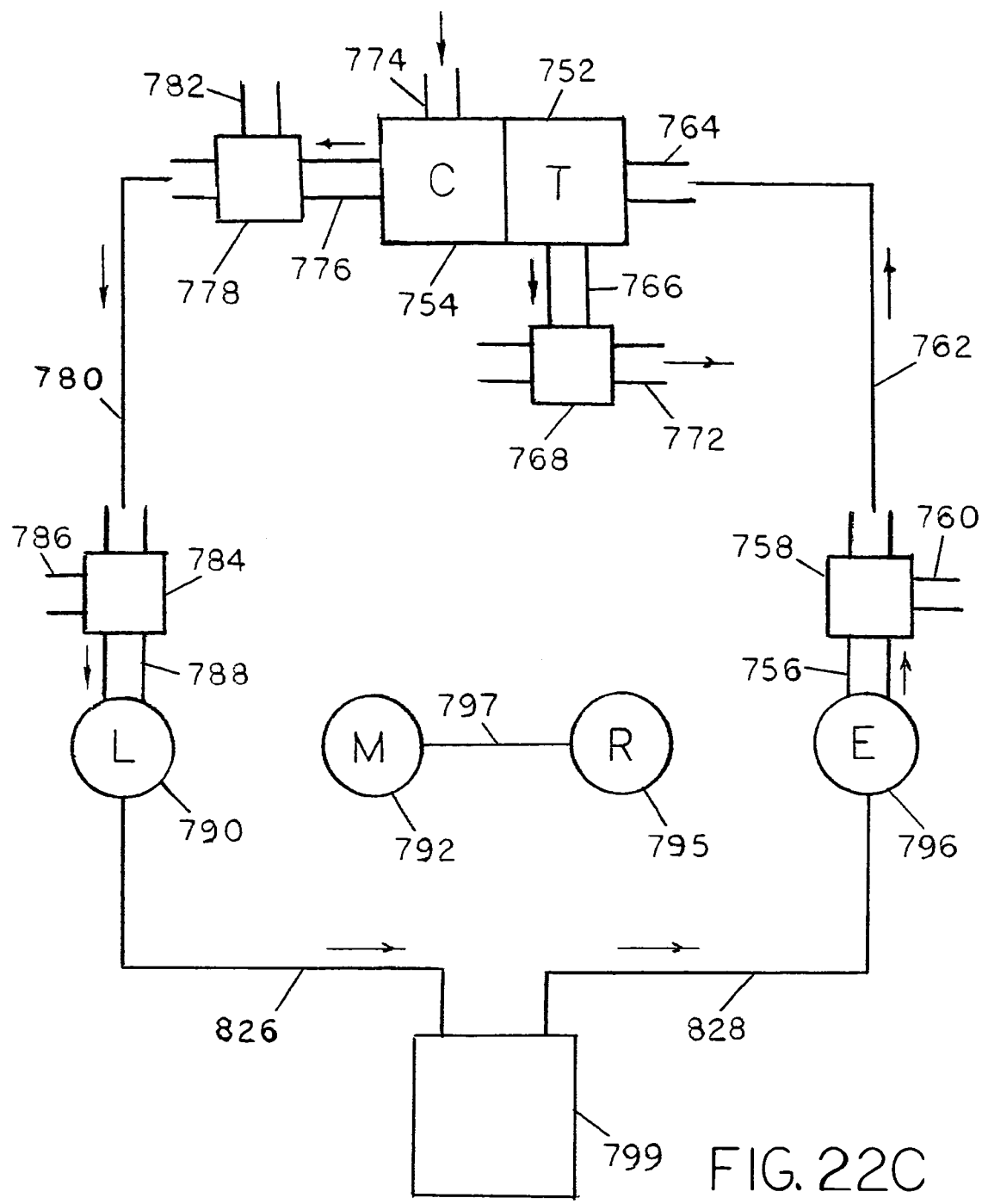
FIG. 22C is a schematic diagram illustrating operation of an engine cylinder in a fourth propulsion mode in a turbocharged engine using one stage of compression and one stage of expansion in accordance with the present invention.

FIG. 22C shows a third turbocharger-switching configuration. Switching arrangement 768 connects turbine outlet duct 766 to outside atmosphere. Switching arrangement 778 connects compressor outlet 776 to low-pressure manifold 790, via duct 780, switching arrangement 784, and passage 788.

The drawings 22A, 22B, and 22C show only ducts that provide connections between the manifolds and the turbocharger in each specific case. The connections between the manifolds and an engine cylinder 799 are shown, in each case, as required for each specific mode of engine operation for which the specific turbocharger-switching configuration was tailored. Arrows in the drawings indicate the direction of air or gas flow. Low-pressure manifold 790, medium-pressure manifold 792, exhaust manifold 796, and medium-pressure air-reservoir 795 are labeled by letters L, M, E, and R, respectively. Turbine 752 and compressor 754 are labeled by letters T and C, respectively.

COMPRESSION BRAKING—Compression braking requires the system to be in the first turbocharger-switching configuration, as illustrated in FIG. 22A. Compressor 754 receives atmospheric air through compressor inlet duct 774, compresses it, and pumps the compressed air into low-pressure manifold 790, via a compressor outlet 776, switching arrangement 778, duct 780, switching arrangement 784, and passage 788.

Engine cylinder 799 receives air from low-pressure manifold 790 through one of its valves and connection 826, compresses it, and discharges the compressed air through another one of its valves and connection 828 into exhaust manifold 796. From there, the compressed air flows through passage 756, switching arrangement 758, duct 762, and turbine inlet 764 into turbine 752, where it drives the turbine wheel. After passing through turbine 752, compressed air flows through turbine outlet duct 766, switching arrangement 768, and duct 770 into medium-pressure manifold 792. From there, the compressed air flows through pipe 797 into medium-pressure air-reservoir 795. Connections 826 and 828, as well as other, subsequently referred to, connections between the manifolds and the engine valves, may include ducts, passages, and switching arrangements, depending on which specific embodiment and mode of operation is used.

FIRST, SECOND, AND THIRD PROPULSION MODES—Each of the above propulsion modes requires the system to be in the second turbocharger-switching configuration, as illustrated in FIG. 22B. Turbine 752 is driven by air or exhaust gas flowing from exhaust manifold 796 through passage 756, switching arrangement 758, duct 762, and turbine inlet 764, but the output of compressor 754 is discharged into the atmosphere through compressor outlet 776, switching arrangement 778, and duct 782. Hence the turbocharger has no effect on the engine operation, and the engine operates either as an air motor or as a compressed-air-assisted internal combustion engine.

Engine cylinder 799 receives air from medium-pressure manifold 792 through one of its valves and connection 830 and, subjects it to further expansion, if needed. In case of the air-motor mode, the expanded air is discharged from engine cylinder 799 through another one of its valves and connection 828 into exhaust manifold 796. In case of the compressed-air-assisted mode, the air is used for combustion in a four- or two-stroke internal-combustion cycle and the exhaust gas is discharged from engine cylinder 799 through another one of its valves and connection 828 into exhaust manifold 796. To be able to switch the connection of engine cylinder 799 from low-pressure manifold 790 to medium-pressure manifold 792, engine cylinder 799 must be either equipped with separate valves dedicated to each connection (as in the above-described preferred embodiment shown in FIG. 25) or to use a two-way switching arrangement, like the one shown in FIG. 5A.

FOURTH PROPULSION MODE—The fourth propulsion mode requires the system to be in the third turbocharger-switching configuration, as illustrated in FIG. 22C. The engine operates as a conventional turbocharged internal combustion engine. Compressor 754 receives atmospheric air through compressor inlet duct 774, compresses it, and pumps the compressed air into low-pressure manifold 790, via a compressor outlet 776, switching arrangement 778, duct 780, switching arrangement 784, and passage 788. Engine cylinder 799 receives compressed air from low-pressure manifold 790 through one of its valves, and connection 826, uses it for combustion in a four-stroke internal-combustion cycle, and discharges the exhaust gas through another one of its valves and connection 828 into exhaust manifold 796. From there, the exhaust gas flows through passage 756, switching arrangement 758, duct 762, and turbine inlet 764 into turbine 752, where it drives the turbine wheel. After passing through turbine 752, exhaust gas flows through turbine outlet duct 766, switching arrangement 768, and duct 772 into outside atmosphere.

Charging the Air-Reservoir During Vehicle Propulsion

FIGS. 1, 4A, 4B, 4C, 6A to 6D, 7A to 7D, 18A, 19A, 20A, and 20C

In addition to charging the air-reservoir with compressed air during braking, such charging can also be performed during vehicle propulsion. This can be accomplished by operating some of the engine cylinders as an internal-combustion engine, and operating the rest of the cylinders as a two-stage compressor pumping compressed air into the air-reservoir. The cylinders operating as an internal combustion engine propel the vehicle and drive the cylinders operating as a compressor. The control system can be programmed to switch the engine to this mode of operation whenever pressure in the air-reservoir drops below some predetermined low value, and terminate this mode when a predetermined high value of pressure is reached. This can be done whenever the power required to propel the vehicle is less than the maximum power of the engine.

In the preferred embodiment (FIG. 1), some of the engine cylinders operate as an internal combustion engine receiving air from low-pressure manifold 40 through first valve 20 and, after combustion, discharging exhaust gas through fourth valve 25 into exhaust manifold 51. The rest of the engine cylinders operate as a two-stage compressor, as illustrated in FIGS. 6A to 6D and FIGS. 7A to 7D. For example, in an eight-cylinder engine, four cylinders can operate as an internal combustion engine, two perform the first stage of compression, and two perform the second stage of compression.

In the first alternative embodiment (FIG. 4A), some of the engine cylinders operate as an internal combustion engine receiving air from low-pressure manifold 330 through switching arrangement 338 and first air valve 312, and, after combustion, discharging exhaust gas through exhaust valve 314 into exhaust manifold 336. The rest of the engine cylinders operate as a two-stage compressor, as illustrated in FIG. 18A.

In the second alternative embodiment (FIG. 4B), some of the engine cylinders operate as an internal combustion engine receiving air from low-pressure manifold 380 through switching arrangement 388 and first engine valve 362, and, after combustion, discharging exhaust gas through second engine valve 363 and switching arrangement 390 into exhaust manifold 386. The rest of the engine cylinders operate as a two-stage compressor, as illustrated in FIG. 19A.

In the third alternative embodiment (FIG. 4C), some of the engine cylinders operate as an internal combustion engine receiving air from low-pressure manifold 1330, and, after combustion, discharging exhaust gas into exhaust manifold 1336, as illustrated in FIG. 20C. The rest of the engine cylinders operate as a two-stage compressor, as illustrated in FIG. 20A.

Keeping the air-reservoir fully charged with compressed air, most of the time, allows using compressed-air-assist during acceleration, when peak engine torque is needed. The additional torque produced by the compressed-air-assist reduces the magnitude of the torque that fuel combustion must produce and leads to a reduction in the required size of the engine. This improves the vehicle fuel economy.

Operation with Very Small Air-Charge Volume

Figure 23:
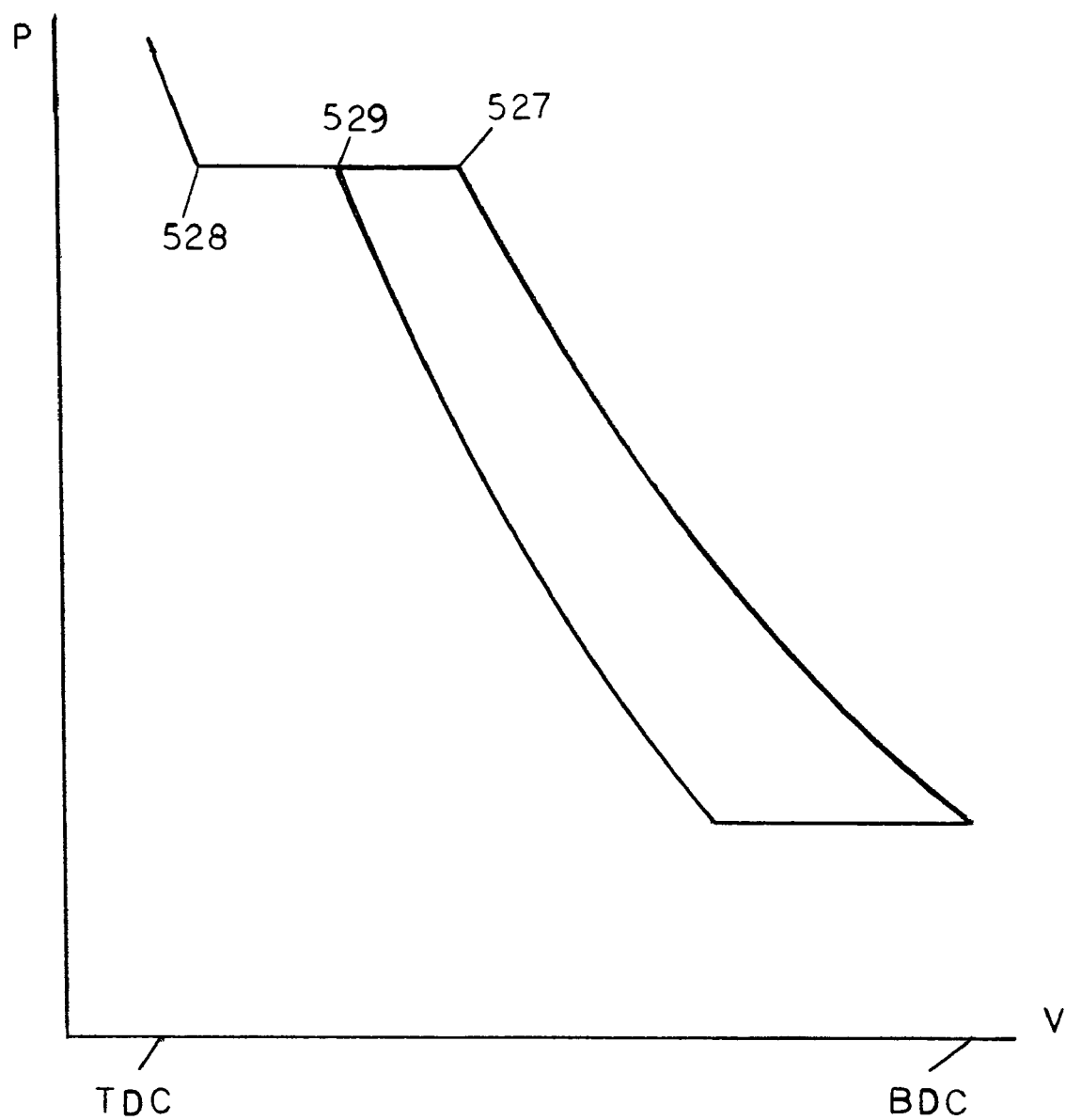
FIG. 23 shows a pressure-volume diagram of engine operation with a very small air-charge volume when there is a net displacement of compressed air out of the secondary cylinder.
Figure 24:
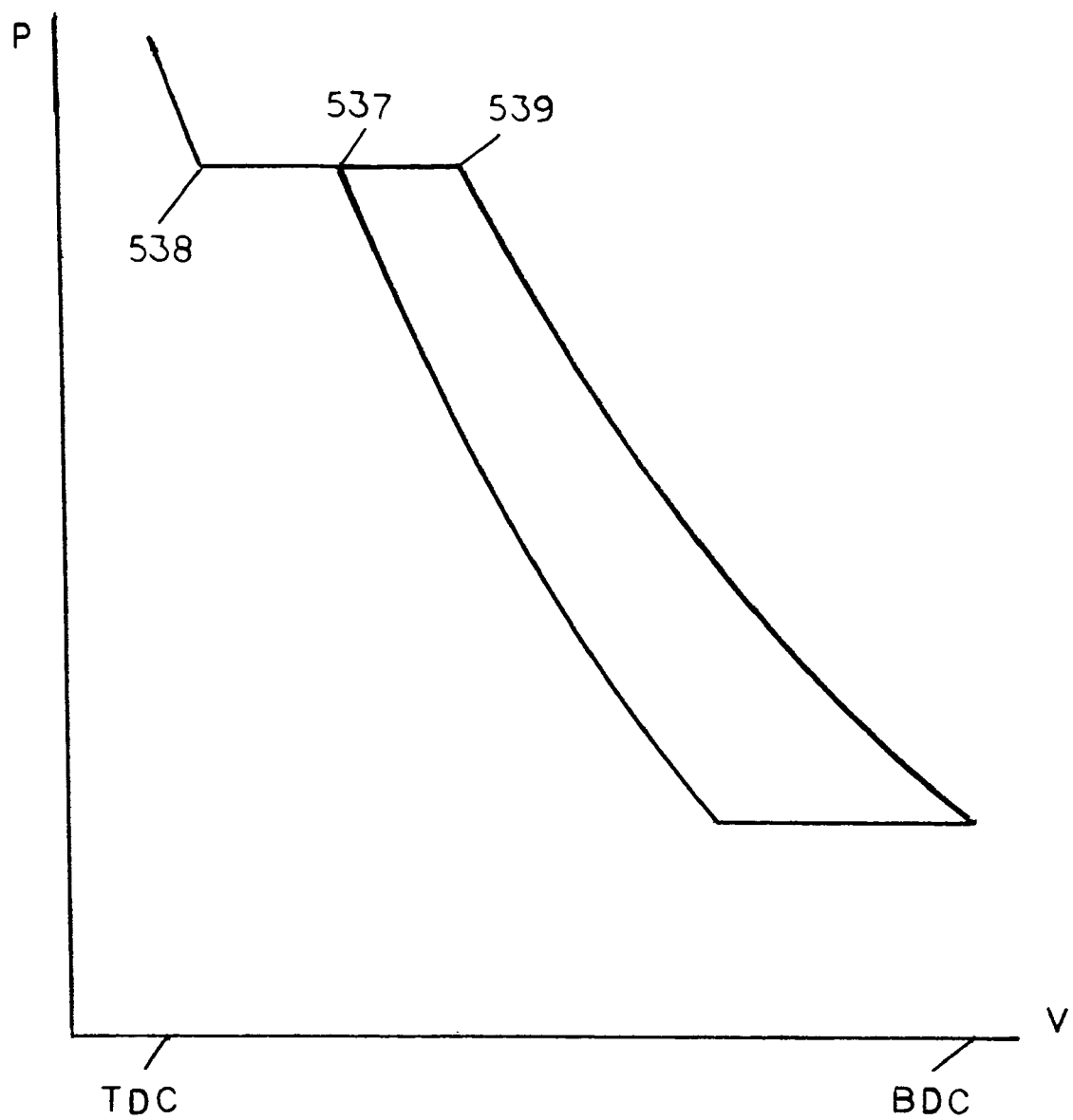
FIG. 24 shows a pressure-volume diagram of engine operation with a very small air-charge volume when there is a net displacement of compressed air into the secondary cylinder.

FIGS. 23 and 24

During the engine operation in the above-described preferred and alternative embodiments, the volume of the compressed air-charge flowing into or out of the cylinder chamber is often very small, due to its high density. This often requires very short duration of the engine valve-opening event, especially during the second stage of compression or the first stage of expansion. A valve-opening event is an event that begins at the beginning of valve-opening motion and lasts till the end of valve-closing motion. To avoid the need for excessively short duration of the valve-opening event, the valve can be opened before the top-dead-center and closed after the top-dead-center. In many instances, however, this solution is impractical, because keeping the valve open when the engine piston is in its top-dead-center position may result in an undesirable direct contact between the valve and the piston.

An alternative solution is to provide the valve, controlling the pressurized air-flow, with ability to open and close twice during the engine revolution—first time during the volume-decreasing stroke, before the top-dead-center (this is a first valve-opening event); and a second time during the volume-increasing stroke, after the top-dead-center (this is a second valve-opening event). When the net flow of compressed air, during the engine revolution, should be out of the cylinder chamber, the volume of air flowing out of the cylinder chamber, during the first valve-opening event, is greater than the volume of air flowing into the cylinder chamber during the second valve-opening event. On the other hand, when the net flow of compressed air should be into the cylinder chamber, the volume of air flowing out of the cylinder chamber, during the first valve-opening event, is smaller than the volume of air flowing into the cylinder chamber during the second valve-opening event. This is illustrated in FIGS. 23 and 24.

FIG. 23 illustrates a net displacement of compressed air out of the cylinder chamber in a secondary cylinder. During the volume-decreasing stroke, the valve connecting the cylinder chamber to the air-reservoir opens at a point 527 (before the top-dead-center) and closes at a point 528 (before the top-dead-center). Between points 527 and 528, compressed air is displaced out of the cylinder chamber. Then, during the volume-increasing stroke, the same valve opens again at point 528 (after the top-dead-center) and closes at a point 529 (after the top-dead-center). Between points 528 and 529, compressed air flows back into the cylinder chamber. The net volume of air displaced out of the cylinder chamber is the cylinder volume between points 527 and 529.

FIG. 24 illustrates a net flow of compressed air into the cylinder chamber in a secondary cylinder. During the volume-decreasing stroke, the valve connecting the cylinder chamber to the air-reservoir opens at a point 537 (before the top-dead-center) and closes at a point 538 (before the top-dead-center). Between points 537 and 538, compressed air is displaced out of the cylinder chamber. Then, during the volume-increasing stroke, the same valve opens again at point 538 (after the top-dead-center) and closes at a point 539 (after the top-dead-center). Between points 538 and 539, compressed air flows back into the cylinder chamber. The net volume of air flowing into the cylinder chamber is the cylinder volume between points 537 and 539.

A camless valvetrain with electrohydraulic valve actuators is inherently capable to provide multiple valve-opening events during a single engine revolution. In fact, it can provide more than two valve-opening events. Other types of valvetrains may have to be specially designed to provide such capability.

Operational Strategy

A preferred operational strategy for the system of the present invention is intended to minimize fuel consumption, whenever possible, and maximize the engine torque and power, whenever needed. To achieve good fuel economy, energy derived from the vehicle motion is accumulated in the air-reservoir during vehicle deceleration and then used to assist in subsequent vehicle acceleration. Additional fuel saving can be realized by eliminating unproductive fuel consumption during vehicle stops and when the vehicle is coasting.

When the vehicle is cruising with a substantially constant speed, the engine, usually, operates as a conventional internal combustion engine in the fourth propulsion mode. During braking, the vehicle is decelerated by compression braking, and the engine pumps compressed air into the air-reservoir. During subsequent vehicle acceleration, the engine operates either in the second, or in the third propulsion mode, thus utilizing the energy previously accumulated during vehicle deceleration. For mild acceleration, the first propulsion mode can be used. Operation in the third propulsion mode is, preferably, used only when the magnitude of the required engine torque exceeds a certain predetermined level, specified in the control system software. During vehicle stops and during coasting, all fuel delivery means are deactivated. To restart the engine, after a full stop, a first propulsion mode is used.

CONCLUSION, RAMIFICATIONS AND SCOPE

Accordingly, it should be evident to the reader that the method and the system of the present invention can assure a substantial improvement in vehicle fuel economy and a reduction in harmful exhaust emission. Moreover, it can do this at a reasonable cost and without encountering major packaging problems. Since the vehicle engine performs both vehicle propulsion, and absorption and recovery of the braking energy, there is no need for a second propulsion system, such as electric motor or hydraulic pump, which is required in other types of hybrid vehicles.

The engine performs vehicle braking by compressing atmospheric air and storing it in an air-reservoir. By subjecting this air to a second compression, as the present invention proposes, a very significant reduction in the size of the air-reservoir can be achieved. In small vehicles, such as automobiles used for personal transportation, the required size of the air-reservoir becomes so small that it can be integrated with the engine by becoming an integral part of the engine manifolds system. This eliminates the air-reservoir as a stand-alone component of the vehicle and reduces the cost and complexity of the vehicle assembly.

The present invention makes the concept of storing the vehicle braking energy acceptable for heavy-truck application. In heavy trucks, the mass of the vehicle is very large, and the amount of kinetic energy, to be absorbed during braking, is huge. Reduction in the required size of the air-reservoir permits to successfully use the above concept in heavy trucks, without the need for excessively large air-reservoir.

The present invention increases the peak braking torque produced by compression braking. Since the second stage of compression can produce greater torque than the first stage, it is possible to produce a peak compression-braking torque of a much greater magnitude than it is possible to achieve in a system using only a single-stage compression. This too is an especially important advantage in heavy trucks and buses, where, due to the huge vehicle mass, the required braking torque is very high.

The braking torque can be substantially increased if the engine is turbocharged. The present invention describes a method and a system for turbocharging the compression braking and saving the compressed air after that. Turbocharging the compression-braking mode of engine operation leads to a substantial increase in the mass of the air charge the engine receives from outside atmosphere during each compression-braking cycle. This further increases the vehicle braking torque the engine can provide.

The present invention contributes to a substantial increase in the peak acceleration torque produced by the engine during compressed-air-assisted acceleration. The increase in peak acceleration torque is due to the fact that, at a comparable compression ratio, the positive work-per-cycle performed during the first stage of air expansion is much greater than the work-per-cycle performed during the second stage. This means that an engine using two stages of expansion can produce a greater torque than an engine using only one stage of expansion. Greater torque is an important advantage when the vehicle is accelerated from zero speed.

There is also a benefit in terms of exhaust emission. The present invention contributes to a reduction in the amount of harmful exhaust emissions during compressed-air-assisted operation. Since the cylinders performing the initial expansion receive compressed air directly from the air-reservoir, where the pressure is very high most of the time, and they complete the cycle once every engine revolution (as opposed to once every two revolutions in the other cylinders), they can produce peak torque equal or greater in magnitude than what the cylinders burning fuel can produce. The additional work performed by compressed air in both types of cylinders reduces the amount of work that must be performed by combustion. This, in turn, reduces the peak temperature in the cylinder, which leads to a reduction in the amount of nitrogen oxide produced.

Also the weight of the vehicle can be reduced. An increase in the peak engine torque and power, without an increase in engine displacement, creates an opportunity for a reduction in engine size (smaller engine displacement). This is a significant advantage, since a smaller engine consumes less fuel during part-load operation. Another factor contributing to reduction in weight is elimination of the air-reservoir as a stand-alone unit.

The present invention also offers numerous other advantages, such as possible elimination of electric starter, due to ability to start the engine with compressed air; possible elimination of exhaust gas recirculation system, due to ability to retain residual gas in the cylinder; reduction in friction brakes wear due to reduced use; etc.

Although the description above contains many specificities, these should not be construed as limiting the scope of the invention, but as merely providing illustrations of some of the presently preferred embodiments of this invention. For example, although the description considered that air, after expansion, is exhausted into the atmosphere through the vehicle exhaust system, in some other cases the air may be exhausted back into the intake system. Also, the detailed description mostly considered that fuel was added to air directly into the engine cylinder. In many other cases, however, fuel may be added to air before it enters the cylinder. It was also considered that air was transferred from one cylinder to another through a medium-pressure manifold. In some cases, however, it may be possible to transfer air directly from one cylinder to another. Although the description mostly refers to road vehicles such as automobiles, the present invention can also be used in all-terrain vehicles, motorcycles, railroad engines, tractors, military vehicles, ships, etc.

Thus the scope of the invention should be determined by the appended claims and their legal equivalents, rather than by the examples given.

I claim:

1. A method of operating a wheeled vehicle, said method comprising the steps of:
    (a) providing an engine mounted in said vehicle and coupled to at least one vehicle wheel for its propulsion and braking, said engine including at least two cylinders and a cylinder chamber within each of said at least two cylinders,
    (b) providing an air-reservoir means mounted in said vehicle and connected to said engine for receiving, storage, and discharge of compressed air,
    (c) providing a gas exchange controlling means for accommodating and controlling gas flow into, inside, and out of said engine and between said engine and said air-reservoir means,
    (d) operating said engine in a compression-braking mode driven by a vehicle momentum in response to a demand for a vehicle braking force, when said vehicle is in motion and a vehicle braking force is needed, by repeatedly performing a compression-braking cycle, during which air is received from outside atmosphere into at least one of said at least two cylinders, compressed there, transferred to another at least one of said at least two cylinders, subjected to at least one additional compression, and displaced into said air-reservoir means for storage therein,
        whereby energy of the vehicle motion is transformed into energy of compressed air stored in said air-reservoir means,
        whereby said at least one additional compression increases said vehicle braking force, and whereby an increase in temperature of said air, associated with said at least one additional compression, reduces the mass of air required to absorb said energy of vehicle motion and reduces the required volume of said air-reservoir means, and (e) operating said engine in a prime mover mode propelling said vehicle when vehicle propulsion force is needed, said prime mover mode including:

(A) operating said engine in a mode selected from a variety of propulsion modes comprising:

(1) a first propulsion mode including repeated performance of a multi-stage air-motor cycle, during which a charge of compressed air is received from said air-reservoir means, subjected to at least two successive stages of expansion in said at least two cylinders, and exhausted into said outside atmosphere, whereby said vehicle is propelled without any fuel being consumed, (2) a second propulsion mode comprising:

repeated performance of a two-stroke air-motor cycle in at least one of said at least two cylinders, said two-stroke air-motor cycle including a first stage of expansion of a compressed-air charge received from said air-reservoir means into said cylinder chamber and expulsion of said compressed-air charge from said cylinder chamber, and repeated performance of a hybrid four-stroke cycle in another at least one of said at least two cylinders, said hybrid four-stroke cycle comprising two power strokes:

a first power stroke including a second stage of expansion of said compressed-air charge during a first volume-increasing stroke, and a second power stroke including expansion of combustion gas, produced as a result of fuel combustion, in said cylinder chamber during a second volume-increasing stroke, whereby work performed during said first power stroke is added to work performed during said second power stroke, (3) a third propulsion mode comprising:

repeated performance of a two-stroke air-motor cycle in at least one of said at least two cylinders, said two-stroke air-motor cycle including a first stage of expansion of a compressed-air charge received from said air-reservoir means into said cylinder chamber and expulsion of said compressed-air charge from said cylinder chamber, and repeated performance of a hybrid two-stroke internal-combustion cycle in another at least one of said at least two cylinders, during which said compressed-air charge is received into said cylinder chamber and used for combustion during the same cycle, whereby energy of said compressed-air charge supplements the energy released in combustion, (4) a fourth propulsion mode including operating said engine in a conventional internal-combustion mode receiving air from said outside atmosphere, and (B) changing said engine operation from one propulsion mode to another one selected from said variety of propulsion modes.

2. The method of claim 1 further including the steps of:
(a) providing a head mounted to said at least two cylinders, (b) providing a piston within each said cylinder chamber, with the piston to head and cylinder relationship being such that the volume of said cylinder chamber shrinks during a volume-decreasing stroke, when said piston moves toward said head, and expands during a volume-increasing stroke, when said piston moves away from said head, (d) providing a fuel delivery means for selectively and variably adding fuel to the air intended for participation in combustion in said engine in timed relation to said engine operation, (e) providing means for allowing a vehicle driver to perform vehicle control functions including:
(1) selectively demanding a vehicle braking force,
(2) selectively demanding a vehicle propulsion force,
(3) selectively demanding a change in magnitude of said vehicle braking force, and
(4) selectively demanding a change in magnitude of said vehicle propulsion force, and (f) providing a control means for controlling the operation of said engine and said vehicle in response to driver's demands and in accordance with a control program incorporated in said control means.

3. The method of claim 1 wherein said variety of propulsion modes further includes:

(a) a fifth propulsion mode including repeated performance of a two-stroke air-motor cycle in each of said at least two cylinders, during which a charge of compressed air is received from said air-reservoir means, subjected to expansion in said cylinder chamber, and exhausted into said outside atmosphere, whereby said vehicle is propelled without any fuel being consumed, (b) a sixth propulsion mode including repeated performance of a hybrid four-stroke cycle in each of said at least two cylinders, said hybrid four-stroke cycle comprising two power strokes:

(1) a first power stroke including expansion of a compressed-air charge, received from said air-reservoir means, in said cylinder chamber during a first volume-increasing stroke, and (2) a second power stroke including expansion of combustion gas, produced as a result of fuel combustion, in said cylinder chamber during a second volume-increasing stroke, whereby work performed during said first power stroke is added to work performed during said second power stroke, and (c) a seventh propulsion mode including repeated performance of a hybrid two-stroke internal combustion cycle in each of said at least two cylinders, during which a compressed-air charge is received into said cylinder chamber from said air-reservoir means and used for combustion during the same cycle, whereby energy of said compressed-air charge supplements the energy released in combustion.

4. The method of claim 1 wherein said variety of propulsion modes further comprises a hybrid propulsion mode including operating some of said engine cylinders in a conventional internal-combustion mode, in which air is received from said outside atmosphere into said some of said engine cylinders and used for combustion therein, and operating the rest of said engine cylinders in a compressor mode, in which air is received from said outside atmosphere, subjected to at least two successive stages of compression in said rest of said engine cylinders, and displaced into said air-reservoir means, whereby the engine cylinders operating in said conventional internal-combustion mode propel said vehicle and drive the engine cylinders operating in said compressor mode, and whereby said air-reservoir means can be recharged with compressed air whenever the power required to propel said vehicle is less than the maximum power of said engine.

5. The method of claim 1 further comprising the steps of providing at least one friction brake and activating said at least one friction brake when operating said engine in said compression-braking mode, whereby the braking force produced by said at least one friction brake supplements the braking force produced by said engine.

6. The method of claim 1 further comprising the steps of providing a transmission means for selectively coupling said engine to said at least one vehicle wheel with a variable transmission ratio, and responding to a demand for a change in magnitude of said vehicle braking force by selectively changing said transmission ratio.

7. The method of claim 2 further comprising the steps of:
  (a) providing a heating jacket surrounding said air-reservoir means, and
  (b) flowing exhaust gas through said heating jacket during operation of said engine, whereby escape of heat from the air in said air-reservoir means is prevented.

8. The method of claim 7 further comprising the steps of:
  (a) providing a gas flow control means for controlling flow of exhaust gas through said heating jacket,
  (b) providing a temperature sensor for measuring temperature of air inside said air-reservoir means,
  (c) providing said control means with information from said temperature sensor and with ability to cooperate with said gas flow control means to control said flow of exhaust gas through said heating jacket, and
  (d) using said control means to control said flow of exhaust gas in a manner which assures that said temperature of air inside said air-reservoir means is maintained within a predetermined range.

9. The method of claim 2 further comprising the step of responding to said demand for a change in magnitude of said vehicle braking force, or to said demand for a change in magnitude of said vehicle propulsion force, by making changes in timing of operation of said gas exchange controlling means.

10. The method of claim 2 wherein the step of providing an engine including at least two cylinders further includes the steps of:
  (a) providing at least one primary cylinder for performing a first stage of air compression when said engine operates in said compression-braking mode, and for performing a second stage of air expansion when said engine operates in said first, second, and third propulsion modes, and
  (b) providing at least one secondary cylinder for performing a second stage of air compression when said engine operates in said compression-braking mode, and for performing a first stage of air expansion when said engine operates in said first, second, and third propulsion modes.

11. The method of claim 10 wherein the step of providing said gas exchange controlling means further comprises the steps of:
  (a) providing a manifold means for accommodating gas flow into, inside, and out of said engine, said manifold means including:
    (1) at least one low-pressure manifold connected to said outside atmosphere,
    (2) at least one medium-pressure manifold,
    (3) at least one high-pressure manifold connected to said air-reservoir means, and
    (4) at least one exhaust manifold connected to said outside atmosphere, and
  (c) providing valves for selectively, variably, and alternatively connecting said cylinder chamber to said manifold means in timed relation to said engine operation.

12. The method of claim 11 wherein said valves include at least one valve that can operate with multiple valve-opening events during an engine revolution, said valve-opening events including:
  (a) a first valve-opening event that takes place during said volume-decreasing stroke and accommodates flow of air out of said cylinder chamber, and
  (b) a second valve-opening event that takes place during said volume-increasing stroke and accommodates flow of air into said cylinder chamber,
  whereby the net flow of air, during said engine revolution, is out of said cylinder chamber when volume of air flowing out of said cylinder chamber during said first valve-opening event is greater than volume of air flowing into said cylinder chamber during said second valve-opening event,
  whereby the net flow of air, during said engine revolution, is into said cylinder chamber when volume of air flowing out of said cylinder chamber during said first valve-opening event is smaller than volume of air flowing into said cylinder chamber during said second valve-opening event, and
  whereby a very small volume of airflow out of or into said cylinder chamber can be achieved without resorting to excessively short duration of a valve-opening event.

13. The method of claim 11 wherein:
  (a) the step of operating said engine in said compression-braking mode further comprises the steps of:
    (1) receiving air from said outside atmosphere through at least one of said valves into said cylinder chamber in at least one of said at least two cylinders, compressing it in said at least one of said at least two cylinders, and displacing it from said at least one of said at least two cylinders through another at least one of said valves into said at least one medium-pressure manifold, and
    (2) receiving air from said at least one medium-pressure manifold through at least one of said valves into said cylinder chamber in another at least one of said at least two cylinders, compressing it in said another at least one of said at least two cylinders, and displacing it from said another at least one of said at least two cylinders through another at least one of said valves into said air-reservoir means,
  (b) operation of said engine in said first propulsion mode further comprises the steps of:
    (1) receiving compressed air from said air-reservoir means through at least one of said valves into said cylinder chamber in at least one of said at least two cylinders, expanding it in said at least one of said at least two cylinders, and displacing it from said at least one of said at least two cylinders through another at least one of said valves into said at least one medium-pressure manifold, and
    (2) receiving air from said at least one medium-pressure manifold through at least one of said valves into said cylinder chamber in another at least one of said at least two cylinders, expanding it in said another at least one of said at least two cylinders, and displacing it from said another at least one of said at least two cylinders through another at least one of said valves into said outside atmosphere, (c) operation of said engine in said second propulsion mode further comprises the steps of:
  (1) receiving compressed air from said air-reservoir means through at least one of said valves into said cylinder chamber in at least one of said at least two cylinders, expanding it in said at least one of said at least two cylinders, and displacing it from said at least one of said at least two cylinders through another at least one of said valves into said at least one medium-pressure manifold, and
  (2) receiving air from said at least one medium-pressure manifold through at least one of said valves into said cylinder chamber in another at least one of said at least two cylinders, expanding it and using it for combustion in a four-stroke internal-combustion cycle performed in said another at least one of said at least two cylinders, and displacing combustion gas from said another at least one of said at least two cylinders through another at least one of said valves into said outside atmosphere, and (d) operation of said engine in said third propulsion mode further comprises the steps of:
  (1) receiving compressed air from said air-reservoir means through at least one of said valves into said cylinder chamber in at least one of said at least two cylinders, expanding it in said at least one of said at least two cylinders, and displacing it from said at least one of said at least two cylinders through another at least one of said valves into said at least one medium-pressure manifold, and
  (2) receiving air from said at least one medium-pressure manifold through at least one of said valves into said cylinder chamber in another at least one of said at least two cylinders, using it for combustion in a two-stroke internal-combustion cycle performed in said another at least one of said at least two cylinders, and displacing combustion gas from said another at least one of said at least two cylinders through another at least one of said valves into said outside atmosphere.

14. The method of claim 11 wherein the step of providing said valves further comprises the steps of:
  (a) providing at least one first valve for selectively and variably connecting said cylinder chamber to said at least one low-pressure manifold,
  (b) providing at least one second valve for selectively and variably connecting said cylinder chamber to said at least one medium-pressure manifold,
  (c) providing at least one third valve for selectively and variably connecting said cylinder chamber to said at least one high-pressure manifold, and
  (d) providing at least one fourth valve for selectively connecting said cylinder chamber to said at least one exhaust manifold.

15. The method of claim 14 wherein a first air compression performed in said at least one primary cylinder, during operation of said engine in said compression-braking mode, further comprises, during each two-stroke cycle, the steps of:
  (a) deactivating said fuel delivery means,
  (b) deactivating said at least one fourth valve,
  (c) deactivating said at least one third valve,
  (d) expanding the residual compressed air during a first part of said volume-increasing stroke,
  (e) variably opening said at least one first valve,
  (f) receiving air from said at least one low-pressure manifold into said cylinder chamber during a second part of said volume-increasing stroke,
  (g) variably closing said at least one first valve,
  (h) compressing said air in said cylinder chamber during a first part of said volume-decreasing stroke,
  (i) variably opening said at least one second valve,
  (j) substantially displacing the compressed air from said cylinder chamber into said at least one medium-pressure manifold during a second part of said volume-decreasing stroke, and
  (k) variably closing said at least one second valve, and wherein a second air compression performed in said at least one secondary cylinder, during operation of said engine in said compression-braking mode, further comprises, during each two-stroke cycle, the steps of:
  (a) deactivating said fuel delivery means,
  (b) deactivating said at least one fourth valve,
  (c) deactivating said at lest one first valve,
  (d) expanding the residual compressed air during a first part of said volume-increasing stroke,
  (e) variably opening said at least one second valve,
  (f) receiving air from said at least one medium-pressure manifold into said cylinder chamber during a second part of said volume-increasing stroke,
  (g) variably closing said at least one second valve,
  (h) compressing said air in said cylinder chamber during a first part of said volume-decreasing stroke,
  (i) variably opening said at least one third valve,
  (j) substantially displacing the compressed air from said cylinder chamber into said at least one high-pressure manifold, and
  (k) variably closing said at least one third valve.

16. The method of claim 14 wherein a first stage of air expansion performed in said at least one secondary cylinder, during operation of said engine in said first propulsion mode, further comprises, during each two-stroke cycle, the steps of:
  (a) deactivating said fuel delivery means,
  (b) deactivating said at least one fourth valve,
  (c) deactivating said at lest one first valve,
  (d) variably opening said at least one third valve,
  (e) receiving compressed air from said at least one high-pressure manifold into said cylinder chamber during a first part of said volume-increasing stroke,
  (f) variably closing said at least one third valve,
  (g) expanding said compressed air in said cylinder chamber during a second part of said volume-increasing stroke,
  (h) variably opening said at least one second valve,
  (i) substantially displacing the air from said cylinder chamber into said at least one medium-pressure manifold during said volume-decreasing stroke, and
  (j) variably closing said at least one second valve, and wherein a second stage of air expansion performed in said at least one primary cylinder, during operation of said engine in said first propulsion mode, further comprises, during each two-stroke cycle, the steps of:
  (a) deactivating said fuel delivery means,
  (b) deactivating said at least one first valve,
  (c) deactivating said at lest one third valve,
  (d) variably opening said at least one second valve,
  (e) receiving air from said at least one medium-pressure manifold into said cylinder chamber during a first part of said volume-increasing stroke,
  (f) variably closing said at least one second valve, (g) expanding said air in said cylinder chamber during a second part of said volume-increasing stroke,
(h) variably opening said at least one fourth valve,
(i) substantially displacing the air from said cylinder chamber into said at least one exhaust manifold during said volume-decreasing stroke, and
(j) variably closing said at least one fourth valve.

17. The method of claim 14 wherein said performance of a two-stroke air-motor cycle in said at least one secondary cylinder, during operation of said engine in said second propulsion mode, further comprises, during each two-stroke cycle, the steps of:
(a) deactivating said fuel delivery means,
(b) deactivating said at least one fourth valve,
(c) deactivating said at lest one first valve,
(d) variably opening said at least one third valve,
(e) receiving compressed air from said at least one high-pressure manifold into said cylinder chamber during a first part of said volume-increasing stroke,
(f) variably closing said at least one third valve,
(g) expanding said compressed air in said cylinder chamber during a second part of said volume-increasing stroke,
(h) variably opening said at least one second valve,
(i) substantially displacing the air from said cylinder chamber into said at least one medium-pressure manifold during said volume-decreasing stroke, and
(j) variably closing said at least one second valve,
and wherein said performance of said hybrid four-stroke cycle in said at least one primary cylinder, during operation of said engine in said second propulsion mode, further comprises, during each four-stroke cycle, the steps of:
(a) deactivating said at least one first valve,
(b) deactivating said at least one third valve,
(c) variably opening said at least one second valve,
(d) receiving air into said cylinder chamber from said at least one medium-pressure manifold during a first part of a first volume-increasing stroke,
(e) variably closing said at least one second valve,
(f) expanding said air in said cylinder chamber during a second part of said first volume-increasing stroke,
(g) compressing said air in said cylinder chamber during a first volume-decreasing stroke,
(h) adding fuel to said air,
(i) initiating combustion of said fuel in said cylinder chamber, whereby said fuel and said air are converted into a combustion gas,
(j) expanding said combustion gas in said cylinder chamber during a second volume-increasing stroke,
(k) variably opening said at least one fourth valve,
(l) substantially expelling said combustion gas from said cylinder chamber into said at least one exhaust manifold during a first part of a second volume-decreasing stroke,
(m) variably closing said at least one fourth valve, and
(n) trapping the residual combustion gas remaining in said cylinder chamber during a second part of said second volume-decreasing stroke,
whereby work performed by said combustion gas during said second volume-increasing stroke is supplemented by work performed by said air during said first volume-increasing stroke, and whereby trapping said residual gas in said cylinder chamber during second part of said second volume-decreasing stroke contributes to reduction in harmful nitrogen oxide emission.

18. The method of claim 14 wherein said performance of a two-stroke air-motor cycle in said at least one secondary cylinder, during operation of said engine in said third propulsion mode, further comprises, during each two-stroke cycle, the steps of:
(a) deactivating said fuel delivery means,
(b) deactivating said at least one fourth valve,
(c) deactivating said at lest one first valve,
(d) variably opening said at least one third valve,
(e) receiving compressed air from said at least one high-pressure manifold into said cylinder chamber during a first part of said volume-increasing stroke,
(f) variably closing said at least one third valve,
(g) expanding said compressed air in said cylinder chamber during a second part of said volume-increasing stroke,
(h) variably opening said at least one second valve,
(i) substantially displacing the air from said cylinder chamber into said at least one medium-pressure manifold during said volume-decreasing stroke, and
(j) variably closing said at least one second valve, and wherein said performance of a hybrid two-stroke internal-combustion cycle in said at least one primary cylinder, during operation of said engine in said third propulsion mode, further comprises, during each two-stroke cycle, the steps of:
(a) deactivating said at least one third valve,
(b) deactivating said at least one first valve,
(c) variably opening said at least one second valve,
(d) receiving compressed air into said cylinder chamber from said at least one medium-pressure manifold during a second part of said volume-decreasing stroke,
(e) variably closing said at least one second valve,
(f) compressing said compressed air and residual combustion gas in said cylinder chamber during a third part of said volume-decreasing stroke,
(g) adding fuel to the mixture of said compressed air and said residual combustion gas in said cylinder chamber,
(h) initiating combustion of said fuel in said cylinder chamber, whereby said fuel and said compressed air are converted into a combustion gas,
(i) expanding said combustion gas in said cylinder chamber during said volume-increasing stroke,
(j) variably opening said at least one fourth valve,
(k) substantially expelling said combustion gas from said cylinder chamber into said at least one exhaust manifold during a first part of said volume-decreasing stroke, and
(l) variably closing said at least one fourth valve,
whereby receiving of said compressed air into said cylinder chamber from said at least one medium-pressure manifold reduces the amount of compression work required.

19. The method of claim 14 wherein the operation of said engine in said fourth propulsion mode further includes the steps of:
(a) deactivating said at least one second valve in all engine cylinders,
(b) deactivating said at least one third valve in all engine cylinders, and
(c) operating said engine as a conventional internal-combustion engine receiving air from said at least one low-pressure manifold through said at least one first valve into said cylinder chamber and discharging exhaust gas from said cylinder chamber through said at least one fourth valve into said at least one exhaust manifold.

20. A method of operating a wheeled vehicle, said method comprising the steps of:
- (a) providing an engine mounted in said vehicle and coupled to at least one vehicle wheel for its propulsion and braking, said engine including at least two cylinders,
- (b) providing an air-reservoir means mounted in said vehicle and connected to said engine for receiving, storage, and discharge of compressed air,
- (c) providing a control means for controlling the operation of said engine and said vehicle in response to driver's demands and in accordance with a control program incorporated in said control means,
- (d) providing a gas exchange controlling means for accommodating gas flow into, inside, and out of said engine, and between said engine and said air-reservoir means,
- (e) providing a fuel delivery means for selectively and variably adding fuel to the air intended for participation in combustion,
- (f) operating said engine in a compression-braking mode driven by a vehicle momentum in response to a demand for a vehicle braking force by repeatedly performing a two-stage compression of air in said engine, said two-stage compression of air comprising the steps of:
  - (1) receiving air from outside atmosphere into at least one of said at least two cylinders,
  - (2) compressing said air in said at least one of said at least two cylinders,
  - (3) expelling compressed air from said at least one of said at least two cylinders,
  - (4) receiving said compressed air into another at least one of said at least two cylinders,
  - (5) further compressing said compressed air in said another at least one of said at least two cylinders,
  - (6) expelling said compressed air from said another at least one of said at least two cylinders, and
  - (7) receiving said compressed air into said air-reservoir means for storage therein, whereby energy of vehicle motion is converted into energy of compressed air stored in said air-reservoir means,
- (g) using said energy of compressed air stored in said air-reservoir means for said vehicle acceleration and propulsion in response to a demand for a vehicle propulsion force by repeatedly performing a two-stage expansion of air in said engine, said two-stage expansion of air comprising the steps of:
  - (1) receiving compressed air from said air-reservoir means into at least one of said at least two cylinders,
  - (2) performing a partial expansion of said compressed air in said at least one of said at least two cylinders,
  - (3) expelling partially-expanded compressed air from said at least one of said at least two cylinders,
  - (4) receiving said partially-expanded compressed air into another at least one of said at least two cylinders, and
  - (5) further expanding said partially-expanded compressed air in said another at least one of said at least two cylinders,
- (h) operating said engine in a conventional internal-combustion mode when said energy of compressed air is not available, and
- (i) using said control means to control the magnitude of said vehicle braking force and of said vehicle propulsion force, whereby combined effect of converting energy of vehicle motion into energy of compressed air during said vehicle braking, and using said energy of compressed air for said vehicle acceleration and propulsion at a later time reduces said vehicle fuel consumption, and whereby using two-stage air compression and two-stage air expansion reduces the required size of said air-reservoir means.

* * * * *